United States Patent
Devitt et al.

(10) Patent No.: US 12,496,369 B1
(45) Date of Patent: Dec. 16, 2025

(54) SYSTEMS AND METHODS FOR MONITORING A GAS STERILIZATION ENVIRONMENT

(71) Applicant: KYMANOX CORPORATION, Morrisville, NC (US)

(72) Inventors: Shaun R. Devitt, Audubon, PA (US); Joshua L. Earp, Raleigh, NC (US)

(73) Assignee: STERILMETRIC INNOVATIONS, LLC, Morrisville, NC (US)

( * ) Notice: Subject to any disclaimer, the term of this patent is extended or adjusted under 35 U.S.C. 154(b) by 0 days.

(21) Appl. No.: 19/045,098

(22) Filed: Feb. 4, 2025

(51) Int. Cl.
  *A61L 2/28* (2006.01)
  *A61L 2/00* (2006.01)
  *A61L 2/24* (2006.01)

(52) U.S. Cl.
  CPC .............. *A61L 2/28* (2013.01); *A61L 2/0094* (2013.01); *A61L 2/24* (2013.01)

(58) Field of Classification Search
  CPC .... A61L 2/24; A61L 2202/11; A61L 2202/14; A61L 2202/25; A61L 2/208; A61L 2202/16; A61L 2/28; A61L 2209/111; A61L 2202/20; A61L 9/00; A61L 9/015; G08B 21/12; G08B 21/14; G08B 21/16; G08B 25/14; F24F 2110/64; F24F 8/24; F24F 11/30; F24F 2110/66; F24F 3/16; G05B 19/042; G05B 15/02; G05B 2219/25252; G05B 23/027
  See application file for complete search history.

(56) References Cited

U.S. PATENT DOCUMENTS

| | | | |
|---|---|---|---|
| 5,468,961 A | 11/1995 | Gradon et al. | |
| 5,496,302 A | * 3/1996 | Minshall | A61L 2/0023 604/408 |
| 5,565,634 A | 10/1996 | Graessle et al. | |
| 5,788,925 A | 8/1998 | Pai et al. | |
| 5,886,348 A | 3/1999 | Lessure et al. | |

(Continued)

FOREIGN PATENT DOCUMENTS

| | | |
|---|---|---|
| CN | 204854791 U | 12/2015 |
| CN | 211382879 U | 9/2020 |

(Continued)

OTHER PUBLICATIONS

U.S. Appl. No. 18/947,846, filed Nov. 14, 2024 (68 pages).

*Primary Examiner* — Darrin D Dunn
(74) *Attorney, Agent, or Firm* — Mills IP Law, PLLC

(57) ABSTRACT

A method for monitoring a gas sterilization process can be performed via a sterilization monitoring system that includes a system controller and a set of sensor assemblies that can be spaced apart within a sterilization environment. Each sensor assembly is configured to record a set of signals from a gas concentration sensor and an environmental sensor associated with the sterilization environment at a set of sampling intervals during a sterilization period. Each sensor assembly is associated with a sensor spatial coordinate corresponding to a position of the sensor assembly within the sterilization environment. The recorded set of signals is received from each sensor assembly. A process variable is determined for each sampling interval and for each sensor assembly based, at least in part, on the corresponding set of signals. A graphical representation of the process variable during the sterilization period is produced.

25 Claims, 21 Drawing Sheets

(56) References Cited

U.S. PATENT DOCUMENTS

| | | |
|---|---|---|
| 6,532,794 B2 | 3/2003 | Wang et al. |
| 6,875,399 B2 | 4/2005 | McVey |
| 6,917,885 B2 | 7/2005 | Centanni |
| 7,132,657 B2 | 11/2006 | Smith |
| 7,132,659 B2 | 11/2006 | Starta et al. |
| 7,157,045 B2 | 1/2007 | McVey |
| 7,166,843 B2 | 1/2007 | May |
| 7,626,168 B2 | 12/2009 | Fischer et al. |
| 7,687,776 B2 | 3/2010 | Baliga et al. |
| 7,835,004 B2 | 11/2010 | Uber et al. |
| 7,880,887 B2 | 2/2011 | Olson et al. |
| 8,955,340 B2 | 2/2015 | Burke et al. |
| 8,999,236 B2 | 4/2015 | Kanno et al. |
| 9,322,774 B2 | 4/2016 | Moenkemoeller |
| 9,678,010 B2 | 6/2017 | Starta et al. |
| 10,010,636 B2 | 7/2018 | Henniges |
| 10,022,464 B2 | 7/2018 | Sarphati et al. |
| 10,168,211 B1 | 1/2019 | Emadi et al. |
| 10,258,706 B2 | 4/2019 | Henniges et al. |
| 10,288,559 B2 | 5/2019 | Muniraju et al. |
| 10,338,021 B2 | 7/2019 | Graunke |
| 10,368,958 B2 | 8/2019 | Wherle et al. |
| 10,583,214 B2 | 3/2020 | Childers et al. |
| 10,780,191 B2 | 9/2020 | Stadler et al. |
| 10,948,445 B2 | 3/2021 | Raible et al. |
| 10,983,103 B2 | 4/2021 | Stokoe et al. |
| 11,156,577 B2 | 10/2021 | Graunke |
| 11,389,556 B2 | 7/2022 | Henniges et al. |
| 11,529,434 B1* | 12/2022 | Gurin .................... A61L 2/24 |
| 11,896,726 B1* | 2/2024 | Deshler .................. A61L 2/10 |
| 11,913,654 B1* | 2/2024 | Stamatakis ............. F24F 11/62 |
| 12,020,023 B2* | 6/2024 | D'Souza ................. G06F 8/71 |
| 12,235,190 B1* | 2/2025 | Tan ....................... G01M 3/28 |
| 2002/0034823 A1 | 3/2002 | Kuepper et al. |
| 2003/0063997 A1 | 4/2003 | Fryer et al. |
| 2004/0226392 A1* | 11/2004 | McNally ............... G01D 21/02 702/189 |
| 2005/0260760 A1 | 11/2005 | Hucker |
| 2006/0008379 A1* | 1/2006 | Mielnik ................. A61L 2/208 422/32 |
| 2009/0216438 A1* | 8/2009 | Shafer .................. G01C 21/206 701/414 |
| 2009/0263499 A1* | 10/2009 | Platt, Jr. .................. F24F 8/24 422/291 |
| 2011/0161885 A1* | 6/2011 | Gonia .................. G08B 21/12 715/764 |
| 2013/0289927 A1* | 10/2013 | Smith .................. G06F 17/18 702/181 |
| 2013/0309154 A1* | 11/2013 | Call ..................... A62B 15/00 423/210 |
| 2013/0317659 A1* | 11/2013 | Thomas ............. H04W 52/0219 700/286 |
| 2015/0374868 A1 | 12/2015 | Bruce et al. |
| 2016/0306934 A1* | 10/2016 | Sperry ................... G06F 3/14 |
| 2016/0328612 A1* | 11/2016 | Ahn ..................... H04N 23/63 |
| 2017/0081707 A1* | 3/2017 | Dillon ................. C12Q 1/689 |
| 2017/0169692 A1* | 6/2017 | Parra .................... G08B 21/14 |
| 2017/0193790 A1* | 7/2017 | Cornwall ............. G01D 21/00 |
| 2017/0211122 A1* | 7/2017 | Centanni ............ C12M 1/3407 |
| 2017/0224859 A1 | 8/2017 | Broninx et al. |
| 2017/0322701 A1* | 11/2017 | Bowman .......... G01N 35/00722 |
| 2018/0280558 A1* | 10/2018 | Mount ................... A61L 9/14 |
| 2020/0084421 A1* | 3/2020 | Wilson, Jr. ............ G06V 20/20 |
| 2020/0110935 A1* | 4/2020 | Paul ................... G08B 19/00 |
| 2020/0179551 A1 | 6/2020 | Childers et al. |
| 2020/0390923 A1 | 12/2020 | Matta et al. |
| 2021/0077645 A1 | 3/2021 | Mismar et al. |
| 2021/0181135 A1 | 6/2021 | Santoro, Jr. et al. |
| 2021/0199635 A1 | 7/2021 | Stokoe et al. |
| 2021/0261297 A1 | 8/2021 | Bitong et al. |
| 2021/0329921 A1* | 10/2021 | Cushman ............... A01N 59/04 |
| 2022/0008590 A1 | 1/2022 | Schweizer |
| 2022/0034540 A1* | 2/2022 | Reeves ................. F24F 11/89 |
| 2022/0054687 A1* | 2/2022 | Forzani ................ A61L 2/22 |
| 2022/0088237 A1* | 3/2022 | Hauser ............... G06T 15/506 |
| 2022/0136717 A1* | 5/2022 | Wenger .............. B01D 46/442 423/220 |
| 2022/0184262 A1 | 6/2022 | Xia et al. |
| 2022/0221175 A1* | 7/2022 | Lee ...................... C01B 15/01 |
| 2022/0238235 A1* | 7/2022 | Shelton, IV ........ A61B 10/0012 |
| 2022/0280671 A1* | 9/2022 | Pan ...................... A61L 9/22 |
| 2022/0296741 A1 | 9/2022 | Henniges et al. |
| 2022/0296757 A1 | 9/2022 | Henniges et al. |
| 2022/0370671 A1 | 11/2022 | Starkweather et al. |
| 2022/0373568 A1 | 11/2022 | Scheffler et al. |
| 2022/0399105 A1* | 12/2022 | Wagner Block ....... G16H 40/20 |
| 2022/0406471 A1* | 12/2022 | Ghosh ................. G16H 40/67 |
| 2023/0001034 A1* | 1/2023 | Baarman ............... A61L 2/10 |
| 2023/0039967 A1* | 2/2023 | ElDelgawy ........... G08B 21/12 |
| 2023/0129412 A1* | 4/2023 | Roy ..................... G01M 3/04 702/50 |
| 2023/0176023 A1* | 6/2023 | Wang ................. G01N 33/0034 340/632 |
| 2023/0176024 A1* | 6/2023 | Molyneux ........ G01N 35/00722 222/52 |
| 2023/0194418 A1* | 6/2023 | Asano .................. G01M 3/002 382/103 |
| 2023/0201393 A1* | 6/2023 | Belfance ............... A01N 25/10 422/29 |
| 2023/0273705 A1* | 8/2023 | Lin .................... G05B 23/0267 715/771 |
| 2023/0302176 A1 | 9/2023 | Bernard |
| 2023/0400205 A1* | 12/2023 | Dos Santos Almeida Nunes ....... F24F 11/72 |
| 2023/0417646 A1* | 12/2023 | Kottapalli ............ F24F 11/30 |
| 2024/0263817 A1* | 8/2024 | Sloof .................. F24F 11/56 |
| 2024/0285823 A1* | 8/2024 | Shane .................. A61L 2/18 |
| 2024/0318845 A1* | 9/2024 | Douglas .............. F24F 11/65 |
| 2024/0325581 A1* | 10/2024 | Shane .................. A61L 2/22 |
| 2024/0354679 A1* | 10/2024 | Patta ................... G06Q 50/06 |
| 2024/0358868 A1* | 10/2024 | Bonutti ................ A61L 2/26 |

FOREIGN PATENT DOCUMENTS

| | | |
|---|---|---|
| CN | 115400248 A | 11/2022 |
| CN | 217724160 U | 11/2022 |
| DE | 202011050118 | 6/2011 |
| DE | 102015109415 | 12/2016 |
| EP | 1647284 | 4/2006 |
| EP | 3163295 | 5/2017 |
| GB | 2331810 | 6/1999 |
| WO | WO2001045754 | 6/2001 |
| WO | WO2010134826 | 11/2010 |
| WO | WO2019126533 | 6/2019 |
| WO | WO2021046070 | 3/2021 |
| WO | WO2022245918 | 11/2022 |
| WO | WO2023084337 | 5/2023 |

* cited by examiner (Front View)

(Top View)

(Side View)

(Perspective View)

| X | Y | Z | PV_A | PV_B |
|---|---|---|------|------|
| $X_1$ | $Y_1$ | $Z_1$ | $PV_{A1}$ | $PV_{B1}$ |
| $X_2$ | $Y_2$ | $Z_2$ | $PV_{A2}$ | $PV_{B2}$ |
| $X_3$ | $Y_3$ | $Z_3$ | $PV_{A3}$ | $PV_{B3}$ |
| $X_4$ | $Y_4$ | $Z_4$ | $PV_{A4}$ | $PV_{B4}$ |
| ... | ... | ... | ... | ... |
| $X_{101}$ | $Y_{101}$ | $Z_{101}$ | $PV_{A101}$ | $PV_{B101}$ |
| $X_{102}$ | $Y_{102}$ | $Z_{102}$ | $PV_{A102}$ | $PV_{B102}$ |
| $X_{103}$ | $Y_{103}$ | $Z_{103}$ | $PV_{A103}$ | $PV_{B103}$ |
| $X_{104}$ | $Y_{104}$ | $Z_{104}$ | $PV_{A104}$ | $PV_{B104}$ |
| ... | ... | ... | ... | ... |

FIG. 8A (Time = t1)

| X | Y | Z | PV_A | PV_B |
|---|---|---|------|------|
| $X_1$ | $Y_1$ | $Z_1$ | $PV_{A1}$ | $PV_{B1}$ |
| $X_2$ | $Y_2$ | $Z_2$ | $PV_{A2}$ | $PV_{B2}$ |
| $X_3$ | $Y_3$ | $Z_3$ | $PV_{A3}$ | $PV_{B3}$ |
| $X_4$ | $Y_4$ | $Z_4$ | $PV_{A4}$ | $PV_{B4}$ |
| ... | ... | ... | ... | ... |
| $X_{101}$ | $Y_{101}$ | $Z_{101}$ | $PV_{A101}$ | $PV_{B101}$ |
| $X_{102}$ | $Y_{102}$ | $Z_{102}$ | $PV_{A102}$ | $PV_{B102}$ |
| $X_{103}$ | $Y_{103}$ | $Z_{103}$ | $PV_{A103}$ | $PV_{B103}$ |
| $X_{104}$ | $Y_{104}$ | $Z_{104}$ | $PV_{A104}$ | $PV_{B104}$ |
| ... | ... | ... | ... | ... |

FIG. 8B (Time = t2)

(Time = t1; Z = $Z_1$)

(Time = t2; Z = $Z_1$)

(Time = t3; Z = $Z_2$)

(Time = t4; Z = $Z_2$)

| Sensor # | X | Y | Z |
|---|---|---|---|
| 1 | $X_1$ | $Y_1$ | $Z_1$ |
| 2 | $X_2$ | $Y_2$ | $Z_2$ |
| 3 | $X_3$ | $Y_3$ | $Z_3$ |
| 4 | $X_4$ | $Y_4$ | $Z_4$ |
| 5 | $X_5$ | $Y_5$ | $Z_5$ |
| 6 | $X_6$ | $Y_6$ | $Z_6$ |
| 7 | $X_7$ | $Y_7$ | $Z_7$ |
| 8 | $X_8$ | $Y_8$ | $Z_8$ |
|  | ... | ... | ... |

SYSTEMS AND METHODS FOR MONITORING A GAS STERILIZATION ENVIRONMENT

BACKGROUND

The embodiments described herein relate to systems and methods for monitoring a gas sterilization environment. In particular, this disclosure relates to a sterilization system controller and a set of sensor assemblies that can produce a spatial distribution of one or more sterilization process variables and methods of comparing the spatial distribution to one or more sterilization thresholds to provide an indication of the efficacy of the sterilization process.

Certain industrial products, such as medical articles, must be sterilized before use. Some known sterilization processes include placing the product to be sterilized in a sterilization environment within a sterilization chamber. The sterilization process can, for example, expose the sterilization target to steam, irradiation, a sterilant gas, or combinations thereof over a specified interval to deactivate bacteria and/or viruses. The specific target values for the duration, environmental conditions within the sterilization chamber, the radiation dose, sterilant gas concentration, and/or combinations thereof depend on the sterility requirements for the sterilization target (i.e., the product).

Following the exposure of the sterilization target to the sterilization agent(s), some known processes use microbiological testing (e.g., spore strips) to demonstrate sterility during a validation procedure and/or routine processing. However, microbiological methods have known challenges in reliability and a negative effect on processing timelines. For example, it is particularly challenging for microbiological testing to ensure sterility at or above desired levels of reliability, also referred to as the sterility assurance level (e.g., less than $10^{-6}$ product units being nonsterile). Additionally, there is often a lengthy delay (e.g., industry standard for many cases is seven days) in verifying sterility using microbiological testing. Such a delay can have an undesirable negative effect on processing timelines. Accordingly, with some known systems, the sterilization processes are controlled and monitored by directly measuring the process state variables (i.e., the system state conditions that inactivate microorganisms over a specified time) to ensure efficacy of the sterilization. With steam-based sterilization, for example, the process state variables can include temperature, pressure, and steam quality, while the process state variables for irradiation sterilization processes can be the absorbed dose. So long as the monitored process state variables are within specified ranges for specified durations, the sterility of the sterilization target is presumed.

In order to verify the sterility of the sterilization target via the monitoring of process state variables, it is desirable that the sensors monitoring the process state variables be placed in proximity to the sterilization target. For example, in some known systems, the sterilization target can include a number of industrial products or containers of products arranged in a stack or on a support rack. Collectively, the multiple industrial products or containers of products arranged in a stack, in a palletized load, or on a support rack is known as a "load." In such an implementation, it is desirable that the process state variables be monitored within or around the load rather than merely within the greater sterilization environment of the sterilization chamber. For example, with steam-based sterilization and/or irradiation sterilization processes, at least one sensor can be placed within the load to verify that the inner regions of the load (e.g., regions of the load surrounded by the industrial products or containers of products) have been exposed to process state variables that are within the specified ranges for the specified duration to ensure sterility.

In contrast to the steam-based and irradiation sterilization processes, processes that utilize a sterilant gas, such as ethylene oxide, do not currently have monitoring for the critical process state variables (i.e., gas concentration) that effectively spatially covers the load including the inner regions of the load. Accordingly, validation and routine monitoring of gas sterilization processes often rely on microbiological testing to verify sterility. In some known gas sterilization systems, however, process variable monitoring is achieved but with at most a few gas concentration sensors (often with a single gas concentration sensor) located on the perimeter of the sterilization chamber. For example, in some known systems, the process state variables within the sterilization chamber are extrapolated from monitored process state variables within a duct through which the sterilant gas is introduced into the sterilization chamber. Due to the positioning of the sensors in such known systems, the results of the monitoring can, at best, correspond to the process state variables generally present within the sterilization chamber but do not reliably correlate to the process state variables in proximity to the load, much less within the inner regions of the load. Therefore, the use of sensors to monitor the process state variables of known gas sterilization systems gives little to no assurance of sterilization process conditions within the product load.

For the gas sterilization systems that use sensors to monitor the process state variables, the positioning of the sensors on the perimeter of or external to the sterilization chamber can be dictated by the power necessary to monitor the gas sterilization process over the duration of the process. For example, known gas sterilization processes (including preconditioning, post-aeration, etc.) can have a duration that exceeds 12 hours. In some instances, known gas sterilization processes can have a duration of 48 hours. Accordingly, access to sufficient power to support the continuous operation of the sensor over the sterilization process duration is desirable. Due to their high power requirements, some known sensors are tethered to an external power source. This arrangement, however, can be undesirable because it can result in a non-sealed sterilization chamber, can limit the ability to arrange the sensors in the desired spatial positions, and can result in potential hazards associated with transmitting power within a flammable environment (e.g., ethylene oxide).

Some known gas sterilization processes may inadvertently introduce an insufficient amount sterilant gas into the gas chamber for the given dwell time. In such situations there may be locations within the load that are not exposed to sufficient sterilant exposure, which if not detected could result in the release of nonsterile products. Due to the limited awareness of the process state variables within the load using known methods, detection of such situations potentially require destructive testing.

Because of the undesired consequence of shipping product that may be nonsterile, some known gas sterilization processes introduce sterilant gas into the gas chamber at concentrations and dwell times greater than would otherwise be required to satisfy the sterilization requirements. Such processes establish the sterilant gas concentration within the gas sterilization environment at a concentration that is deemed sufficient to establish a gas concentration within the load that at least satisfies a minimal concentration requirement. In other words, in an effort to ensure that a sufficient quantity of sterilant gas reaches the inner regions of the load, more sterilant gas than would otherwise be necessary is introduced into the gas chamber. However, some sterilant gases are hazardous at sufficient concentrations. For example, ethylene oxide has known short-term and long-term health consequences associated with exposure and is also explosive at sufficient concentrations. Due to the risks associated with certain sterilant gases it is desirable to minimize the amount of such sterilant gases while still ensuring sterilization within the load.

The use of more sterilant gas than would otherwise be necessary can also negatively impact the throughput of the gas sterilization process. For example, excess concentrations and dwell times permit the sterilant gas to be absorbed into product materials, especially polymers, to a greater degree than necessary for sterilization. Due to this absorption, an extended period of desorption is sometimes required after sterilization to render product safe for use. This extended period greatly reduces the throughput of the system.

Accordingly, there is a need for improved systems and methods for monitoring a sterilization environment.

SUMMARY

In some embodiments, a system for monitoring a gas sterilization process includes a set of sensor assemblies and a system controller. Each sensor assembly is configured to be spaced apart within a sterilization environment and includes a gas concentration sensor, at least one environmental sensor, an energy storage device, and a sensor assembly controller configured to record a set of signals from the gas concentration sensor and the at least one environmental sensor associated with the sterilization environment at a set of sampling intervals during a sterilization period. The system controller includes at least one processor configured to perform a set of operations. The operations include receiving the recorded signals from each sensor assembly controller. Each sensor assembly is associated with a sensor spatial coordinate corresponding to a position within the sterilization environment. The operations include determining a process variable at each sampling interval for each sensor assembly based, at least in part, on the corresponding set of signals. The operations include analyzing the process variable during the sterilization period based at least in part on the sensor spatial coordinate and the process variable at each sampling interval for each sensor assembly. The operations include generating, in response to the analyzing, an indication associated with an efficacy of the gas sterilization process.

In some embodiments, the efficacy of the gas sterilization process is based on any of: A) whether the process variable meets a minimum condition at each position within the sterilization environment, B) whether the process variable meets a minimum condition for minimum time period, or C) whether the process variable is within a sterility threshold range.

In some embodiments, the method includes comparing at least a portion of a spatial distribution of the process variable to a sterility threshold for a specified portion of the sterilization period and generating the indication on a condition that the spatial distribution of the process variable is within the sterility threshold for the specified portion of the sterilization period.

In some embodiments, the process variable is based on a concentration of a sterilant gas and at least one of a temperature, a humidity, or a pressure within the sterilization environment.

In some embodiments, the indication is a first indication and the operations include includes generating a second indication on a condition that a spatial distribution of the process variable is outside of the sterility threshold for the specified portion of the sterilization period.

In some embodiments, the operations include determining a sterilant gas exposure time for each sensor assembly based at least in part on the process variable taken over the set of sampling intervals. A sterilant exposure magnitude is determined, based on the sterilant gas exposure time and the process variable. A third indication is generated on a condition that the sterilant exposure magnitude is greater than an accumulated threshold.

In some embodiments, the operations include determining an effective spore log reduction (SLR) for each sensor assembly of the plurality of sensor assemblies based at least in part on the process variable taken over the sampling intervals; and the indication includes the effective SLR and an error code on a condition that the effective SLR is outside of a target SLR range associated with the gas sterilization process In some embodiments, the operations include receiving the sensor spatial coordinate for each sensor assembly. A spatial distribution of the process variable over the sterilization period is generated based at least in part on the sensor spatial coordinate and the process variable at each sampling interval for each sensor assembly. The method then includes producing a graphical representation of the spatial distribution of the process variable over the sterilization period.

In some embodiments, the operations include receiving a target spatial coordinate for each of a set of targets within a load. The target spatial coordinate corresponds to a position of the target within the sterilization environment. A spatial distribution of the load is generated based at least in part on the target spatial coordinate. The portion of the spatial distribution of the process variable at least partially overlaps with the spatial distribution of the load.

In some embodiments, the operations include producing a graphical representation of the spatial distribution of the process variable over the sterilization period. The graphical representation of the spatial distribution of the process variable over the sterilization period can be a three-dimensional map of at least the process variable at each sampling interval.

In some embodiments, the operations include receiving a target spatial coordinate for each of a set of targets within a load. The target spatial coordinate corresponds to a position of the target within the sterilization environment. A graphical representation of a spatial distribution of the load is produced based at least in part on the target spatial coordinate. The graphical representation of the spatial distribution of the load is included on the three-dimensional map.

In some embodiments, each sensor assembly is devoid of any power connections when disposed within the sterilization environment. For example, the sensor assembly controller can be configured to record the plurality of signals from the gas concentration sensor and the at least one environmental sensor for between six hours and 48 hours while disconnected from any external power source and any external equipment.

In some embodiments a method for monitoring a gas sterilization process can be performed via a sterilization monitoring system. The system includes a system controller implemented in at least one of a memory or a processing device and a set of sensor assemblies that can be spaced apart within a sterilization environment. Each sensor assembly includes a gas concentration sensor, at least one environmental sensor, an energy storage device, and a sensor assembly controller. The sensor assembly controller is configured to record a set of signals from the gas concentration sensor and the at least one environmental sensor associated with the sterilization environment at a set of sampling intervals during a sterilization period. Each sensor assembly is associated with a sensor spatial coordinate corresponding to a position of the sensor assembly within the sterilization environment. The method includes receiving, via the system controller, the recorded set of signals from each sensor assembly controller. A process variable is determined, via the system controller, for each sampling interval and for each sensor assembly based, at least in part, on the corresponding set of signals. The method includes generating, via the system controller, a spatial distribution of the process variable during the sterilization period based at least in part on the sensor spatial coordinate and the process variable at each sampling interval for each sensor assembly. At least a portion of the spatial distribution of the process variable is compared to a sterility threshold for a specified portion of the sterilization period and an indication is generated on a condition that the spatial distribution of the process variable is less than the sterility threshold for the specified portion of the sterilization period.

In some embodiments, the indication is a first indication and the method further includes generating a second indication on a condition that the spatial distribution of the process variable is greater than the sterility threshold for the specified portion of the sterilization period. The method can further include determining a sterilant gas exposure time for each sensor assembly based at least in part on the process variable taken over the set of sampling intervals. A sterilant exposure magnitude is determined based on the sterilant gas exposure time and the process variable. A third indication is generated on a condition that the sterilant exposure magnitude is greater than an accumulated threshold.

In some embodiments, at least one sensor assembly is at least partially surrounded by a load positioned within the sterilization environment.

In some embodiments, the method includes producing a graphical representation of the spatial distribution of the process variable during the sterilization period. The graphical representation is a spatial map of at least the process variable at each sampling interval.

In some embodiments, a method for monitoring a gas sterilization process can be performed via a sterilization monitoring system. The system includes a system controller implemented in at least one of a memory or a processing device and a set of sensor assemblies that can be spaced apart within a sterilization environment. Each sensor assembly includes a gas concentration sensor, at least one environmental sensor, an energy storage device, and a sensor assembly controller. The sensor assembly controller is configured to record a set of signals from the gas concentration sensor and the at least one environmental sensor associated with the sterilization environment at a set of sampling intervals during a sterilization period. Each sensor assembly is associated with a sensor spatial coordinate corresponding to a position of the sensor assembly within the sterilization environment. The method includes receiving, via a sensor module implemented in at least one of a memory or a processing device, the recorded set of signals from each sensor assembly controller. A process variable is determined for each sampling interval and for each sensor assembly based, at least in part, on the corresponding set of signals. The method includes producing, via a mapping module implemented at least one of the memory or the processing device, a graphical representation of the process variable during the sterilization period. The graphical representation including a spatial map based at least in part on the sensor spatial coordinate associated with each sensor assembly.

In some embodiments, the spatial map is a three-dimensional map of at least the process variable.

In some embodiments, the spatial map is one of a set of spatial maps. The graphical representation includes the set of spatial maps, and each spatial map is associated with a corresponding sampling interval.

In some embodiments, the method further includes receiving a target spatial coordinate for each of a set of targets within a load. The target spatial coordinates correspond to a position of the target within the sterilization environment. A graphical representation of the load within the sterilization environment is produced. The graphical representation of the load includes a load spatial map based at least in part on the target spatial coordinate. The graphical representation of the load is included on the spatial map of the process variable.

In some embodiments, the graphical representation of the load includes different colors. Each color is associated with a characteristic of a target within the load. In some embodiments, the graphical representation of the process variable includes a contour plot showing lines representing different concentrations of the sterilant gas.

In some embodiments, the method includes determining, via an assurance module implemented in at least one of the memory or the processing device, a minimum time threshold based on the process variable at each sample interval. An indication associated with the minimum time threshold is then produced.

In some embodiments, a method for monitoring a gas sterilization process can be performed via a sterilization monitoring system. The system includes a system controller implemented in at least one of a memory or a processing device and a set of sensor assemblies that can be spaced apart within a sterilization environment. Each sensor assembly includes a gas concentration sensor, at least one environmental sensor, an energy storage device, and a sensor assembly controller. The sensor assembly controller is configured to record a set of signals from the gas concentration sensor and the at least one environmental sensor associated with the sterilization environment at a set of sampling intervals during a sterilization period. The method includes receiving a target spatial coordinate for each of a set of targets within a load. The target spatial coordinate corresponds to a position of the target within a sterilization environment. A spatial distribution of the load based at least in part on the target spatial coordinate and spatial information associated with the sterilization chamber is generated. The method includes producing, via a sensor module implemented in at least one of a memory or a processing device, a target number of sensor assemblies and a sensor spatial coordinate corresponding to a position of each sensor assembly to be placed within the environmental chamber. The producing is based at least in part on the spatial distribution of the load and the spatial information associated with the sterilization chamber. A placement instruction providing an indication for placement of each of the sensor assemblies within the sterilization environment is produced.

In some embodiments, the spatial information associated with the sterilization chamber includes any of a volume of the sterilization chamber or a characteristic dimension of the sterilization chamber. In some embodiments, the spatial information associated with the sterilization chamber includes a location of any of a sterilization gas input, an inert gas input, or an evacuation outlet. In some embodiments, the spatial information associated with the sterilization chamber includes a location of a mounting surface within the sterilization chamber.

In some embodiments, the spatial distribution of the load includes a separation distance between each of the targets within the load and a characteristic of each of the plurality of targets within the load. The characteristic can be a type of packaging or material from which the targets are constructed or a characteristic size (e.g., poor size, needle lumen size, etc.) of the target.

In some embodiments, a method for adjusting an amount of sterilant gas conveyed into a sterilization environment during a second sterilization period occurring after a first sterilization period can be performed via a sterilization monitoring or control system. The system includes a system controller implemented in at least one of a memory or a processing device and a set of sensor assemblies that can be spaced apart within a sterilization environment. Each sensor assembly includes a gas concentration sensor, at least one environmental sensor, an energy storage device, and a sensor assembly controller. The sensor assembly controller is configured to record a set of signals from the gas concentration sensor and the at least one environmental sensor associated with the sterilization environment. The method includes receiving, at the system controller, the signals recorded by the sensor assembly controller of each sensor. The signals are associated with the sterilization environment and a set of sampling intervals during the first sterilization period. Each sensor assembly is associated with a sensor spatial coordinate corresponding to a position of the sensor assembly within the sterilization environment. A process variable is determined, via the system controller, at each sampling interval for each sensor assembly based, at least in part, on the corresponding signals. A spatial distribution of the process variable is determined, via the system controller, associated with the first sterilization period based at least in part on the sensor spatial coordinate and the process variable at each sampling interval for each sensor assembly. The method includes generating an adjustment parameter for the second sterilization period based on the spatial distribution of the process variable associated with the first sterilization period and a sterility threshold associated with the second sterilization period.

In some embodiments, the process variable is based on a concentration of a sterilant gas and at least one of a temperature, a humidity, or a pressure within the sterilization environment during the first sterilization period.

In some embodiments, the adjustment parameter is associated with and adjustment of the amount any of the sterilant gas, the temperature, the humidity, or the pressure within the sterilization environment during the first sterilization period to be applied to the second sterilization period.

In some embodiments, the method further includes transmitting the adjustment parameter to a valve to control the amount of the sterilant gas conveyed into the sterilization environment during the second sterilization period.

In some embodiments, the method further includes receiving a target spatial coordinate for each of a set of targets within a load. The target spatial coordinates correspond to a position of the target within the sterilization environment during the second sterilization period. A spatial distribution of the load is generated based at least in part on the target spatial coordinate. The adjustment parameter is generated for the second sterilization period based on the spatial distribution of the load during the second sterilization period.

BRIEF DESCRIPTION OF THE DRAWINGS

FIGS. 8A and 8B depict data arrays of a spatial distribution of a process variable at a first time (FIG. 8A) and a second time (FIG. 8B), produced via a method according to an embodiment by the system shown in FIG. 1.

DETAILED DESCRIPTION

Figure 1:
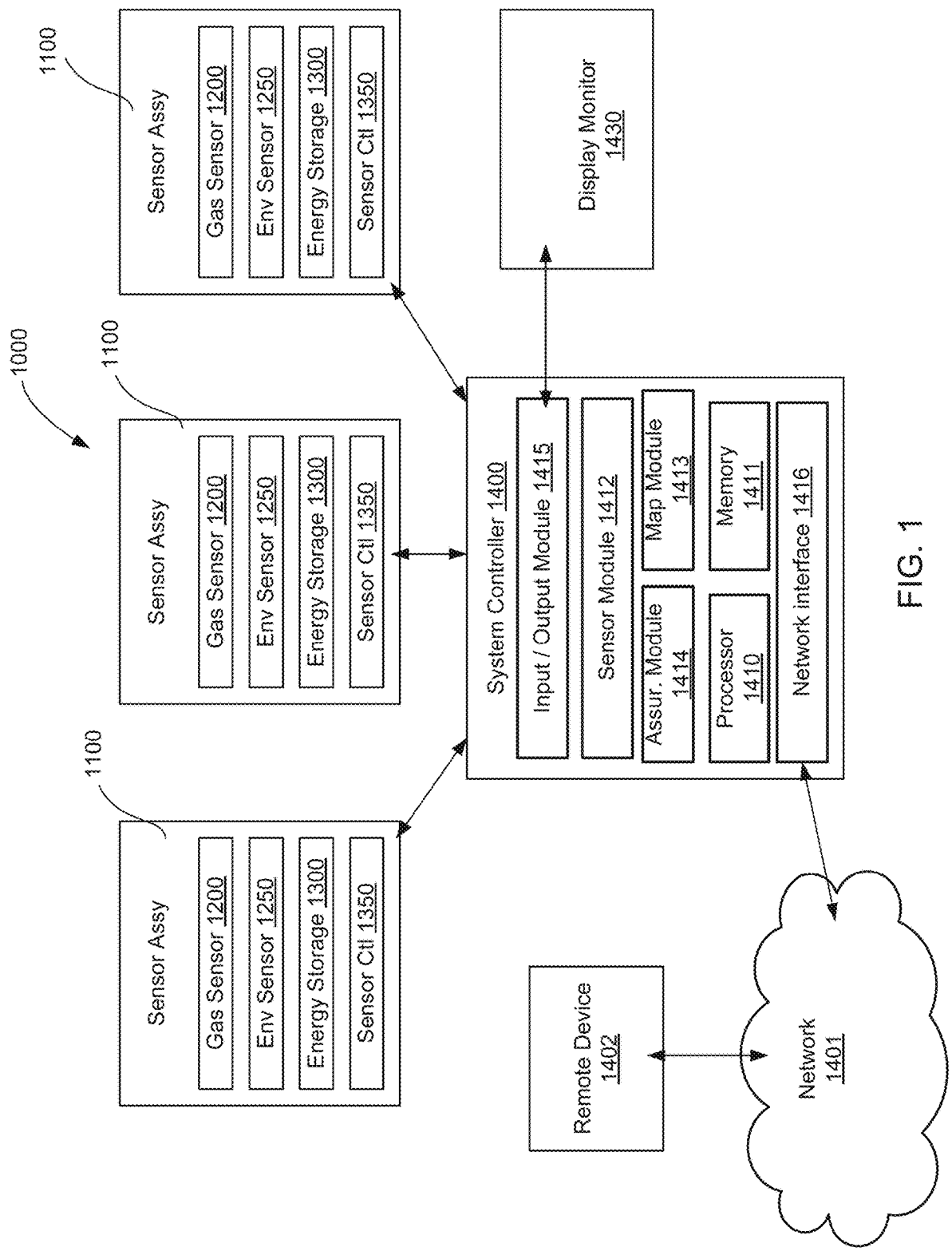
FIG. 1 is a schematic view of a system for monitoring a gas sterilization process according to an embodiment.

Generally, the present disclosure is directed to systems and methods for monitoring a gas sterilization environment within a sterilization chamber to ensure the sterility of a sterilization target (e.g., a "load" that includes multiple products or containers of products arranged in a palletized load, a stack or on a support rack). The gas sterilization environment can, for example, use a sterilant gas (e.g., ethylene oxide) that is not visible to the naked eye. As described herein, the process state variables (also referred to herein as simply process variables) of the gas sterilization environment are monitored via a set of gas sensor assemblies. The signals produced by each sensor assembly (e.g., output from the gas sensor and environmental sensor(s) therein) can be recorded by each sensor assembly placed within the gas sterilization environment. The monitoring system can then receive the information recorded by each sensor assembly and based on the information, can determine one or more process variables. The process variables can be, for example, the sterilant gas concentration, humidity, temperature, pressure, or any other variable that can influence the efficacy of the sterilization operation. Because the process variables are associated with a specific location of each sensor assembly within the sterilization environment, the system can generate a spatial distribution of the process variable(s) during the sterilization period and can determine, based on the spatial distribution, the efficacy of the sterilization operation.

Thus, the system and methods described herein advantageously allow both temporal and spatial monitoring of the sterilization environment. Additionally, the systems and methods described herein can rapidly produce indications showing a comparison of the process variables (both temporally and spatially) to a sterility threshold, which can promote more efficient sterilization operations.

The process variables include the concentration of the sterilant gas and at least one environmental parameter, such as humidity, temperature, pressure, and/or any other parameter that can influence the efficacy of the sterilization operation. Each of the process state variables can be monitored at each spatial location and at each of a series of sampling intervals over a sterilization period to ensure that the sterilization target has been exposed to process variables that are within specified ranges for the specified duration to ensure sterility. The sterilization period can, for example, extend from the sealing of the sterilization chamber at the initiation of the sterilization process to the removal of the load from the sterilization chamber at the conclusion of the sterilization process. This period during which the sensor assemblies are enabled to record signals can, in some instances, be at least six hours and no more than 48 hours in duration.

The sensor assemblies described herein are sized to be positioned around and within the load. In other words, the sensor assemblies are of a suitable size to be positioned in and amongst multiple products or containers of products of the load to monitor the process variables in the inner regions of the load. Thus positioned, the sensor assemblies can be used to monitor the process variables closely surrounding and throughout the load, including regions that cannot be accurately monitored via a sensor positioned externally to the load (e.g., along the perimeter of the sterilization chamber). Insofar as the process state variables can be monitored in the inner regions of the load, the sterility of the entire load can be confirmed based on the process variables within the load being within the specified ranges for the specified duration to ensure sterility. This, in turn, reduces or eliminates the requirement to introduce sterilant gas into the gas chamber at concentrations greater than would otherwise be required to satisfy the sterilization requirements to presumptively establish a gas concentration within the load that at least satisfies a minimal concentration requirement.

Because some sterilant gases, such as ethylene oxide, can be hazardous at sufficient concentrations, the reduction or elimination of the requirement to introduce excess sterilant gas is desirable due to the corresponding reduction in the risks associated with the use of the sterilant gas. For example, the use of the sensor assemblies and methods described herein can facilitate the use of a lesser quantity of ethylene oxide by confirming that the actual concentration of ethylene oxide within the load is sufficient to satisfy the sterilization parameters even at lower concentrations of the sterilant gas within the sterilization chamber. In other words, by recording the actual process variables within the load, the actual process state variables can be correlated to lower concentrations of sterilant gas introduced into the sterilization chamber. Subsequently, the concentration of sterilant gas introduced into the sterilization chamber can be set at a magnitude that establishes the desired process variables within the load at a level sufficient to satisfy the sterilization parameters, and the sterility of the product can be verified via the recorded process variables from the sensor assemblies. In the case of gas sterilization processes that use ethylene oxide, the reduction in the amount of ethylene oxide required to establish the process state variables at a level that satisfies the sterilization parameters mitigates the hazards associated with the use of ethylene oxide. Additionally, the reduction in the amount of ethylene oxide required to establish the process variables at a level that satisfies the sterilization parameters can increase the throughput of the gas sterilization system by reducing or eliminating the extended period of desorption and related post treatment processing (e.g., aeration, air washing, and/or air rinsing) that would otherwise be required at higher concentrations of sterilant gas.

Additionally, the use of the sensor assemblies and methods described herein can identify situations in which an insufficient amount sterilant gas has been introduced into the sterilization chamber for the given dwell time. In such situations there may be locations within the load that are not exposed to sufficient sterilant exposure, which if not detected could result in the release of nonsterile products. Thus, the systems and methods described herein can facilitate detection of such situations rapidly and without the need for destructive testing.

One of the hazards associated with the use of certain sterilant gases, such as ethylene oxide, is the flammability or even explosiveness of the sterilant gas at sufficient concentrations. Accordingly, the sensor assemblies described herein are constructed to maximize their intrinsic safety. Intrinsic safety refers to a condition in which the available energy is at a level that is too low to cause ignition of the flammable/explosive gas. For example, the housing of the sensor assembly can be formed from a material and have a shape that are selected to minimize or eliminate a sparking potential between the sensor assembly and a contacted object. Said another way, the material and/or the shape of the housing assembly can be selected so that in the event the sensor assembly is dislodged and falls to the floor of the sterilization chamber, no spark will result from the impact.

Additionally, the intrinsic safety of the sensor assemblies is furthered by configuring the electronic components to prevent sparking conditions and have peak temperatures that are below a threshold that may otherwise cause an explosive hazard. Said another way, the electronics of the sensor assemblies, including an energy storage device, have an energy level that is below an ignition threshold of the sterilant gas (e.g., the ignition threshold of ethylene oxide at the concentrations within the sterilization environment). The intrinsic safety of the sensor assemblies is also furthered by configuring the electronic components that do not need to directly communicate with the sterilization environment to be housed within a hermetically sealed region (i.e., within an internal chamber that is isolated from the sensing volume), thereby limiting the likelihood that the flammable gas will be in proximity to such electronic components. For example, in some embodiments, the gas concentration sensor can be hermetically sealed from the sterilization environment by an optical window.

In some embodiments as described herein, the sensor assembly for monitoring the gas sterilization environment can include a housing, a gas concentration sensor, at least one environmental sensor, an energy storage device, and a sensor-assembly controller. The sensor assembly is portable and is sized to be positioned within the load within the sterilization chamber without electronic tethers. For example, the sensor assembly is not tethered to an external power source nor any external sensors. Said another way, the sensor assembly can be a self-contained sensor assembly without any electronic couplings during the sterilization. As the sensor assembly is not coupled to an external power source, the energy storage device must contain sufficient energy to support the operations of the sensor assembly (e.g., the sensors, the sensor-assembly controller, and any additional power-consuming components of the sensor assembly) over a runtime period of at least six hours and up to 48 hours. However, the dimensions of the sensor assembly (i.e., the housing) establish a maximum physical size of the energy storage device, while the requirement for intrinsic safety further limits the operating parameters of the energy storage device. Accordingly, the sensor-assembly controller is configured to operate the sensor assembly within a limited power budget based on the capacity of the energy storage device as constrained by the physical dimensions of the sensor assembly and the requirement for intrinsic safety (and/or explosion-proof operation) in the absence of an external power source. More specifically, the sensor-assembly controller manages the power consumption of the sensor assembly to ensure the continued operation of the sensor assembly throughout the duration of the sterilization period.

As used herein, the term "about" when used in connection with a referenced numeric indication means the referenced numeric indication plus or minus up to 10 percent of that referenced numeric indication. For example, the language "about 50" covers the range of 45 to 55. Similarly, the language "about 5" covers the range of 4.5 to 5.5.

Further, specific words chosen to describe one or more embodiments and optional elements or features are not intended to limit the invention. For example, spatially relative terms—such as "beneath", "below", "lower", "above", "upper", "proximal", "distal", and the like—may be used to describe the relationship of one element or feature to another element or feature as illustrated in the figures. These spatially relative terms are intended to encompass different positions (i.e., translational placements) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes includes various spatial device positions and orientations.

Similarly, geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

In addition, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

The term "visible" when used in connection with a gas being detected by any of the systems and methods described herein refers to gases with peak absorbance light wavelength in the visible spectrum (400 to 760 nanometers) or otherwise having significant absorbance (an absorption coefficient of $>1$ $cm^{-1}$) in the visible spectrum. Nonvisible gases (also referred to as invisible gases) include any gases that are not visible. One nonlimiting example of an invisible gas is ethylene oxide.

FIG. 1 is a schematic illustration of a monitoring and/or control system 1000 (also referred to herein simply as "the system 1000") according to an embodiment. The system 1000 includes a set of sensor assemblies 1100 and a system controller 1400. Although the schematic shows three sensor assemblies 1100, in other embodiments, the system 1000 can include any number of sensor assemblies. For example, the deployment of the system 1000 shown in FIGS. 2-5 show eight sensor assemblies (identified as sensor assemblies 1100A, 1100B, 1100C, 1100D, 1100E, 1100F, 1100G, and 1100H). The sensor assemblies 1100 can be any suitable sensor assemblies of the type shown and described herein, such as the sensor assemblies 2100 and the sensor assembly 3100 described herein.

As shown in FIG. 1, each sensor assembly 1100 includes a gas concentration sensor 1200, at least one environmental sensor 1250, an energy storage device 1300, and a sensor-assembly controller 1350. As described in more detail below, the gas concentration sensor 1200 is positioned within the sensor assembly 1100 to monitor a concentration of the sterilant gas within the sterilization environment ENV. For example, in some embodiments, the gas concentration sensor 1200 can be a non-dispersive infrared gas concentration sensor. The environmental sensor 1250 is positioned within the sensor assembly 1100 to measure an environmental characteristic of the sterilization environment ENV. The environmental sensor 1250 can, for example, be a pressure sensor, a temperature sensor, and/or a humidity sensor. Accordingly, each environmental sensor 1250 can be used to measure an ambient temperature, a humidity, and/or a pressure level of the sterilization environment ENV. The energy storage device 1300 is operably coupled to the gas concentration sensor 1200, each environmental sensor 1250, the sensor-assembly controller 1350, and any additional electronic components of the sensor assembly 1100. In some embodiments, the energy storage device 1300 can be a battery that has previously passed intrinsic safety (and/or explosion-proof) testing or is included in an intrinsic safety test of the sensor assembly 1100. The energy storage device 1300 can be rechargeable or replaceable on a condition that the sensor assembly 1100 is positioned outside of the sterilization chamber. The sensor-assembly controller 1350 can include a processor (not shown) and a memory module (not shown). As depicted, the sensor-assembly controller 1350 is operably coupled to at least the gas concentration sensor 1200, each environmental sensor 1250, and the energy storage device 1300. As described in more detail below, the sensor-assembly controller 1350 is configured to execute a set of operations to monitor the sterilization environment ENV over a sterilization period.

Figure 2:
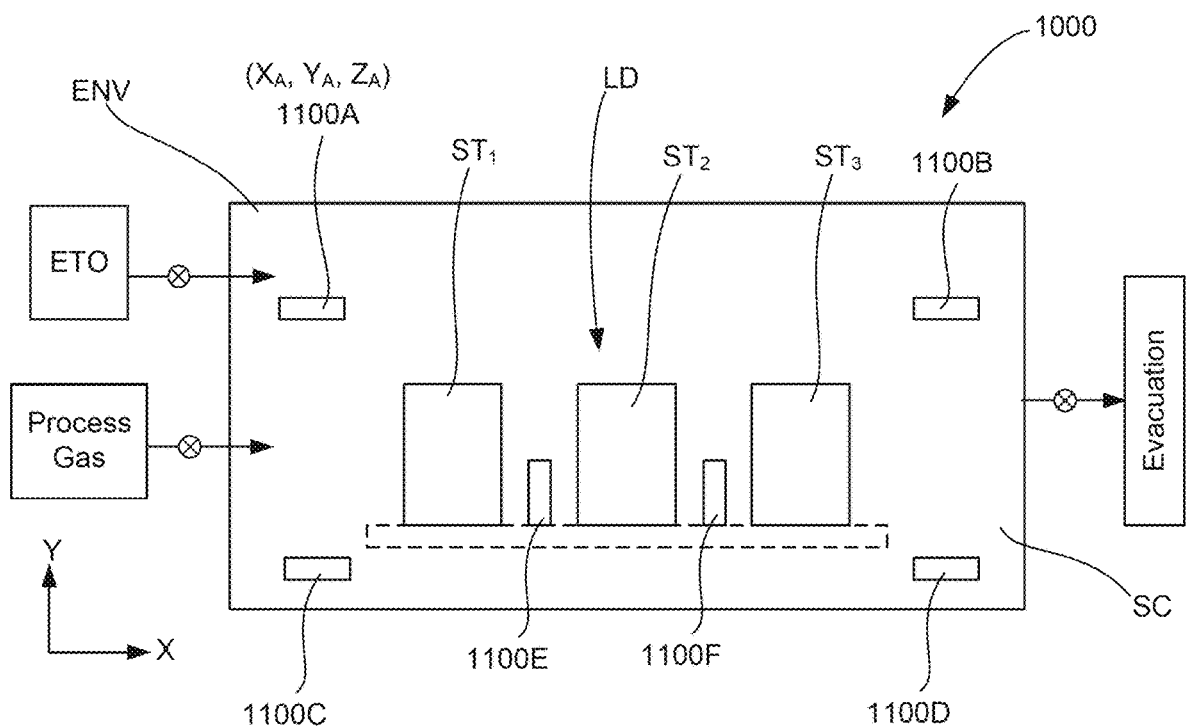
FIGS. 2-4 are a front view (FIG. 2), a top view (FIG. 3), and a side view (FIG. 4) of the sensor assemblies of the system shown in FIG. 1 placed, along with a target load, within a sterilization environment.

As shown in FIGS. 2-5, the sensor assemblies 1100A, 1100B, 1100C, 1100D, 1100E, 1100F, 1100G, and 1100H are configured to be positioned with a sterilization environment ENV in a sterilization chamber SC. Although FIGS. 2-5 show eight sensor assemblies, the system 1000 can include any number of sensor assemblies within the sterilization chamber SC. The sterilization chamber SC is an enclosed space configured to receive at least one sterilization target. FIGS. 2-5 show the sterilization targets $ST_1$, $ST_2$, $ST_3$, $ST_4$, $ST_5$, and $ST_6$, placed therein, which are collectively referred to as the sterilization load LD. The sterilization chamber SC is configured to be sealed relative to an external environment, and to establish the sterilization environment ENV therein. In some embodiments, the sterilization environment ENV is a gas sterilization environment. For example, as shown in FIG. 2, the sterilization chamber SC can be coupled to a source of sterilant gas (e.g., ethylene oxide), a source of process gas and/or an evacuation system (e.g., a vacuum pump for removing gases from within the sterilization chamber). Such process gas can be an inert gas used for purging or flushing the sterilant gas during a sterilization operation. Examples of process gases include steam (for achieving a target humidity), inert gases (e.g., nitrogen) for avoiding flammable/explosive concentrations of the sterilant gas, and dry or ambient air for the final flushing before the operation is completed. As shown, the source of sterilant gas and the source of process gas can each be fluidically coupled to the sterilization environment via inputs (e.g., valved input ports) at a specific location within the sterilization chamber. Similarly, the evacuation system can be fluidically coupled to the sterilization environment via an evacuation outlet (e.g., a valved outlet port) at a specific location within the sterilization chamber. As described further herein, because the spatial distribution of the sterilant gas within the sterilization environment ENV can, in certain instances, be influenced by the location of the sterilization gas input, the inert gas input, and/or the evacuation outlet, the spatial location of these fluidic connections can be accounted for by the system 1000 and the methods described herein.

The sterilization environment ENV is an environment within the sterilization chamber SC that, during a sterilization operation, is characterized by various environmental parameters and contains at least one sterilant gas (e.g., ethylene oxide, gaseous hydrogen peroxide, ozone, formaldehyde, nitrogen dioxide, chlorine dioxide, and/or gaseous mixtures such as ozone mixed with vapor hydrogen peroxide) formulated to deactivate microorganisms (e.g., bacteria). By monitoring and/or controlling the environmental parameters and the amount of sterilant gas during a sterilization operation, the system 1000 can produce one or more indications to confirm that the sterilization load LD is sterilized. Similarly stated, the sterilization environment ENV can be produced and maintained for a time period sufficient to meet the desired sterility assurance level (referred to as SAL). The target conditions (e.g., gas concentration, temperature, relative humidity) can be predetermined in view of minimum conditions established (based on regulatory requirements, literature or the like) to meet the desired microbial reduction of the sterilization operation that will result in the desired SAL. The system 1000 and the methods described herein provide an advantageous assessment of the spatial and/or temporal distribution of the environmental parameters and sterilant gas concentration within the sterilization environment ENV to ensure that the desired reduction or elimination of viable microbes has been achieved during the sterilization operation. Similarly stated, the system 1000 can analyze the environmental parameters and sterilant gas concentration within the sterilization environment ENV (both temporally and spatially) to determine an efficacy of the gas sterilization operation at all load locations within the sterilization environment ENV. Based on this determination, the system 1000 (and methods) can produce indications and/or control signals to facilitate efficient processes, including identification, certification, documentation, and/or shipment of items within the sterilization load.

Specifically, the sterility assurance level (SAL) is a quantitative value (e.g., generally either $10^{-6}$ or $10^{-3}$) that describes the probability of a single viable microorganism being present on an item (e.g., sterilization target) within the sterilization load LD after the sterilization operation. Thus, if a sterilization operation meets a SAL of $10^{-6}$, the probability that an item within the sterilization load LD is non-sterile is one-in-a-million. Achieving the desired SAL during the sterilization operation requires reducing the microorganism population from its initial level down to the desired level to achieve the SAL. The reduction in the microorganism population is typically measured logarithmically (often referred to as a "spore log reduction"): every spore log reduction ($10^{-1}$) signifies a 90% reduction in population, which in low populations, reduces the chances of microbial contamination by 1 in 10. Therefore, if the initial microbial population is one million bacteria, the reduction of the population to 100,000 bacteria would be reduced by one log, or 90%. A six-spore log reduction (6 SLR) is needed to reduce one million bacteria to one. In this example, to reduce the microbial population to a $10^{-6}$ SAL requires an additional six log reductions, for a total of a 12-spore log reduction (12 SLR).

Figure 3:
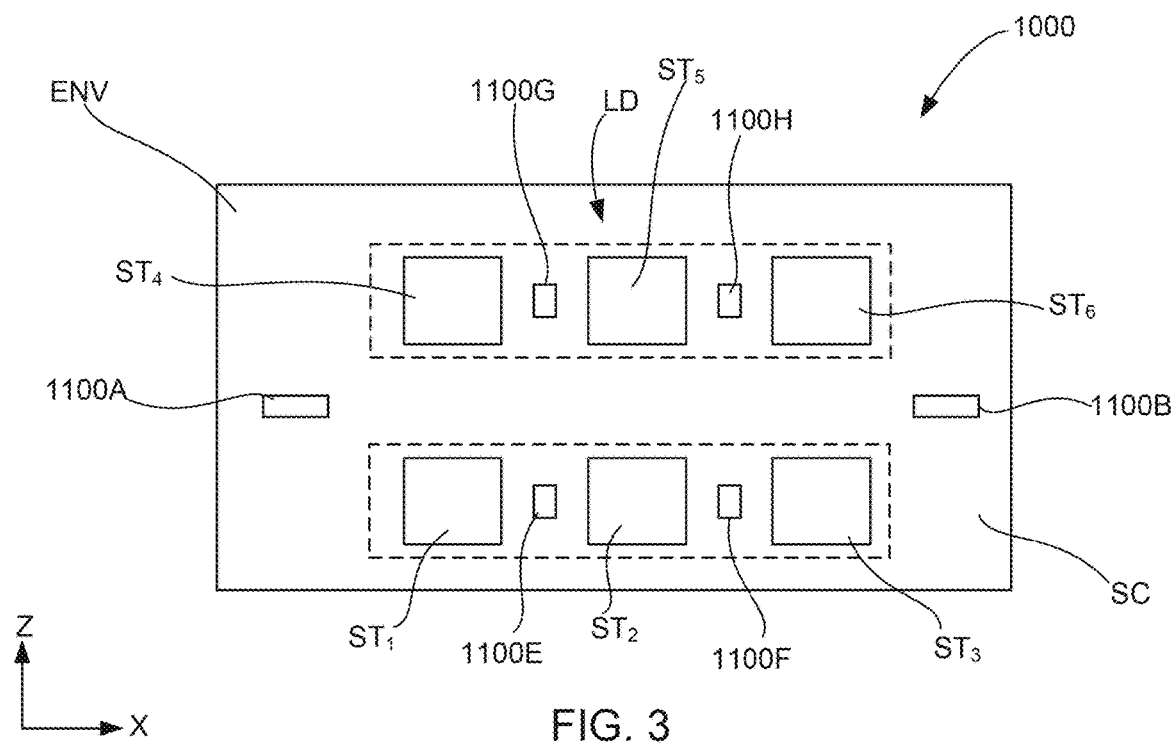
Figure 4:
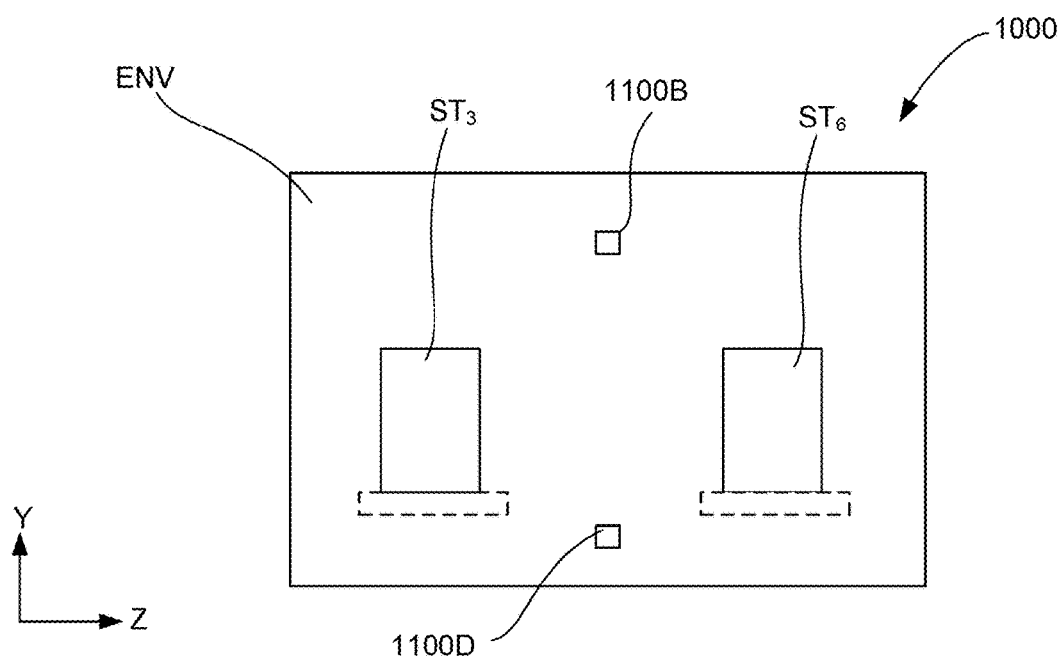
Figure 5:
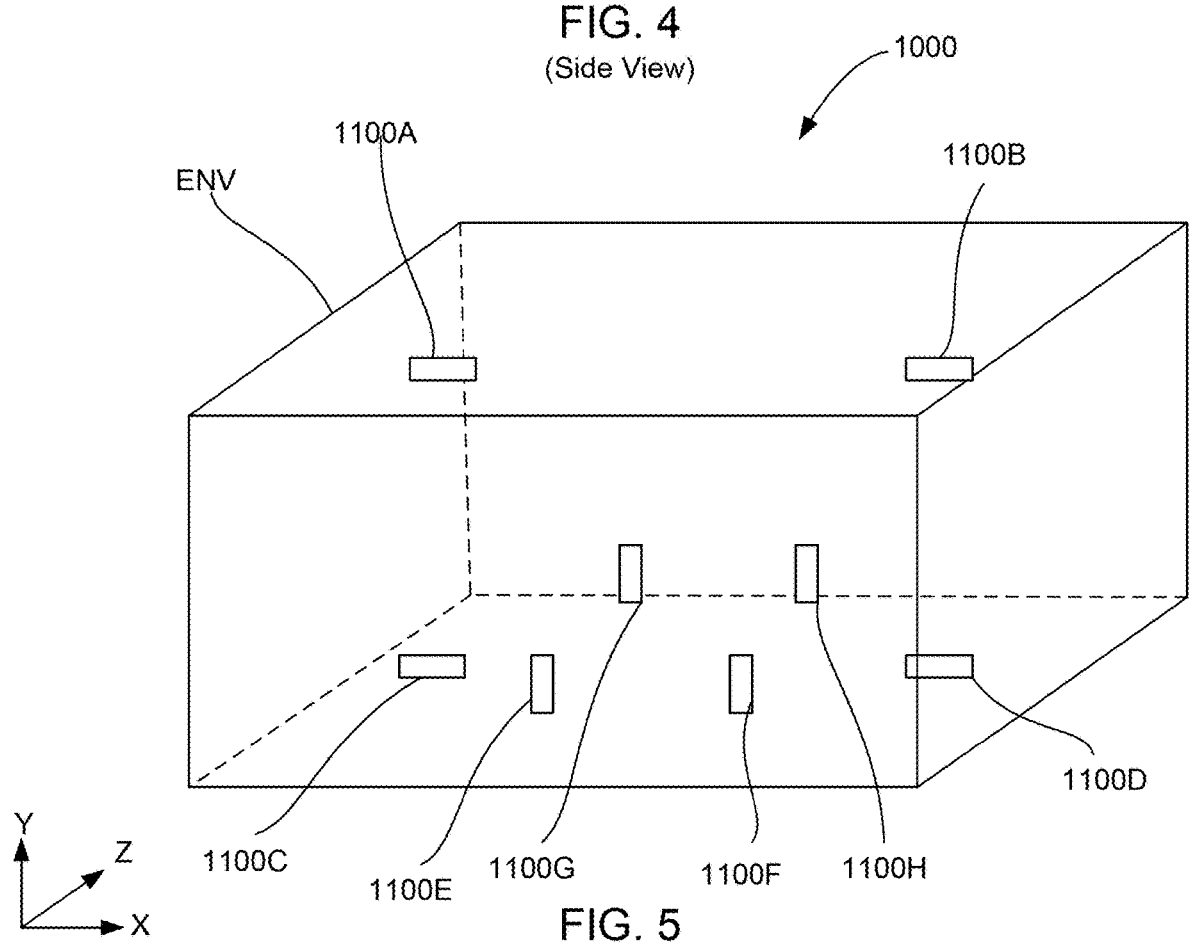
FIG. 5 is a perspective view of the sensor assemblies of the system shown in FIG. 1 within the sterilization environment.

The sensor assemblies 1100 and the system 1000 can be used in any suitable sterilization environment ENV and with different sterilization loads LD. FIGS. 2-5 show various views of the sensor assemblies 1100 of the system shown in FIG. 1 placed, along with a target load LD, within a sterilization environment ENV. Specifically, FIG. 2 shows a front view, FIG. 3 shows a top view, FIG. 4 shows a side view, and FIG. 5 shows a perspective view of eight sensor assemblies 1100A, 1100B, 1100C, HOOD, 1100E, 1100F, 1100G, and 1100H within the sterilization environment ENV. The sensor assemblies are spaced apart within the sterilization environment ENV, and each sensor assembly is associated with a sensor spatial coordinate corresponding to a position of the sensor assembly within the sterilization environment ENV. Specifically, each sensor assembly is located with the sterilization chamber SC and/or the sterilization environment ENV at a position associated with coordinates along the X-axis, Y-axis, and Z-axis (example axis coordinates are shown in FIGS. 2-5). For example, the sensor assembly 1100A is located at a position associated with the spatial coordinates $X_A$, $Y_A$, $Z_A$. Similarly each of the other sensor assemblies are located at different positions within sterilization chamber SC and are associated with different spatial coordinates. Although the spatial coordinates are described as being associated with a discrete location (i.e., a specific point in space), in other embodiments, the spatial coordinates can be associated with a more generalized location. For example, the spatial coordinates can be based on an estimated position or coarse measurement of the position within the sterilization chamber SC. As one example, if the pallet height is along the Y-axis and is generally known to be of a standard value, then in some embodiments, a Y-coordinate value of a set of spatial coordinates for a sensor assembly located on a pallet can be the standardized pallet height (rather than an accurately measured Y value). In some embodiments, the spatial coordinates can be qualitative. For example, in some embodiments, the depth (along the Z-axis) of the sterilization chamber SC can be subdivided into 3 regions. Accordingly, a Z-coordinate value of a set of spatial coordinates for a sensor assembly can simply denote the region (1, 2, or 3) within which the sensor assembly is placed. Although the spatial coordinates are described as being cartesian coordinates, in other embodiments, the spatial coordinates with which the position of the sensor assemblies are associated can be any suitable coordinate system (e.g., cylindrical coordinates or spherical coordinates).

By identifying each sensor assembly with a sensor spatial coordinate (or set of coordinates) within the sterilization chamber, the system 1000 can produce a spatial distribution of one or more process variables as described herein. Such process variables can be based on a concentration of a sterilant gas and at least one of a temperature, a humidity, or a pressure within the sterilization environment ENV. For example, in an ethylene oxide (EO) sterilization environment, the concentration of EO has an effect on the length of time (which can be referred to as a "dwell time") that the sterilization environment should be maintained during an exposure phase of the sterilization operation to achieve the desired SAL. For example some sterilization operations employ an exposure phase having a long dwell time with low EO concentration (e.g., between 200 mg/L and 400 mg/L) while other sterilization operations employ an exposure phase having a short dwell time with high EO concentration (e.g., between 600 mg/L and 800 mg/L). Each of the these approaches has advantages and drawbacks. For example, sterilization operations employing a lower EO concentration can facilitate the operation including a shorter evacuation phase (to remove the EO after the SAL has been achieved) and can be more environmentally friendly (by using less EO). Conversely, sterilization operations employing a higher EO concentration can facilitate faster cycle times and may also be more effective for certain sterilization targets having complex geometry. Thus, in some embodiments, a process variable can be the concentration of the sterilant gas.

In other embodiments, a process variable can be the effective spore log reduction (SLR) for the sterilization operation based on the concentration of the sterilant gas over each sample interval. The effective spore log reduction can further be determined at each spatial location within the sterilization chamber SC. More specifically, the resistance of a microorganism population to the sterilization environment ENV can be quantified by a decimal value (referred to as "D-value"), which is the time needed for a 90% reduction in the microorganism population when exposed to a specific process variables (e.g., sterilant gas concentration) or set of variables (i.e., sterilant gas concentration and temperature). The D-value is general a function of the microorganism and the sterilant gas concentration. For example, the microorganism resistance of Bacillus atrophaeus at an EO gas concentration of 600 mg/L is characterized by a D-value of 2 minutes. Thus, if the sterilization operation targets a 12-spore log reduction (12 SLR) to achieve the desired SAL, then achieving the 12 SLR would require exposure to the sterilant gas at a constant concentration of 600 mg/L for 24 minutes. In this example, the 12 SLR would result in an initial microorganism population of one million (the initial population is referred to as the bioburden) being reduced to a population of $10^{-6}$, thus meeting the SAL requirement.

The system 1000 and methods described herein can accommodate temporal (and spatial) variations in the sterilant gas concentration by determining the effective SLR for the sterilization operation based on the data from the set of sensor assemblies. For example, Table 1 below provides an example of how the system 1000 can produce an effective SLR over a time period by evaluating the measured gas concentration for each time interval and providing a composite (or integrated) SLR. The SLR calculations in Table 1 are based on an approximation that the gas concentration scales inversely with the D-value (i.e., if the D-value is 2 min at 600 mg/L, then it is 4 min at 300 mg/L and 8 min at 150 mg/L). In other embodiments, other scaling factors or algorithms can be employed. As shown in Table 1, each time interval is assigned to an interval SLR value that is based on the interval D-value, which is internal based on the gas concentration. The interval SLR values are summed over the sterilization period to arrive at an effective (or total) SLR. In the example of Table 1, the effective SLR is 14, which exceeds the target of 12 SLR, and thus the system 1000 can produce a "PASS" indication indicating the efficacy of the process.

TABLE 1

Example Calculation of Effective SLR

| Time (minutes) | Time Interval (minutes) | Measured Gas Concen. | Interval D-value | Interval SLR |
|---|---|---|---|---|
| 0 | N/A | 0 | N/A | 0 |
| 2 | 2 | 100 | 12.0 | 0.17 |
| 4 | 2 | 200 | 6.0 | 0.33 |
| 6 | 2 | 300 | 4.0 | 0.50 |
| 8 | 2 | 400 | 3.0 | 0.67 |
| 10 | 2 | 500 | 2.4 | 0.83 |
| 12 | 2 | 600 | 2.0 | 1.00 |
| 14 | 2 | 700 | 1.7 | 1.17 |
| 16 | 2 | 700 | 1.7 | 1.17 |
| 18 | 2 | 700 | 1.7 | 1.17 |
| 20 | 2 | 700 | 1.7 | 1.17 |
| 22 | 2 | 700 | 1.7 | 1.17 |
| 24 | 2 | 700 | 1.7 | 1.17 |
| 26 | 2 | 600 | 2.0 | 1.00 |
| 28 | 2 | 500 | 2.4 | 0.83 |
| 30 | 2 | 400 | 3.0 | 0.67 |
| 32 | 2 | 300 | 4.0 | 0.50 |
| 34 | 2 | 200 | 6.0 | 0.33 |
| 36 | 2 | 100 | 12.0 | 0.17 |
| 38 | 2 | 0 | N/A | 0 |
| 40 | 2 | 0 | N/A | 0 |
| | | | Total SLR | 14 |
| | | | Greater than 12? | PASS |

As another example, in an EQ sterilization environment, the amount of moisture in the sterilization environment ENV can impact the efficacy of sterilization. It is understood that the water molecules can impact the transportation of the ethylene oxide to desired target sites. Thus, during some sterilization operations the relative humidity in the sterilization environment ENV is maintained between approximately 30% and 90% (in other operations, the relative humidity can be maintained between approximately 40% and 80%). If the relative humidity decreases below the lower limit, the efficacy of the sterilization operation for a given gas concentration can decrease. Conversely, if the relative humidity increases above the upper limit, undesired condensation can occur. Thus, in some embodiments, a process variable can be the relative humidity or a "weighted" concentration of the sterilant gas (based on the gas concentration and the relative humidity).

Because in certain conditions and at certain concentrations EO is flammable, it is desirable to maintain the sterilization environment ENV below a lean flammability limit or above a rich flammability limit (i.e., with insufficient oxygen to support combustion in the presence of a spark). Thus, in some embodiments, a process variable can be a flammability parameter based on a concentration of the sterilant gas, the amount of oxygen, and/or the amount of other process gases (e.g., air or an inert gas) within the sterilization environment.

One of the advantages of an EO sterilization environment is the ability process the sterilization load LD at lower temperatures than may be required with other forms of sterilization. For example, the temperature of the sterilization environment ENV may be maintained between about 30 C and 70 C during a sterilization operation. The temperature, however, can impact the efficacy of sterilization. Specifically, the efficacy of the sterilization operation for a given gas concentration generally increases with temperature. By using a higher temperature, the SAL may be achieved with a shorter dwell time. But, certain sterilization loads (e.g., medical devices constructed of certain materials) may be subject to different maximum temperature limits (due to varying heat tolerance) and thus, the maximum temperature limit may be dependent on the sterilization load LD. Thus, in some embodiments, a process variable can be the temperature or a "weighted" concentration of the sterilant gas (based on the gas concentration and the temperature).

For example, in some embodiments, the determination of an effective (or total) SLR can be based on both the gas concentration and the temperature. Referring to the example of Table 1 above, the microorganism resistance at an EO gas concentration of 600 mg/L is a D-value of 2 minutes taken at a reference temperature. If, however, the temperature during the sterilization process is higher than the reference temperature, then the D-value may be greater than 2 minutes. Conversely, if the temperature is lower, then the D-value may be less than 2 minutes. In some embodiments, the localized temperature can be accounted for based on the equation:

$$D\text{-value} = D\text{-value}(ref) \times 2^{\wedge}((T - Tref)/10)$$

Where D-value is the resulting D-value that is calculated based on the reference D-value. T is the actual temperature and Tref is the reference temperature.

The flow of gas (e.g., sterilant gas or process gas) within or out of the sterilization chamber SC and maintaining the desired concentrations during a sterilization operation are impacted by the pressure of the sterilization environment ENV. Thus, in some embodiments, a process variable can be the pressure or a "weighted" concentration of the sterilant gas (based on the gas concentration and the pressure).

As shown in FIGS. 2-5, the sensor assemblies 1100, the system 1000, and the methods here can be used in conjunction with a stack or other arrangement of multiple sterilization targets and/or containers of sterilization targets. Specifically, the example shown includes two pallets (or racks; shown in the broken lines) holding the sterilization targets $ST_1$, $ST_2$, $ST_3$, $ST_4$, $ST_5$, and $ST_6$. In some sterilization operations, the sterilization load LD (the pallets with the sterilization targets) can occupy up to 80% of the volume within the sterilization chamber SC. In other operations, the sterilization load LD can occupy up to 60% of the volume within the sterilization chamber SC (e.g., between 30% and 60%). As shown, the sensor assemblies are sized and configured to be placed in any suitable positions within the sterilization chamber. For example, the sensor assemblies 1100 can be separated from the walls of the sterilization chamber SC and can have an absence of an electrical coupling to any external power source (e.g., line power, an external battery, and/or a power supply of the sterilization chamber SC). Said another way, in some embodiments, the sensor assembly 1100 (and any of the sensor assemblies described herein) can be stand-alone devices that include all necessary components, power supplies, substances, and subassemblies to perform any of the gas sensing methods described herein. Such stand-alone devices do not require any external instrument to manipulate or otherwise process the gas samples to be measured, and do not require any connection to an external power source to complete the methods described herein. Thus, the sensor assemblies described herein can be fully-contained and upon being placed into the sterilization environment ENV, the sensor assembly can be actuated to perform the environmental monitoring described herein.

For example, sensor assemblies 1100A and 1100C are positioned at the chamber level (away from or outside of the sterilization load LD) near the EO gas input and the process gas input. Sensor assemblies 1100B and 1100D are positioned at the chamber level (away from or outside of the sterilization load LD) near the evacuation outlet. Sensor assemblies 1100E-1100H are positioned within the sterilization load LD or at least partially surrounded by sterilization targets ST. Similarly stated, the sensor assemblies 1100E-1100H are spatially distributed within the sterilization load.

Referring to FIG. 1, the system 1000 can optionally include a display monitor 1430 that is operably coupled to the system controller 1400. In some embodiments, the display monitor 1430 and the system controller 1400 can be integrated into single computer. In other embodiments, the display monitor 1430 can be a separate device that is spaced apart from (but operationally coupled to) the system controller 1400. The display monitor 1430 can be any suitable monitor or screen that displays visual elements, such as the graphical representations of the spatial distribution of variables described herein. The display monitor 1430 can be a touch screen (of a smart mobile phone, tablet, or other device) upon which a series of graphical user interface elements (e.g., windows, icons, input prompts, graphical buttons, data displays, notification, or the like) can be displayed. In other embodiments, the display monitor 1430 need not be a screen (e.g., LCD or other screen), but can instead be a display having one or more LED that produce basic outputs (e.g., blinking, different colors, etc.) to produce an indication as described herein. In some embodiments, the system controller 1400 can include or be operably coupled to multiple display monitors. For example, one display monitor 1430 can be a tablet or portable device that a user can bring into or near the sterilization chamber when placing the sensor assemblies 1100 therein and a another display monitor 1430 can be a larger monitor that is better suited to present the graphical representation (e.g., contour plots) for evaluation and control purposes described herein.

The system controller 1400 can optionally be operatively coupled to a remote device 1402. The remote device 1402 can be a portable monitor, a user's smart phone or other device to relay information in accordance with the methods described herein. The remote device 1402 can be coupled to the system controller 1400 via a network 1401. The network 1401 can be a piconet, the Internet, an intranet, a local area network (LAN), a wide area network (WAN), a virtual network, a telecommunications network, any other suitable communication system and/or combination of such networks. The network 1401 can be implemented as a wired and/or wireless network.

The system controller 1400 can be any suitable computing device or set of devices to perform the functions described herein. In some embodiments, the system controller 1400 can be a specialized sterilization chamber monitoring and control system. The system controller 1400 includes a processor 1410, a memory 1411, and a network interface 1416. The system controller 1400 also optionally includes an input/output module 1415, a sensor module 1412, an assurance module 1414, and a mapping (or graphics) module 1413. Although shown as including each of the input/output module 1415, the sensor module 1412, the assurance module 1414, and the mapping module 1413, in other embodiments, the system controller 1400 need not include all (or any) of these modules. Moreover, although shown as including a series of components within one device, in other embodiments, the system controller 1400 can include certain portions in one device (and at one location) and other portions in another device (and at another location). For example, in some embodiments, the system controller 1400 can include input/output module 1415 in one device near the sterilization chamber (e.g., for ease of being coupled to the sensor assemblies 1100) and one or more of the application modules (e.g., the assurance module 1414) in a second, separate device that is remotely located.

The processor 1410, and any of the processors described herein, can be any suitable processor for performing the methods described herein. In some embodiments, processor 1410 can be configured to run and/or execute application modules, processes and/or functions associated with the system controller 1400. For example, the processor 1410 can be configured to run and/or execute each of the input/output module 1415, the sensor module 1412, the assurance module 1414, the mapping module 1413, and/or any of the other modules described herein, and perform the methods associated therewith. The processor 1410 can be, for example, a Field Programmable Gate Array (FPGA), an Application Specific Integrated Circuit (ASIC), a Digital Signal Processor (DSP), and/or the like. The processor 1410 can be configured to retrieve data from and/or write data to memory, e.g., the memory 1411. In some embodiments, the processor 1410 can cooperatively function with the network interface 1416 and/or execute instructions from code to provide signals to communicatively couple the system controller 1400 to the network 1401 and the remote device 1402.

The memory 1411 can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. In some embodiments, the memory 1411 stores instructions to cause the processor 1410 to execute modules, processes and/or functions associated with the system controller 1400. For example, the memory 1411 can store instructions to cause the processor 1410 to execute one or more of the input/output module 1415, the sensor module 1412, the assurance module 1414, the mapping module 1413, and perform the methods associated therewith.

The input/output module 1415 can be a hardware and/or software module (stored in memory 1411 and/or executed in the processor 1410). The input/output module 1415 is configured to receive one or more inputs related to a sterilization operation and produce one or more outputs (e.g., indications, error codes, control signals, or the like) to facilitate monitoring and/or control of the sterilization operation. The input/output module 1415 can receive the inputs in any suitable manner. For example, in some embodiments, the input/output module 1415 can receive one or more inputs in response to an input prompt displayed on the display monitor 1430. For example, in some embodiments, inputs related to the sterilization load LD (e.g., number of sterilization targets, contents of the sterilization targets, specific limits associated with the sterilization targets, etc.) or the desired sterilization operation (e.g., the size and layout of the sterilization chamber SC, the desired time periods, the amount of sterilant gas to be used, etc.) can be entered in response to prompts presented via an input menu. In other embodiments, the input/output module 1415 can receive one or more inputs from the remote device 1402 via the network 1401 and the network interface 1416.

In some embodiments, the input/output module 1415 can receive information from or associated with each sensor assembly 1100. For example, as described herein, the system controller 1400 and/or the input/output module 1415 can receive a sensor spatial coordinate for each sensor assembly 1100. In some embodiments, this information can be entered by a user in response to an input prompt displayed on the display monitor 1430. For example, in some embodiments, the system controller 1400 can execute a method (e.g., the method 30 described below) that produces a sensor placement map to assist the user in positioning the sensor assemblies within the sterilization chamber. In such an embodiment, a placement instruction providing an indication for placement of each of the sensor assemblies within the sterilization environment can be produced (via the input/output module 1415 and the display monitor 1430) and the user can enter or confirm the position of the sensor assemblies via one or more responsive prompts.

In some embodiments, information from each sensor assembly 1100 can be received from the sensor assembly controller 1350 of each sensor assembly 1100. For example, as described herein, after a sterilization operation, the self-contained sensor assemblies 1100 can be removed from the sterilization chamber SC and operably coupled to the system controller 1400 (e.g., via a wired or wireless connection). The recorded sensor data (e.g., a set of signals from the gas sensor 1200, a set of signals from the environmental sensor 1250) can be received by the input/output module 1415. Based on this information, the system controller 1400 can generate the spatial distributions, make the desired comparisons (i.e., to various sterility thresholds), and produce the desired indications, as described herein.

The sensor module 1412 can be a hardware and/or software module (stored in memory 1411 and/or executed in the processor 1410). The sensor module 1412 is configured to receive the recorded sensor data (e.g., a set of signals from the gas sensor 1200, a set of signals from the environmental sensor 1250), either directly or via the input/output module 1415. In some embodiments, the sensor module 1412 is configured to contain calibration information associated with the sensors contained within each of the sensor assemblies 1100 and can process the recorded sensor data (e.g., a set of signals recorded at each sampling interval during a sterilization period) using the calibration information to produce one or more process variables or other parameters (e.g., intermediate parameters used to determine the process variables). For example, in some embodiments, the gas concentration sensor 1200 can be a non-dispersive infrared gas concentration sensor, which measures the characteristic infrared absorption peak of ethylene oxide. As described below, such a sensor includes an emitter (e.g., emitter portion 2204) and a detector (e.g., detector portion 2206) that collectively sense a difference between the amount of light radiated by the emitter and the amount of IR light received by the detector, which is proportional to the amount of EO in the detection volume. The signals produced by the gas concentration sensor 1200 and recorded by the sensor-assembly controller 1350 can be a current or low-level voltage. The sensor module 1412 can contain calibration information associated with the gas concentration sensor 1200 and can produce a raw gas concentration result based on the calibration information and information received. Similarly, the sensor module 1412 can contain calibration information associated with the environmental sensor(s) 1250.

The mapping module 1413 can be a hardware and/or software module (stored in memory 1411 and/or executed in the processor 1410). As described in more detail herein, the mapping module 1413 is configured to generate a spatial distribution of the process variable(s) during the sterilization period and produce a graphical representation of the spatial distribution. The graphical representation can be displayed via the display monitor 1430 to facilitate monitoring and/or control of the sterilization operation.

In some embodiments, the mapping module 1413 is configured to produce two-dimensional or three-dimensional spatial distributions of the gas concentration (or a weighted gas concentration, as described above) of the sterilant gas within the sterilization environment ENV. The mapping module 1413 produces the spatial distributions based at least in part on the sensor spatial coordinate and the process variable(s) recorded by each the sensor assemblies 1100, which are taken at a set of sampling intervals over the sterilization period. Thus, the mapping module 1413 produces spatial distributions at various points in time. Said another way, the mapping module 1413 can produce both spatial and temporal distributions of the process variable(s). In some embodiments, the spatial distribution of the process variable(s) can be displayed as a data array (see, e.g., the data arrays shown in FIGS. 7A and 7B). In other embodiments, the spatial distribution of the process variable(s) can be displayed as a series of two-dimensional contour plots (see, e.g., the contour plots shown in FIGS. 8A and 8B). In other embodiments, the spatial distribution of the process variable(s) can be displayed as a three-dimensional contour plot (see, e.g., the contour plot shown in FIG. 10).

The spatial distributions of the process variable(s) can be produced by any suitable algorithm that provides for establishing the distribution based on the known measurements at each sensor location. Such algorithms can include interpolation between adjacent data points (i.e., data from each sensor assembly 1100) and extrapolation to estimate the value of the process variable(s) at locations outside of where the sensor assemblies are placed. In some embodiments, the mapping module 1413 and/or the system controller 1400 can employ an inverse distance weighting algorithm to produce the spatial distributions described herein.

In some embodiments, the mapping module 1413 and/or the system controller 1400 can a produce a graphical representation of a spatial distribution of the sterilization load LD and/or the sterilization targets therein. Similarly stated, in some embodiments, the mapping module 1413 and/or the system controller 1400 can overlay the sterilization load LD onto the plots of the spatial distribution of the process variable(s) (see e.g., FIGS. 9A and 9B). For example, as described herein, the system controller 1400 can receive a target spatial coordinate for each of the sterilization targets ($ST_1$, $ST_2$, $ST_3$, $ST_4$, $ST_5$, and $ST_6$) placed within the sterilization load LD. The target spatial coordinates correspond to a position of the sterilization target within the sterilization environment ENV. Based on this information, the mapping module 1413 can produce an image (e.g., on the display monitor 1430) showing the sterilization load LD along with the spatial distribution of the process variable(s).

In some embodiments, the mapping module 1413 is configured to display one or more indications on the graphical representation to depict a successful sterilization operation (e.g., SAL has been achieved) or an error code to identify potential errors during the sterilization process.

In some embodiments, the mapping module 1413 is configured to adjust the characteristics of the spatial distributions and/or indications that are displayed. Similarly stated, the indications can be presented with different graphical characteristics (e.g., color, opacity, hatching, pattern, blinking of the indication, or the like). For example, in some embodiments any of these items can be displayed with an opacity such that portions of the underlying sterilization target(s) can be viewed. In other embodiments, a region where the process variable is above a sterility threshold (or standard) can be displayed with a first color and a first opacity such that the sterilization target(s) can be viewed, while a region where the process variable is below a sterility threshold (or standard) can be displayed with a second color and a second opacity.

The assurance module 1414 can be a hardware and/or software module (stored in memory 1411 and/or executed in the processor 1410). The assurance module 1414 is configured to compare at least a portion of the spatial distribution of the process variable(s) to a sterility threshold or a process standard and then produce an indication based on the comparison. In this manner, the assurance module 1414 can provide information about the efficacy of the sterilization operation (in the form of indications via the display monitor 1430 or sent to the remote device 1402). For example, on a condition that the spatial distribution of the process variable (e.g., sterilant gas concentration) is less than the sterility threshold for a specified portion of the sterilization period, a first indication can be produced specifying that the sterilization operation was not effective and the sterilization load should not be shipped. Conversely, on a condition that the spatial distribution of the process variable (e.g., sterilant gas concentration) is greater than the sterility threshold for a specified portion of the sterilization period, a second indication can be produced specifying that the sterilization operation was effective and the sterilization load is approved for shipment. Because the processing of the data from each of the sensor assemblies can be completed soon after the sterilization operation is completed the assurance module 1414 and the methods described herein can enable a significant reduction in the overall cycle time (e.g., as compared to procedures that require microbiological testing (e.g., spore strips) to demonstrate sterility.

In some embodiments, the assurance module 1414 can determine a minimum time threshold based on the process variable(s) recorded by the sensor assemblies at each sample interval. As described above, because achieving the SAL is generally a function of the process variable(s) (e.g., gas concentration, humidity, etc.) and the dwell time, the assurance module can determine a minimum time required to achieve the SAL based on the information. As described above, the assurance module 1414 can determine an effective (or total) SLR for a sterilization process at each location within the sterilization chamber SC. Then, the system can produce an indication (e.g., via the display monitor 1430) associated with the minimum time threshold.

In some embodiments, the system controller 1400 can include a sensor placement module (not shown in FIG. 1). The sensor placement module can be a hardware and/or software module (stored in memory 1411 and/or executed in the processor 1410) that determines a target number of sensor assemblies (and the target spatial coordinates for each) that should be placed within the sterilization environment ENV. This determination can be based on the spatial distribution of the load and the spatial information associated with the sterilization chamber SC. For example, if the sterilization load LD includes a number of sterilization targets with spaces and voids therebetween then the desired number of sensor assemblies may be greater than if the sterilization load was small an only contained a small number of sterilization targets. In some embodiments, the sensor placement module can produce a placement instruction providing an indication for placement of each of the sensor assemblies within the sterilization environment ENV.

Figure 6:
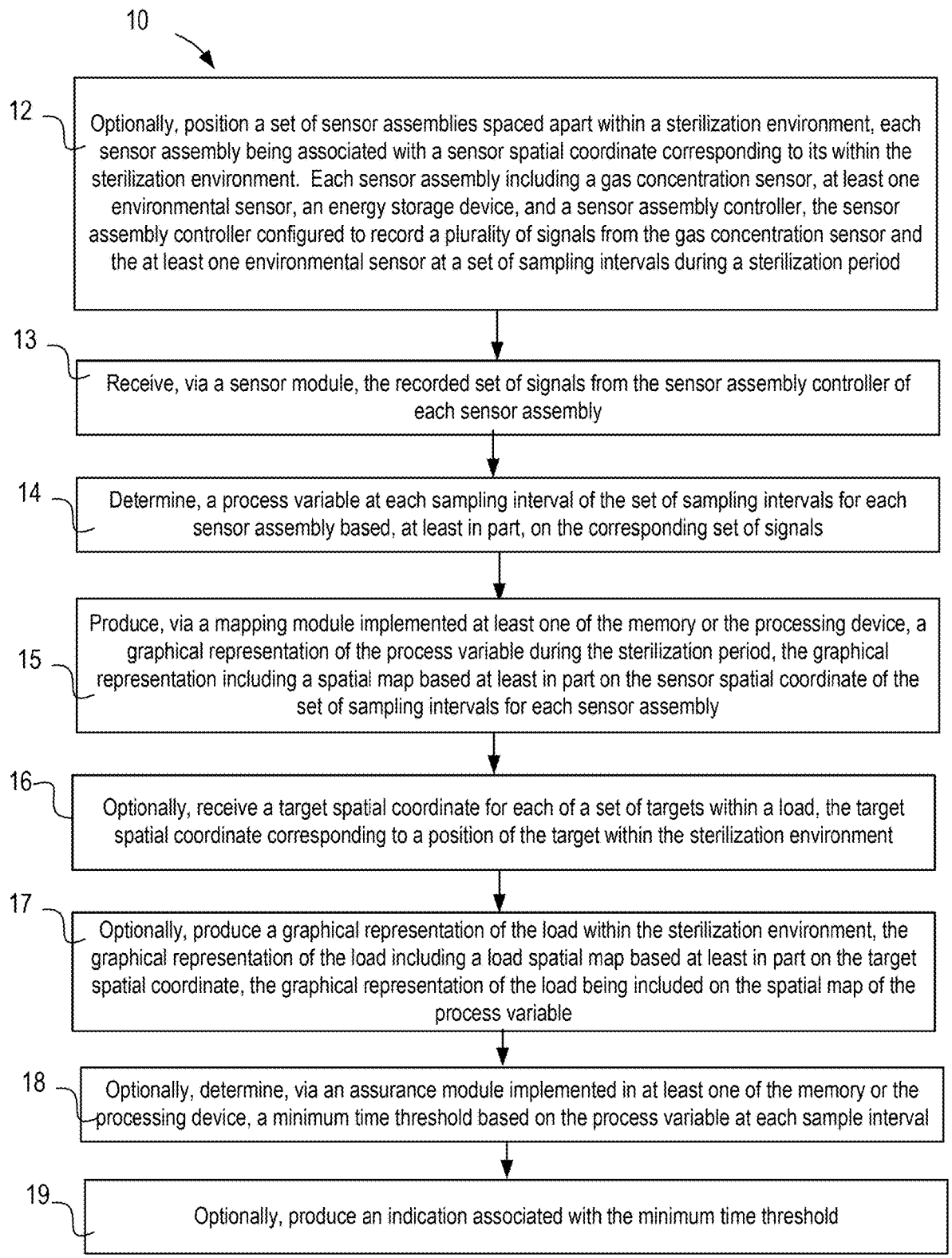
FIG. 6 is a flow chart of a method for monitoring a gas sterilization process, according to an embodiment.

In some embodiments, any application modules and/or other portions of the system controller 1400 can be operable to perform any of the methods described herein. For example, FIG. 6 is a method 10 of monitoring a gas sterilization process via a sterilization monitoring system, according to an embodiment. The method 10 can be performed by the system 1000 described above, or any other system described herein. The method 10 is described in conjunction with the illustrations in FIGS. 8A-11, which show example graphical representations produced (i.e., that can be displayed on the display monitor 1430). The method 10 optionally includes positioning a set of sensor assemblies spaced apart within a sterilization chamber or environment, at 12. Each sensor assembly of the plurality of sensor assemblies includes a gas concentration sensor, at least one environmental sensor, an energy storage device, and a sensor assembly controller. The sensor assemblies can be any of the sensor assemblies described herein (e.g., the sensor assemblies 1100). Specifically, the sensor assembly controller is implemented in at least one of a memory or a processing device that contains a recorded set of signals from the gas concentration sensor and the at least one environmental sensor associated with the sterilization environment. The set of signals is taken at a series of sampling intervals during a sterilization period. Additionally, each sensor assembly is associated with a sensor spatial coordinate corresponding to a position of the sensor assembly within the sterilization environment ENV.

In some embodiments, the optional placing of the sensor assemblies within the sterilization chamber and/or the sterilization environment is facilitated by the system. For example, in some embodiments, the system can produce a placement instruction providing an indication for placement of each of the sensor assemblies within the sterilization environment (see, e.g., the method 30 described below). In other embodiments, the sensor assemblies can be pre-positioned within the sterilization chamber or environment.

The method 10 includes receiving, via a sensor module implemented in at least one of a memory or a processing device, the recorded set of signals from the sensor assembly controller of each sensor assembly, at 13. The recorded set of signals from each sensor assembly can be received by (or input to) the system and/or the system controller by any suitable means. For example, in some embodiments, at the conclusion of the sterilization operation, each of the sensor assemblies can be removed from the sterilization chamber and operatively coupled to the system controller. Because of the hazardous nature that can exist within the sterilization environment, a sensor assembly can include a data port be positioned within an internal chamber that is sealed during the sterilization operation. Thus, after the sterilization operation is completed the data port can be accessed (e.g., by removing an end cap) and operatively coupling the sensor assembly to the system controller (see e.g., FIG. 19). The data port can be operatively coupled to the sensor assembly by a wired or wireless connection. Data and/or signals stored in the sensor assembly controller can then be received by the system controller via the data port.

A process variable at each sampling interval is determined for each sensor assembly, at least in part, on the corresponding set of signals received, at 14. As described above, the process variable can be based on a concentration of a sterilant gas and at least one of a temperature, a humidity, or a pressure within the sterilization environment.

The method 10 further includes producing, via a mapping module implemented at least one of the memory or the processing device, a graphical representation of the process variable during the sterilization period, at 15. The graphical representation includes a spatial map based at least in part on the sensor spatial coordinate associated with each sensor assembly. In some embodiments, the graphical representation of the spatial distribution of the process variable during the sterilization period is a data array. In some embodiments, the graphical representation includes the set of spatial maps, each of which is associated with a corresponding sampling interval. For example, FIGS. 8A and 8B depict data arrays of a spatial distribution of two process variables. FIG. 8A shows a data array of a first process variable ($PV_A$) and second process variable ($PV_B$) taken at a first time (time=t1). FIG. 8B shows a data array of the first process variable ($PV_A$) and the second process variable ($PV_B$) taken at a second time (time=t2). The data arrays shows the values of the two process variables at a set of different spatial coordinates (X, Y, Z). As described above, the spatial distribution can be produced by any suitable algorithm that uses interpolation, extrapolation, smoothing features, and/or error adjustments to produce the spatial distribution of the process variable(s).

Figure 9A:
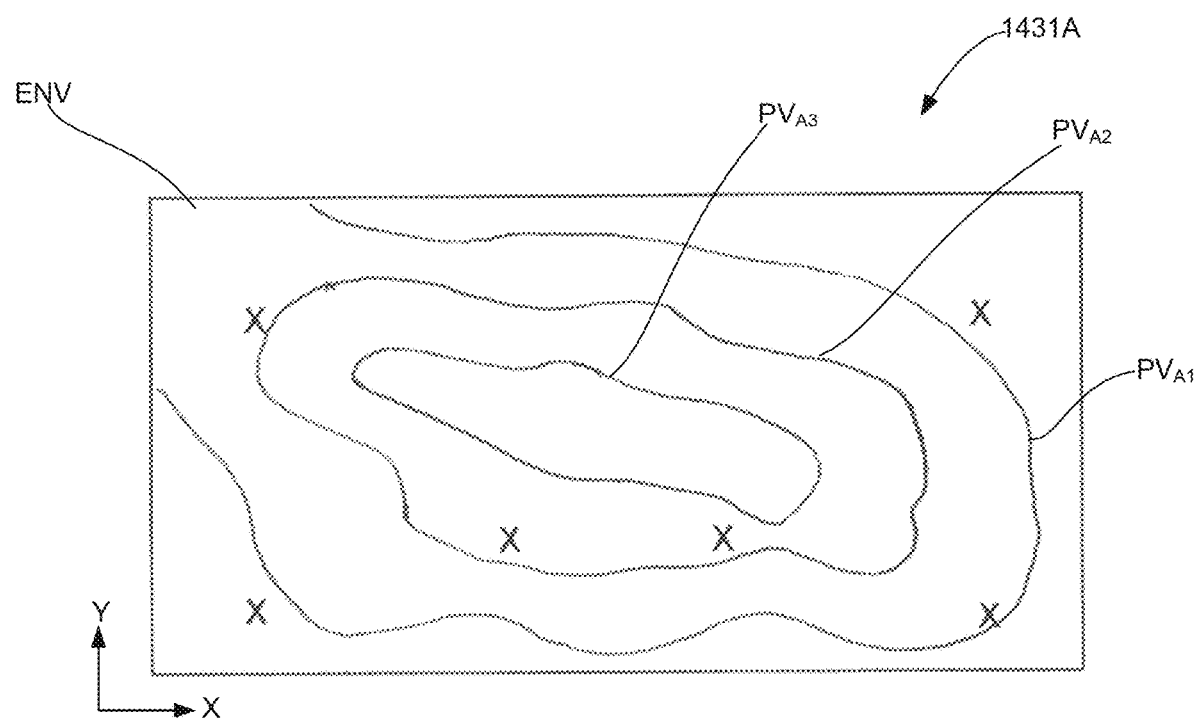
FIGS. 9A and 9B depict two-dimensional contour plots of a spatial distribution of a process variable at a first time (FIG. 9A) and a second time (FIG. 9B), produced via a method according to an embodiment by the system shown in FIG. 1.
Figure 9B:
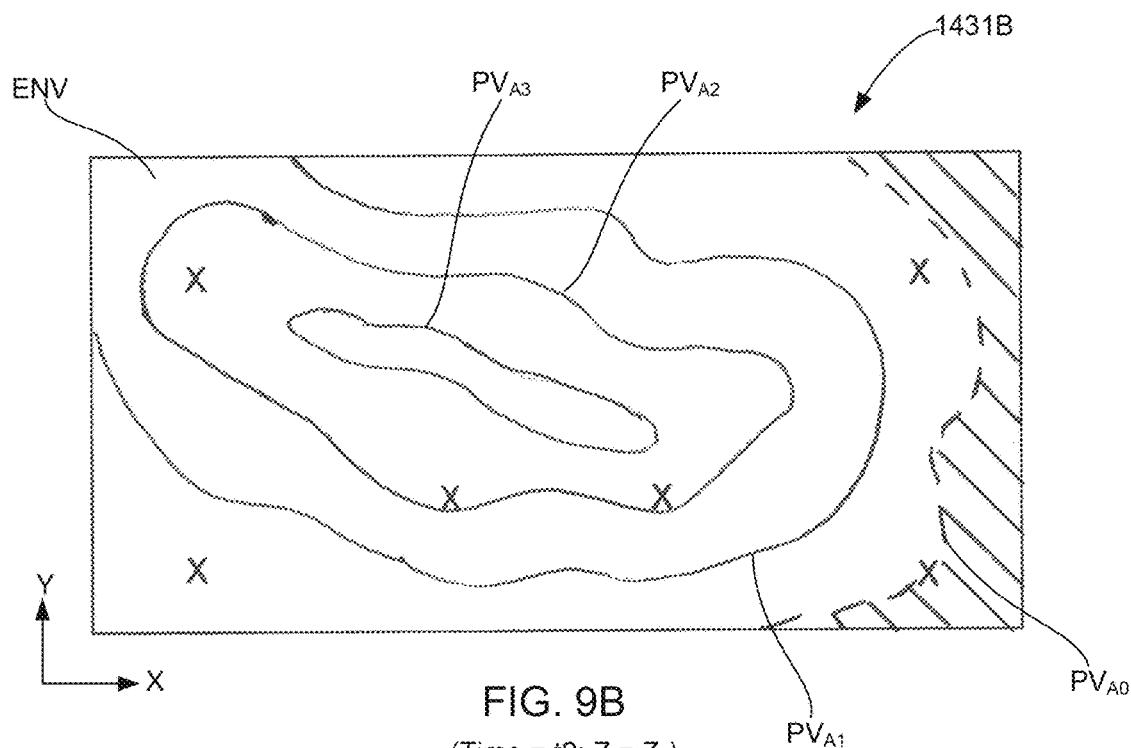

In other embodiments, the graphical representation of the spatial distribution of the process variable during the sterilization period is a contour plot that includes lines representing different magnitudes of the process variable. In some embodiments, the contour plots can be two-dimensional plots. For example, FIGS. 9A and 9B depict two-dimensional contour plots 1431A and 1431B, respectively, showing a spatial distribution of a process variable within the sterilization environment ENV. FIG. 9A shows a contour plot of a first process variable ($PV_A$) in the X, Y plane (at a Z value of $Z_1$) taken at a first time (time=t1). FIG. 9B shows a contour plot of the first process variable ($PV_A$) in the X, Y plane (at a Z value of $Z_1$) taken at a second time (time=t2). FIGS. 9A and 9B show the location of the sensor assemblies with an "X" and the contour lines are lines of a constant magnitude for the process variable $PV_A$. In other embodiments, however, the location of the sensor assemblies need not be displayed. FIG. 9A shows three magnitudes for the process variable $PV_A$ (identified as $PV_{A1}$, $PV_{A2}$, and $PV_{A3}$). As one example, the process variable $PV_A$ can be a sterilant gas concentration with the magnitudes being in order increasing concentration. For example, the magnitude $PV_{A1}$ can correspond to a concentration of 250 mg/L, the magnitude $PV_{A2}$ can correspond to a concentration of 350 mg/L, and the magnitude $PV_{A3}$ can correspond to a concentration of 450 mg/L. $PV_{A2}$, and $PV_{A3}$). FIG. 9B shows four magnitudes for the process variable $PV_A$ (identified as $PV_{A0}$, $PV_{A1}$, $PV_{A2}$, and $PV_{A3}$). For example, the magnitude $PV_{A0}$ can correspond to a concentration of 150 mg/L. Thus, FIG. 9B, shows a greater spatial gradient of the sterilant gas concentration. As described herein, the graphical representations can assist in monitoring and determining whether the sterilization process was effective.

Figure 10A:
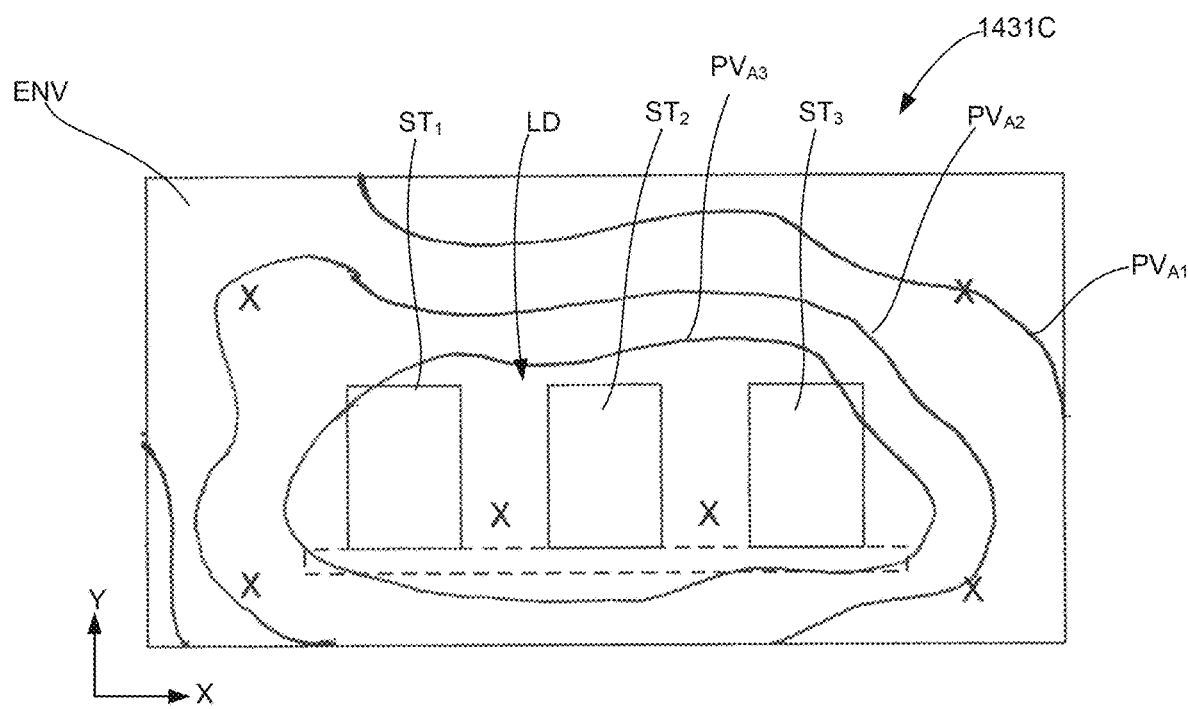
FIGS. 10A and 10B depict contour plots of a spatial distribution of a process variable along with an overlay of the target load at a first time (FIG. 10A) and a second time (FIG. 10B), produced via a method according to an embodiment by the system shown in FIG. 1.
Figure 10B:
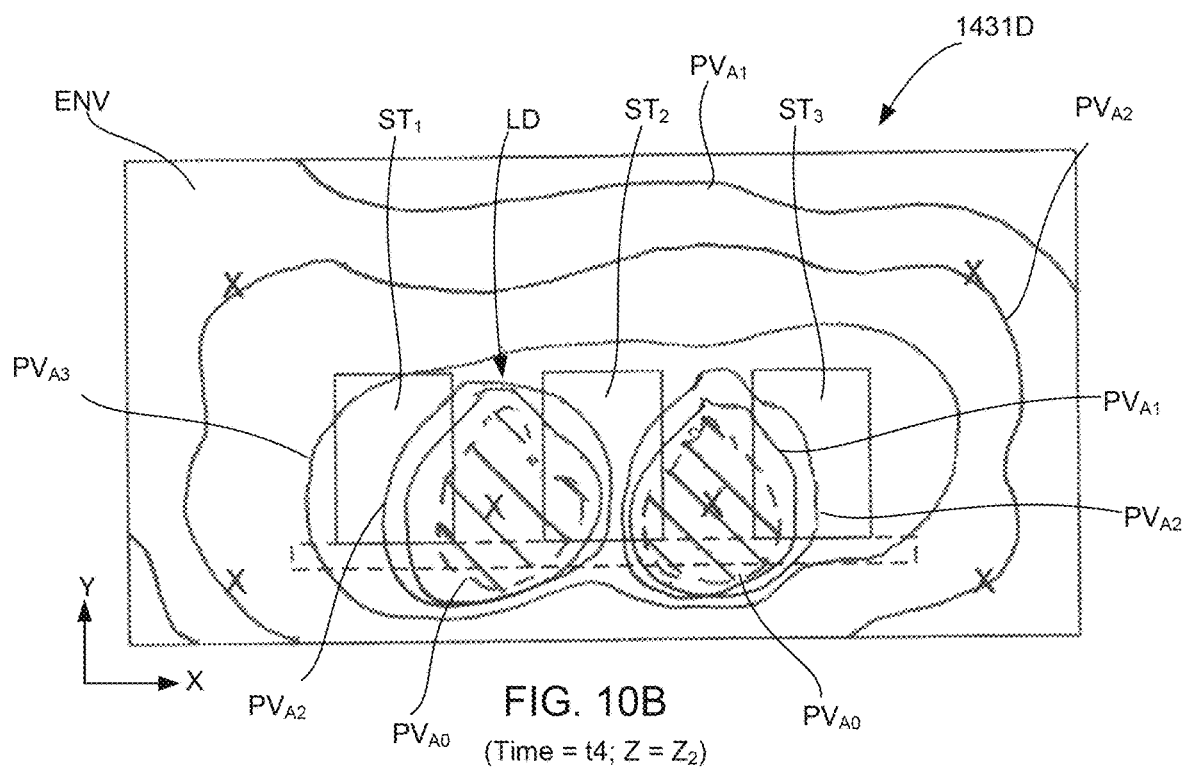
Figure 11:
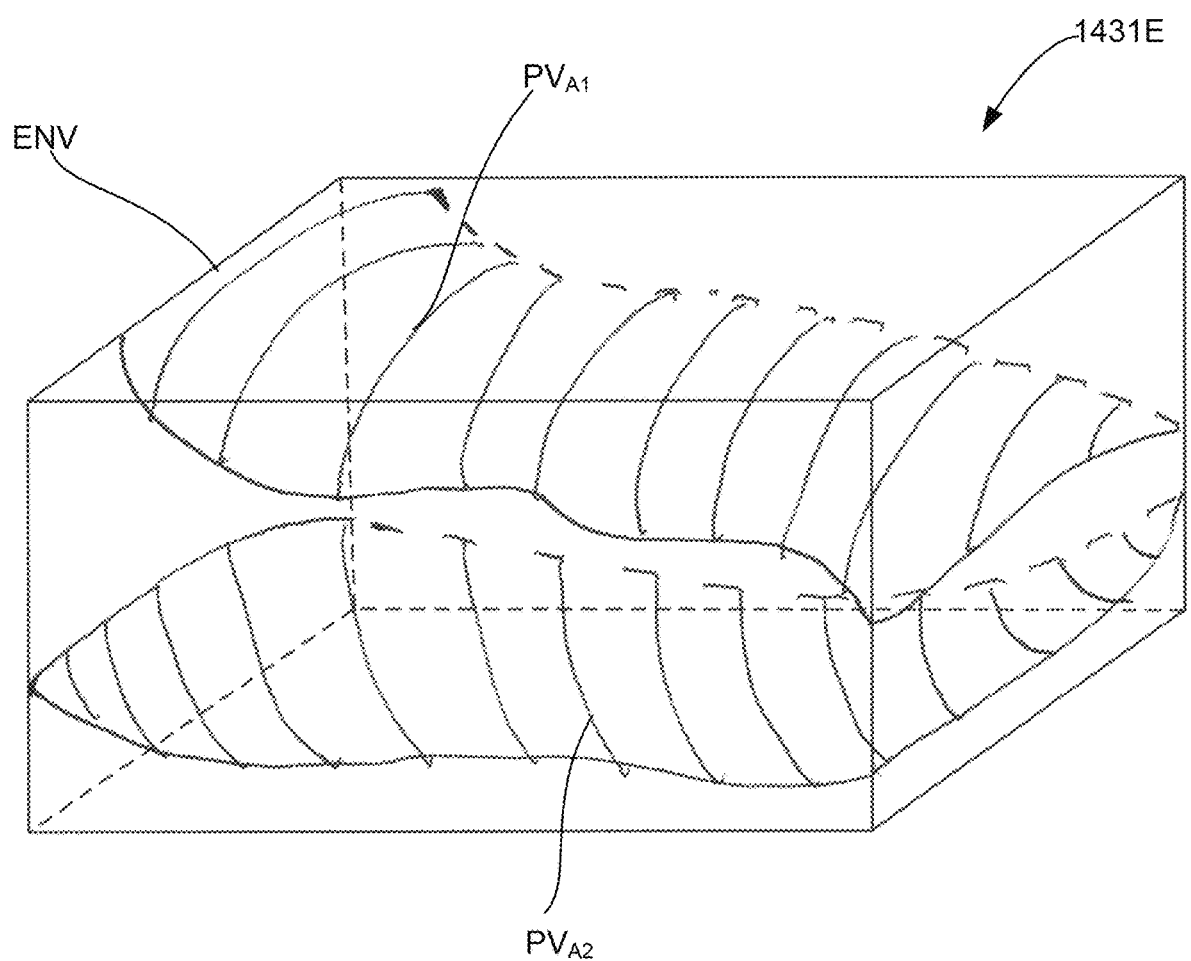
FIG. 11 depicts a three-dimensional contour plot of a spatial distribution of a process variable, produced via a method according to an embodiment by the system shown in FIG. 1.

In some embodiments, the method 10 can optionally include receiving a target spatial coordinate for each of a set of targets within a load, at 16. The target spatial coordinate correspond to a position of the each of the targets within the sterilization environment. The method can further optionally produce a graphical representation of the load within the sterilization environment, at 17. The graphical representation of the load includes a load spatial map based at least in part on the target spatial coordinate and the graphical representation of the load is included (i.e., overlayed) on the spatial map of the process variable. For example, FIGS. 10A and 10B depict two-dimensional contour plots 1431C and 1431D, respectively, showing a spatial distribution of a process variable along with a graphical representation of the sterilization targets within the sterilization environment ENV. FIG. 10A shows a contour plot of a first process variable ($PV_A$) in the X, Y plane (at a Z value of $Z_2$) taken at a time=t3. FIG. 10B shows a contour plot of the first process variable ($PV_A$) in the X, Y plane (at a Z value of $Z_2$) taken at a time=t4. FIGS. 10A and 10B show the location of the sensor assemblies with an "X" and the contour lines are lines of a constant magnitude for the process variable $PV_A$. FIGS. 10A and 10B also show the sterilization load LD including sterilization targets $ST_1$, $ST_2$, and $ST_3$. x sterilization targets ST1, ST2, and ST3)

FIG. 10A shows three magnitudes for the process variable $PV_A$ (identified as $PV_{A1}$, $PV_{A2}$, and $PV_{A3}$). As one example, the process variable $PV_A$ can be a sterilant gas concentration with the magnitudes being in order increasing concentration. For example, the magnitude $PV_{A1}$ can correspond to a concentration of 250 mg/L, the magnitude $PV_{A2}$ can correspond to a concentration of 350 mg/L, and the magnitude $PV_{A3}$ can correspond to a concentration of 450 mg/L. $PV_{A2}$, and $PV_{A3}$). FIG. 10B shows four magnitudes for the process variable $PV_A$ (identified as $PV_{A0}$, $PV_{A1}$, $PV_{A2}$, and $PV_{A3}$). For example, the magnitude $PV_{A0}$ can correspond to a concentration of 150 mg/L. Thus, FIG. 10B, shows a greater spatial gradient of the sterilant gas concentration. In particular, FIG. 10B shows that the concentration of the sterilant gas generally increases towards the middle of the sterilization environment and away from the edges of the sterilization chamber SC. This can be due, for example, to fluid motion within the sterilization chamber, the location of the sterilant gas input and/or the evacuation output (see, e.g., FIG. 2), or other factors that can lead to spatial changes in the sterilant gas concentration within the sterilization environment. FIG. 10B also shows that in two regions with the load LD (and in particular between the sterilization targets), there is a significant decrease in the sterilant gas concentration (shown by the close proximity of the contour lines, with the concentration decreasing to the level $PV_{A0}$).

In this manner, the graphical representations can assist in monitoring and determining whether the sterilization process was effective. For example, in some embodiments, the graphical representation can include a set of different graphical characteristics (e.g., color, opacity, hatching, pattern, blinking of the indication, or the like), each being associated with a different value of a process variable (e.g., a concentration of the sterilant gas). In some embodiments, different colors can be used to display the calculated effective SLR for each sensor. This can allow a user to quickly ascertain whether a process variable is at or below a desired threshold. In some embodiments, the graphical representation can include an indication on a condition that the spatial distribution of the process variable is less than the sterility threshold for the specified portion of the sterilization period. For example, the portion of the sterilization period can be an exposure phase of the sterilization period. Referring to FIGS. 8A and 8B, this portion can be the time periods enclosed by the dashed lines. If a process variable within the spatial map (or a portion of the spatial map) is below the sterility threshold (e.g., a minimum gas concentration, a minimum humidity, or the like), the method optionally include producing an indication to alert the user that the SAL may not have been met. In some embodiments, the method can include generating an error code.

In some embodiments, the indication can be a change in color or fill of a portion of the display. Referring to FIGS. 9B and 10B, if a process variable within the spatial map (or a portion of the spatial map) is below the sterility threshold (e.g., a minimum gas concentration, a minimum humidity, or the like), the method optionally include producing a color change, change in opacity or other optical indication (which is shown as cross-hatching of the areas that are at or below the level $PV_{A0}$).

In some embodiments, the method 10 can optionally include determining, via an assurance module implemented in at least one of the memory or the processing device, a minimum time threshold based on the process variable at each sample interval of the plurality of sample intervals, at 18. Further to the description above, because achieving the SAL is generally a function of multiple the process variable(s) (e.g., gas concentration, humidity, etc.) over a set period of time (e.g., the dwell time), the assurance module can determine a minimum time required to achieve the SAL based on the information. For example, in some embodiments, the assurance module can determine the minimum time threshold associated with the exposure phase based on a time-averaged, weighted gas concentration over the spatial map. In other embodiments, the assurance module can determine the effective SLR at each location and display this information within the spatial map or as a separate indication or tabular output. In some embodiments, the minimum time threshold can be determined based on the lowest gas concentration within the spatial map. The method optionally produce an indication (e.g., via the display monitor 1430) associated with the minimum time threshold, at 19.

Figure 7:
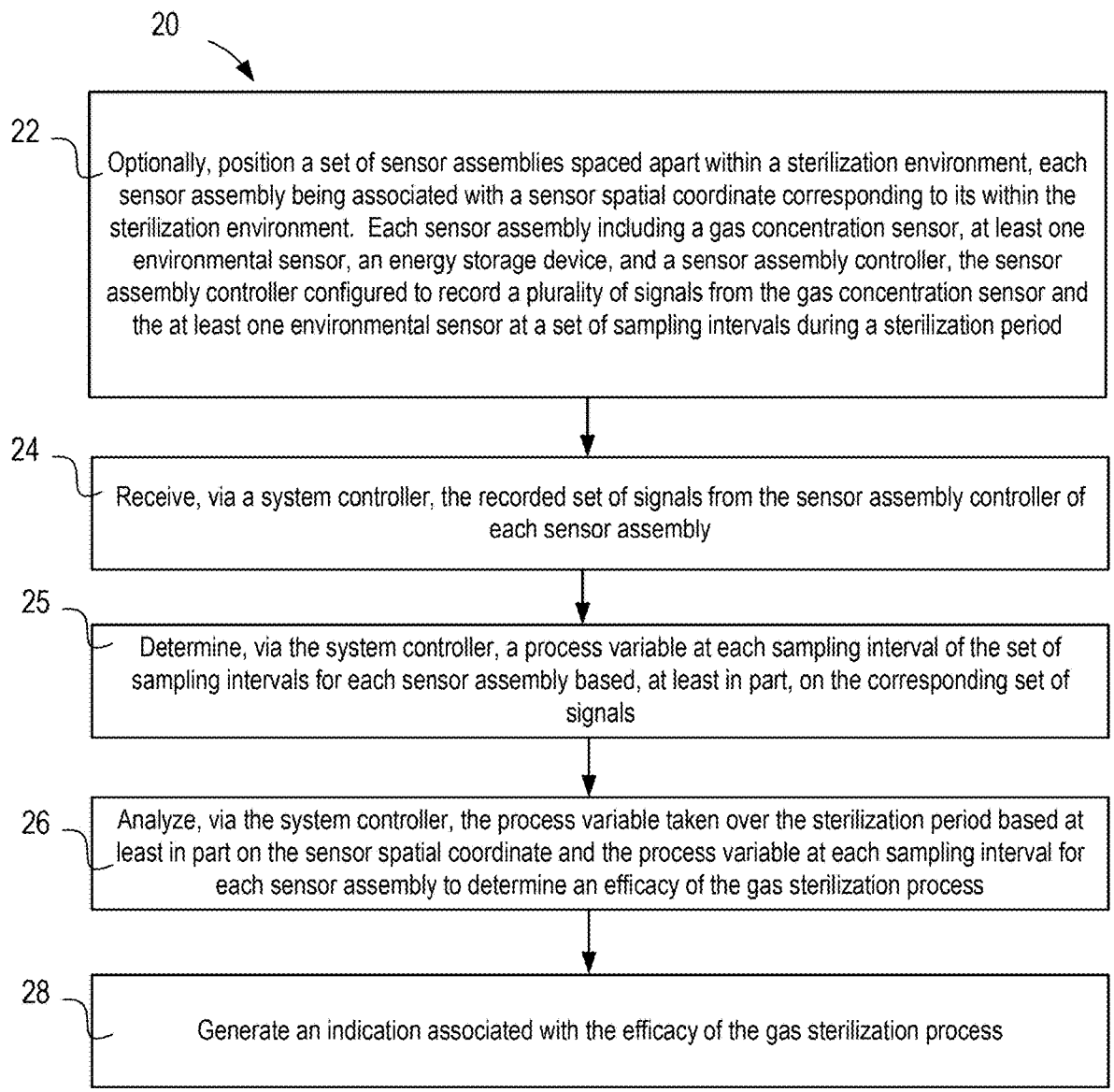
FIG. 7 is a flow chart of a method for monitoring a gas sterilization process, according to an embodiment.

FIG. 7 is a method 20 of monitoring a gas sterilization process via a sterilization monitoring system, according to an embodiment. The method 20 can be performed by the system 1000 described above, or any other system described herein. The method 20 is described in conjunction with the illustrations in FIGS. 8A-11, which show example graphical representations produced (i.e., that can be displayed on the display monitor 1430). The method 20 optionally includes positioning a set of sensor assemblies spaced apart within a sterilization chamber or environment, at 22. Each sensor assembly includes a gas concentration sensor, at least one environmental sensor, an energy storage device, and a sensor assembly controller. The sensor assemblies can be any of the sensor assemblies described herein (e.g., the sensor assemblies 1100). Specifically, the sensor assembly controller is implemented in at least one of a memory or a processing device that contains a recorded set of signals from the gas concentration sensor and the at least one environmental sensor associated with the sterilization environment. The set of signals is taken at a series of sampling intervals during a sterilization period. Additionally, each sensor assembly is associated with a sensor spatial coordinate corresponding to a position of the sensor assembly within the sterilization environment ENV.

In some embodiments, the optional placing of the sensor assemblies within the sterilization chamber and/or the sterilization environment is facilitated by the system. For example, in some embodiments, the system can produce a placement instruction providing an indication for placement of each of the sensor assemblies within the sterilization environment (see, e.g., the method 30 described below). In other embodiments, the sensor assemblies can be pre-positioned within the sterilization chamber or environment.

The method 20 includes receiving, via a sensor module implemented in at least one of a memory or a processing device, the recorded set of signals from the sensor assembly controller of each sensor assembly, at 24. The recorded set of signals from each sensor assembly can be received by (or input to) the system and/or the system controller by any suitable means. For example, in some embodiments, at the conclusion of the sterilization operation, each of the sensor assemblies can be removed from the sterilization chamber and operatively coupled to the system controller. Because of the hazardous nature that can exist within the sterilization environment, a sensor assembly can include a data port be positioned within an internal chamber that is sealed during the sterilization operation. Thus, after the sterilization operation is completed the data port can be accessed (e.g., by removing an end cap) and operatively coupling the sensor assembly to the system controller (see e.g., FIG. 19). The data port can be operatively coupled to the sensor assembly by a wired or wireless connection. Data and/or signals stored in the sensor assembly controller can then be received by the system controller via the data port.

A process variable at each sampling interval is determined for each sensor assembly, at least in part, on the corresponding set of signals received, at 25. As described above, the process variable can be based on a concentration of a sterilant gas and at least one of a temperature, a humidity, or a pressure within the sterilization environment.

The method 20 further includes analyzing, via the system controller, the process variable taken over the sterilization period to determine an efficacy of the gas sterilization process, at 26. The process variable can be analyzed based at least in part on the sensor spatial coordinate and the process variable at each sampling interval for each sensor assembly. In some embodiments, a spatial distribution of the process variable during the sterilization period is produced. In some embodiments, the spatial distribution of the process variable during the sterilization period is a data array (see, e.g., FIGS. 8A and 8B). In other embodiments, the spatial distribution of the process variable during the sterilization period can be represented as a contour plot that includes lines representing different magnitudes of the process variable (see e.g., FIGS. 9A-11).

In some embodiments, the process variable can be compared to a sterility threshold for a specified portion of the sterilization period. The sterility threshold can be, for example, a minimum gas concentration level, a minimum humidity level, or a threshold of any of the process variables described herein (e.g., an effective SLR calculated over a time period or a weighed gas concentration level). The method 20 further includes generating an indication associated with the efficacy of the gas sterilization process, at 28. The efficacy of the gas sterilization process can be based on any of: A) whether the process variable meets a minimum condition at each position within the sterilization environment, B) whether the process variable meets a minimum condition for minimum time period, or C) whether the process variable is within a sterility threshold.

In some embodiments, the portion of the spatial distribution can be a portion that is relevant to determining the efficacy of the sterilization operation. For example, in some instances a sterilization chamber may only be partially filled with sterilization targets, and therefore may include regions within the sterilization chamber that do not contain any sterilization targets. Thus, the portion of the spatial distribution that is compared to the sterility threshold may only be that portion that corresponds to the location of the sterilization targets. In this manner, the system 1000 can improve the monitoring of the sterilization operation by allowing the user to evaluate conditions at the relevant spatial locations within the sterilization chamber and/or sterilization environment.

In some embodiments, the specified portion of the sterilization period includes those sampling intervals that are within a particular portion of the sterilization operation that is relevant to the comparison being made. For example, in some embodiments, the specified portion of the sterilization period includes those sampling intervals that correspond to a conditioning phase of the gas sterilization process. The conditioning phase can include the portion of the sterilization operation that includes the initial removal of the ambient air (e.g., producing vacuum within the sterilization chamber via the evacuation port, see FIG. 2), adjusting a temperature within the sterilization chamber, and/or introduction of other process gases or steam. In some embodiments, the method 20 can optionally include comparing, over the conditioning phase, at least a second portion of the spatial distribution of the process variable to a conditioning standard. The second portion of the spatial distribution can be a spatial location that is of particular relevance to the conditioning phase (e.g., a spatial location near the valved input ports or the valve outlet port) and can be a different portion of the spatial distribution that is evaluated at other portions of the sterilization operation. An error code can be optionally generated on a condition that the second portion of the spatial distribution of the process variable during the conditioning phase is less than the conditioning standard. For example, if the vacuum pressure is not at a level that ensures the efficacy of the process (i.e., the desired vacuum pressure has not been attained), then an error code will be produced.

In some embodiments, the specified portion of the sterilization period includes those sampling intervals that correspond to a gas introduction phase of the gas sterilization process. The gas introduction phase can include the portion of the sterilization operation that includes conveying the sterilant gas into the sterilization chamber (e.g., via the valved input port, see FIG. 2), adjusting a temperature within the sterilization chamber, and/or adjusting the humidity level. In some embodiments, the method 20 can optionally include comparing, over the gas introduction phase, at least a second portion of the spatial distribution of the process variable to a gas-introduction standard. The second portion of the spatial distribution can be a spatial location that is of particular relevance to the gas introduction phase (e.g., a spatial location near the valved input ports or near a remote area or corner of the sterilization chamber) and can be a different portion of the spatial distribution that is evaluated at other portions of the sterilization operation. An error code can be optionally generated on a condition that the second portion of the spatial distribution of the process variable during the gas introduction phase is less than the gas-introduction standard. For example, if a humidity-weighted gas concentration is below a level that ensures the efficacy of the process, then an error code will be produced.

In some embodiments, the specified portion of the sterilization period includes those sampling intervals that correspond to an exposure phase of the gas sterilization process. The exposure phase can include the portion of the sterilization operation that includes the time period during which the sterilization environment is maintained within the sterilization chamber (i.e., the dwell time). In some embodiments, the method 20 can optionally include comparing, over the exposure phase, at least a second portion of the spatial distribution of the process variable to an exposure standard. The second portion of the spatial distribution can be a spatial location that is of particular relevance to the exposure phase (e.g., a spatial location near the sterilization load) and can be a different portion of the spatial distribution that is evaluated at other portions of the sterilization operation. An error code can be optionally generated on a condition that the second portion of the spatial distribution of the process variable during the exposure phase is less than the exposure standard. For example, if a temperature-weighted gas concentration is below a level that ensures the efficacy of the process, then an error code will be produced. For example, if an effective SLR (based on temperature and gas concentration) is below a target SLR level, then an error code will be produced.

In some embodiments, the specified portion of the sterilization period includes those sampling intervals that correspond to an evacuation phase of the gas sterilization process. The evacuation phase can include the portion of the sterilization operation that includes the time period during which the sterilant gas is removed from the sterilization chamber. In some embodiments, the method 20 can optionally include comparing, over the evacuation phase, at least a second portion of the spatial distribution of the process variable to an evacuation standard. The second portion of the spatial distribution can be a spatial location that is of particular relevance to the gas evacuation phase (e.g., a spatial location in a remote portion or corner) and can be a different portion of the spatial distribution that is evaluated at other portions of the sterilization operation. An error code can be optionally generated on a condition that the second portion of the spatial distribution of the process variable during the evacuation phase is less than the evacuation standard. For example, if the amount of gas having been evacuated is below a level that ensures the safety or efficacy of the process (e.g., too much sterilant gas is remaining), then an error code will be produced.

In some embodiments, the specified portion of the sterilization period includes those sampling intervals that correspond to an air wash phase of the gas sterilization process. The air wash phase can include the portion of the sterilization operation that includes the time period during which process gas (e.g., inert gas or dry ambient air) is repeatedly flushed within the sterilization chamber. In some embodiments, the method 20 can optionally include comparing, over the air wash phase, at least a second portion of the spatial distribution of the process variable to an air wash standard. The second portion of the spatial distribution can be a spatial location that is of particular relevance to the air wash phase (e.g., a spatial location in a remote portion or corner) and can be a different portion of the spatial distribution that is evaluated at other portions of the sterilization operation. An error code can be optionally generated on a condition that the second portion of the spatial distribution of the process variable during the air wash phase is less than the air wash standard. For example, if the amount of gas having been evacuated is below a level that ensures the safety or efficacy of the process (e.g., too much sterilant gas is remaining), then an error code will be produced. Monitoring of the aeration wash phases may additionally evaluate the sterilant removal per aeration wash in the various locations of the chamber and help conclude if the number of aeration washes is too few or too many, and may potentially compute an optimal number of aeration washes.

Further in some embodiments, a sterilant gas exposure time is determined for each sensor assembly. The sterilant gas exposure time is based at least in part on the process variable taken over the set of sampling intervals. A sterilant exposure magnitude is determined based on the sterilant gas exposure time and the process variable(s). The method can then include generating a third indication on a condition that the sterilant exposure magnitude is greater than an accumulated threshold.

In some embodiments, the method 20 can optionally include receiving a target spatial coordinate for each of a set of targets within a load. The target spatial coordinate correspond to a position of the each of the targets within the sterilization environment. The method can further optionally generate a spatial distribution of the load within the sterilization environment.

Figure 12:
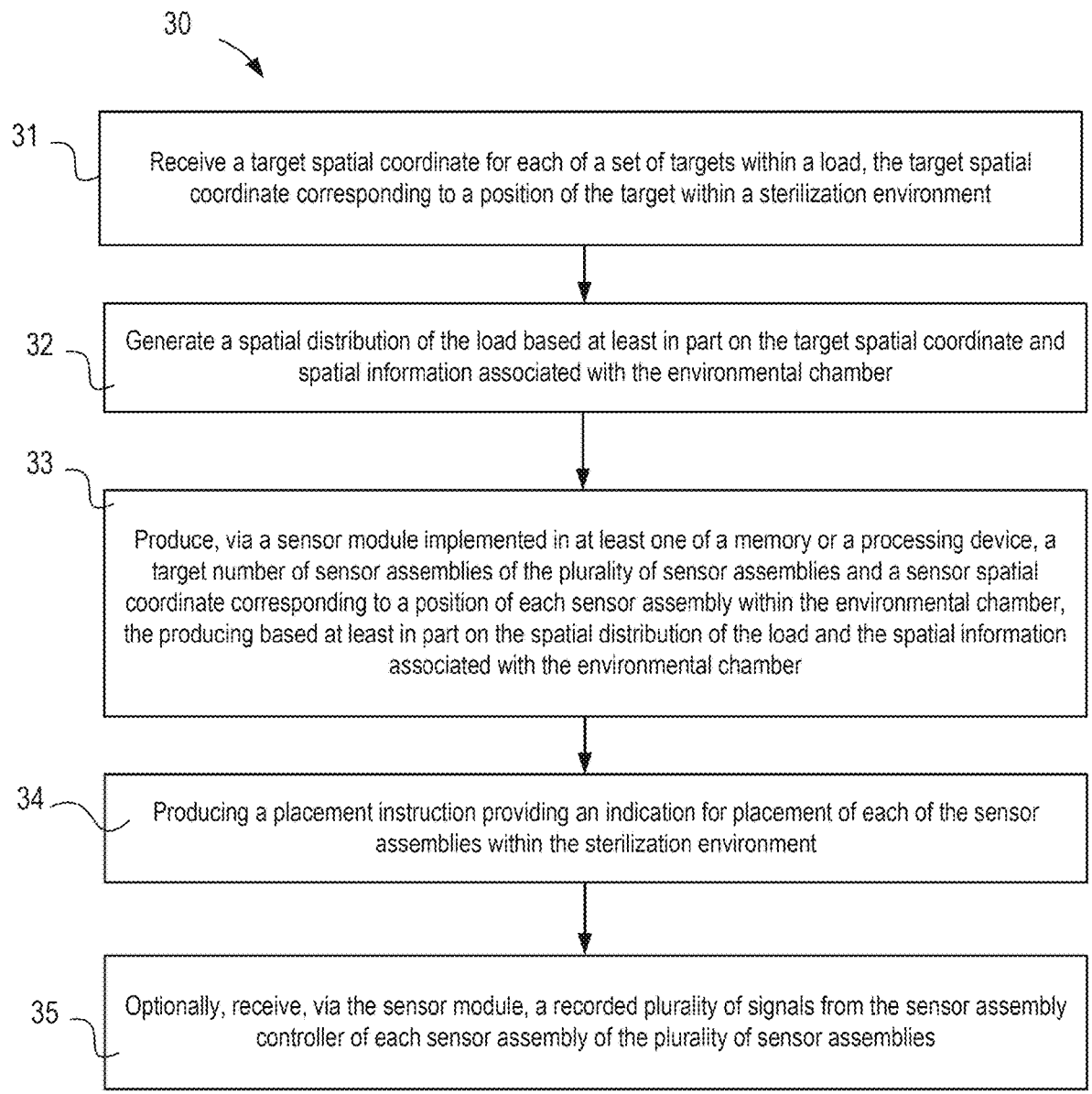
FIG. 12 is a flow chart of a method for monitoring a gas sterilization process, including placement of a set of sensor assemblies, according to an embodiment.

FIG. 12 is a method 30 of monitoring a gas sterilization process via a sterilization monitoring system, according to an embodiment. The method 30 can be performed by the system 1000 described above, or any other system described herein. The method 30 is described in conjunction with the illustrations in FIGS. 13A and 13B, which show example graphical representations produced (i.e., that can be displayed on the display monitor 1430). The method 30 can assist a user in positioning a set of sensor assemblies spaced apart within a sterilization chamber or environment. Each sensor assembly of the plurality of sensor assemblies includes a gas concentration sensor, at least one environmental sensor, an energy storage device, and a sensor assembly controller. The sensor assemblies can be any of the sensor assemblies described herein (e.g., the sensor assemblies 1100).

The method 30 includes receiving a target spatial coordinate for each of a set of targets within a load, at 31. The target spatial coordinate corresponds to a position of the target within the sterilization environment. A spatial distribution of the load is generated based at least in part on the target spatial coordinate and spatial information associated with the sterilization chamber, at 32. The spatial information associated with the sterilization 1 chamber can be, for example, a location of any of a sterilization gas input, an inert gas input, or an evacuation outlet (see, e.g., FIG. 3). The spatial information associated with the sterilization chamber can be a location of a mounting surface within the sterilization chamber. The spatial distribution of the load can include, for example, a separation distance between each of the targets within the load and a characteristic of each of the plurality of targets within the load. The characteristic of the targets can be, for example, a material from which the target is made (e.g., which can correspond to a temperature limit of the target), a packaging material, a type of product (e.g., suture, syringe, catheter, etc.), or other information that can be relevant in determining sensor placement.

The method includes producing, via a sensor module implemented in at least one of a memory or a processing device, a target number of sensor assemblies and a sensor spatial coordinate corresponding to a position of each sensor assembly within the sterilization chamber, at 33. The producing is based at least in part on the spatial distribution of the load and the spatial information associated with the sterilization chamber. The target number of sensor assemblies can, for example, be higher for those sterilization operations that include a large number of sterilization targets or sterilization loads with intricate geometry (e.g., tortuous paths). In such situations, generating an accurate spatial map of the process variables may require having a greater number of sensor assemblies (and data inputs) that would be required for a simpler or smaller sterilization load. The sensor spatial coordinate corresponding to a position of each sensor assembly can also be dependent on the complexity of the geometry of the sterilization load. For example, for certain sterilization loads, the position can be between or within the sterilization targets (see, e.g., FIGS. 2-5).

Figures 13A, 13B:
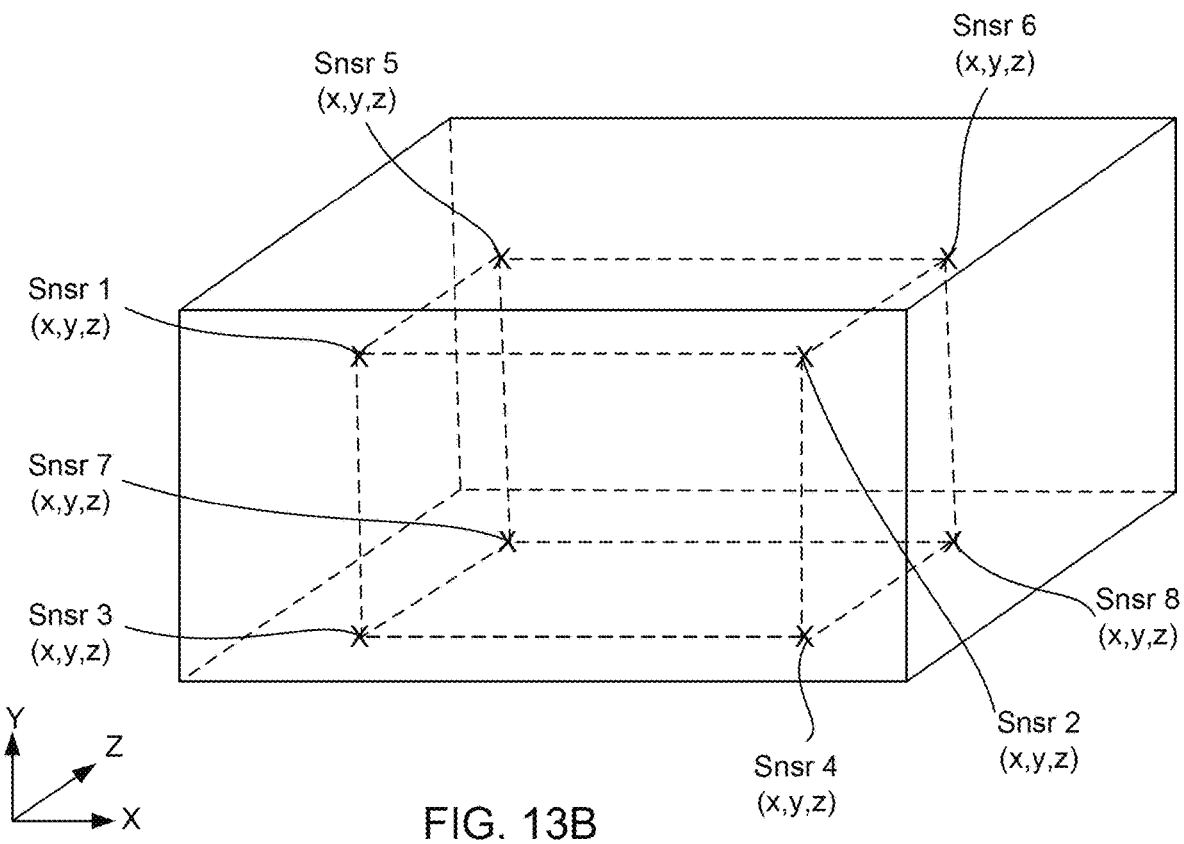
FIGS. 13A and 13B depict a data array (FIG. 13A) and a three-dimensional representation (FIG. 13B) of an indication for placement of the sensor assemblies of the system shown in FIG. 1 within the sterilization environment, produced via a method according to an embodiment by the system shown in FIG. 1.

The method 30 includes producing a placement instruction providing an indication for placement of each of the sensor assemblies within the sterilization environment, at 34. In some embodiments, the placement instruction can be a data array. For example, FIG. 13A shows a sample data array that can be produced indicating the X, Y, and Z coordinates for each sensor assembly to be placed within the sterilization chamber. In some embodiments, the placement instruction can be a graphical representation. For example, FIG. 13B shows a sample three-dimensional graphical representation that can be produced indicating the X, Y, and Z coordinates for each sensor assembly to be placed within the sterilization chamber.

In some embodiments, the system 1000 can facilitate reducing the amount of sterilant gas that is used during a sterilization operation, while still ensuring that the sterilization operation has been effective (i.e., that the SAL has been achieved). Specifically, because some sterilant gases, such as ethylene oxide, can be hazardous, the system 1000 can facilitate reducing the amount of sterilant gas used while ensuring that the SAL has been achieved. For example, the use of the sensor assemblies and methods described herein can facilitate the use of a lesser quantity of ethylene oxide by confirming that the actual concentration of ethylene oxide within the load is sufficient to satisfy the sterilization parameters even at lower concentrations of the sterilant gas within the sterilization chamber. In other words, by recording the actual process variables within the load, the actual process state variables can be correlated to lower concentrations of sterilant gas introduced into the sterilization chamber. Subsequently, the concentration of sterilant gas introduced into the sterilization chamber can be set at a magnitude that establishes the desired process variables within the load at a level sufficient to satisfy the sterilization parameters, and the sterility of the product can be verified via the recorded process variables from the sensor assemblies.

Figure 14:
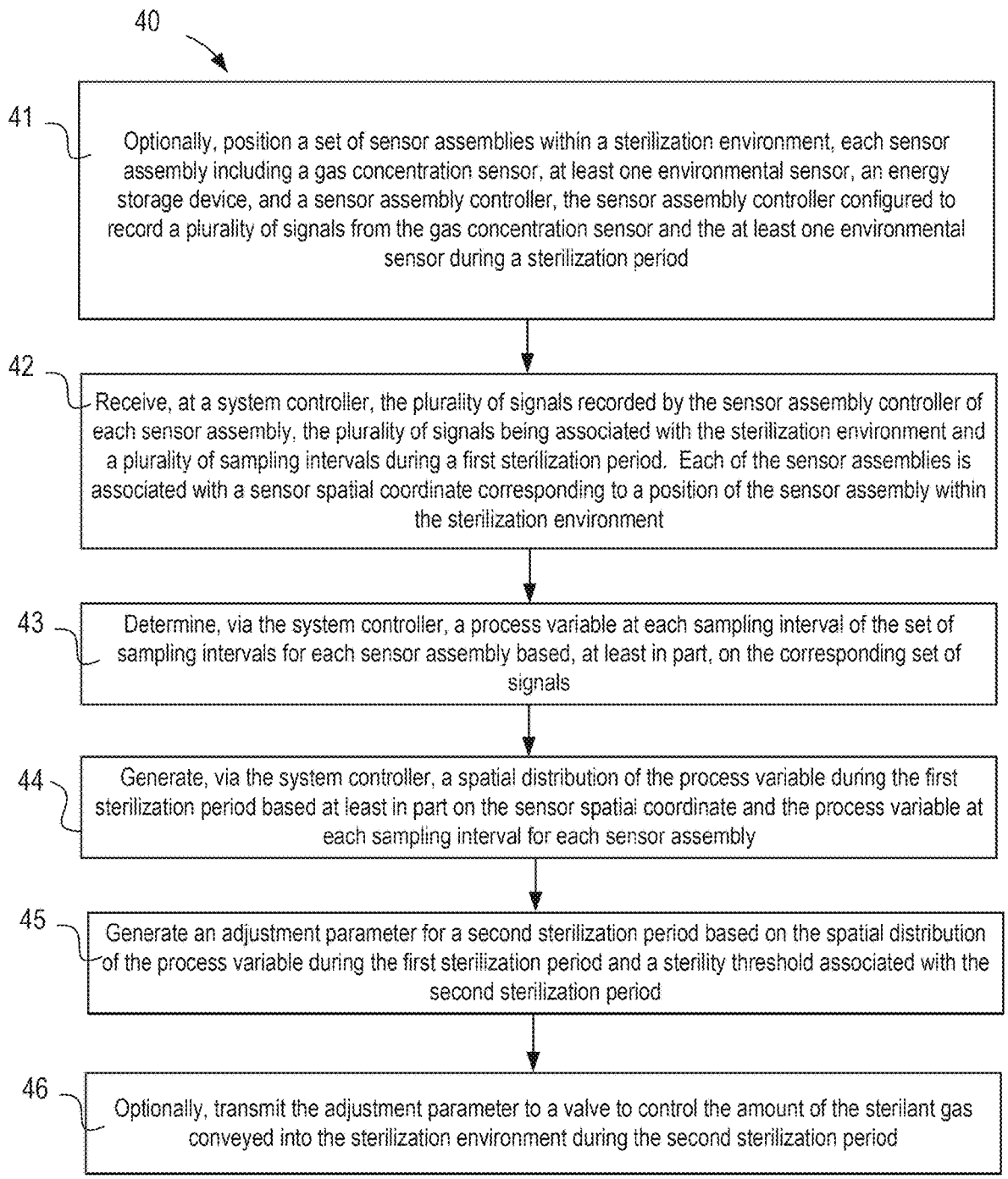
FIG. 14 is a flow chart of a method for adjusting an amount of sterilant gas conveyed into a sterilization environment during a gas sterilization process, according to an embodiment.

For example, FIG. 14 is a flow chart of a method 40 of adjusting an amount of sterilant gas conveyed into a sterilization environment performed via a sterilization monitoring system, according to an embodiment. The method 40 can be performed by the system 1000 described above, or any other system described herein. The system includes comprising a system controller and a set of sensor assemblies. The method 40 can optionally include positioning the sensor assemblies within a sterilization chamber or environment, at 41. Each sensor assembly of the includes a gas concentration sensor, at least one environmental sensor, an energy storage device, and a sensor assembly controller. The sensor assemblies can be any of the sensor assemblies described herein (e.g., the sensor assemblies 1100). Specifically, the sensor assembly controller is implemented in at least one of a memory or a processing device that contains a recorded set of signals from the gas concentration sensor and the at least one environmental sensor associated with the sterilization environment. The set of signals is taken at a series of sampling intervals during a sterilization period. Additionally, each sensor assembly is associated with a sensor spatial coordinate corresponding to a position of the sensor assembly within the sterilization environment ENV.

In some embodiments, the optional placing of the sensor assemblies within the sterilization chamber and/or the sterilization environment is facilitated by the system. For example, in some embodiments, the system can produce a placement instruction providing an indication for placement of each of the sensor assemblies within the sterilization environment (see, e.g., the method 30 described above). In other embodiments, the sensor assemblies can be pre-positioned within the sterilization chamber or environment.

The method 40 includes receiving, receiving, at the system controller, the signals recorded by the sensor assembly controller of each sensor assembly, at 42. The signals are associated with the sterilization environment and taken over the set of sampling intervals during the first sterilization period. Each of the sensor assemblies is associated with its sensor spatial coordinate corresponding to its position within the sterilization environment.

The system controller (e.g., the system controller 1400) then determines a process variable at each sampling interval for each sensor assembly based, at least in part, on the corresponding signals, at 43. The process variable(s) determined can be any of the process variables described herein (e.g., a gas concentration level). In some embodiments, the process variable is based on a concentration of a sterilant gas and at least one of a temperature, a humidity, or a pressure within the sterilization environment during the first sterilization period.

A spatial distribution of the process variable associated with the first sterilization period is generated by the system controller, at 44. The spatial distribution is based at least in part on the sensor spatial coordinate and the process variable at each sampling interval for each sensor assembly. The spatial distribution can be any of the spatial distributions disclosed herein and can be presented in any suitable format.

The method then includes generating an adjustment parameter for the second sterilization period based on the spatial distribution of the process variable associated with the first sterilization period and a sterility threshold associated with the second sterilization period, at 45. The adjustment parameter can be associated with and adjustment of the amount any of the sterilant gas, the temperature, the humidity, or the pressure within the sterilization environment during the first sterilization period to be applied to the second sterilization period. In this manner, the parameters measured and mapped for the first sterilization period can be applied to change the sterilization environment for a second, subsequent sterilization period. For example, if the spatial distribution of the sterilant gas concentration during the first sterilization period is shown as being significantly higher in all spatial region of relevance for a given sterilization load (e.g., if SAL can be achieved for the sterilization load in a set time period with a gas concentration of 350 mg/L, and the minimum gas concentration is shown as being 500 mg/L), then the method 40 facilitates reducing the amount of sterilant gas used in a second, subsequent sterilization period.

In some embodiments, the generating the adjustment parameter for the second sterilization period is based on a characteristic of the load during the second sterilization period. The characteristic of the load during the second sterilization period includes any of the type of the sterilization targets (e.g., syringes, suture materials, prefilled drug vials), a material from which the target is constructed (which can impose certain temperature limits), a packaging material of the target, or a characteristic size of the targets (e.g., whether there are tortuous paths within and around the target, a size of a passageway of the target, etc.).

In some embodiments, the method can optionally include transmitting the adjustment parameter to a valve (or other component) to control the amount of the sterilant gas conveyed into the sterilization environment during the second sterilization period, at 46. For example, in some embodiments, the adjustment parameter can be transmitted to a fluidic system that controls the differential pressure of the sterilant gas.

In some embodiments, the method can optionally include receiving a target spatial coordinate for each of the targets within a load. The target spatial coordinates correspond to a position of the target within the sterilization environment during the second sterilization period. A spatial distribution of the load is generated based at least in part on the target spatial coordinate. The adjustment parameter for the second sterilization period is generated based on the spatial distribution of the load during the second sterilization period.

Figure 15:
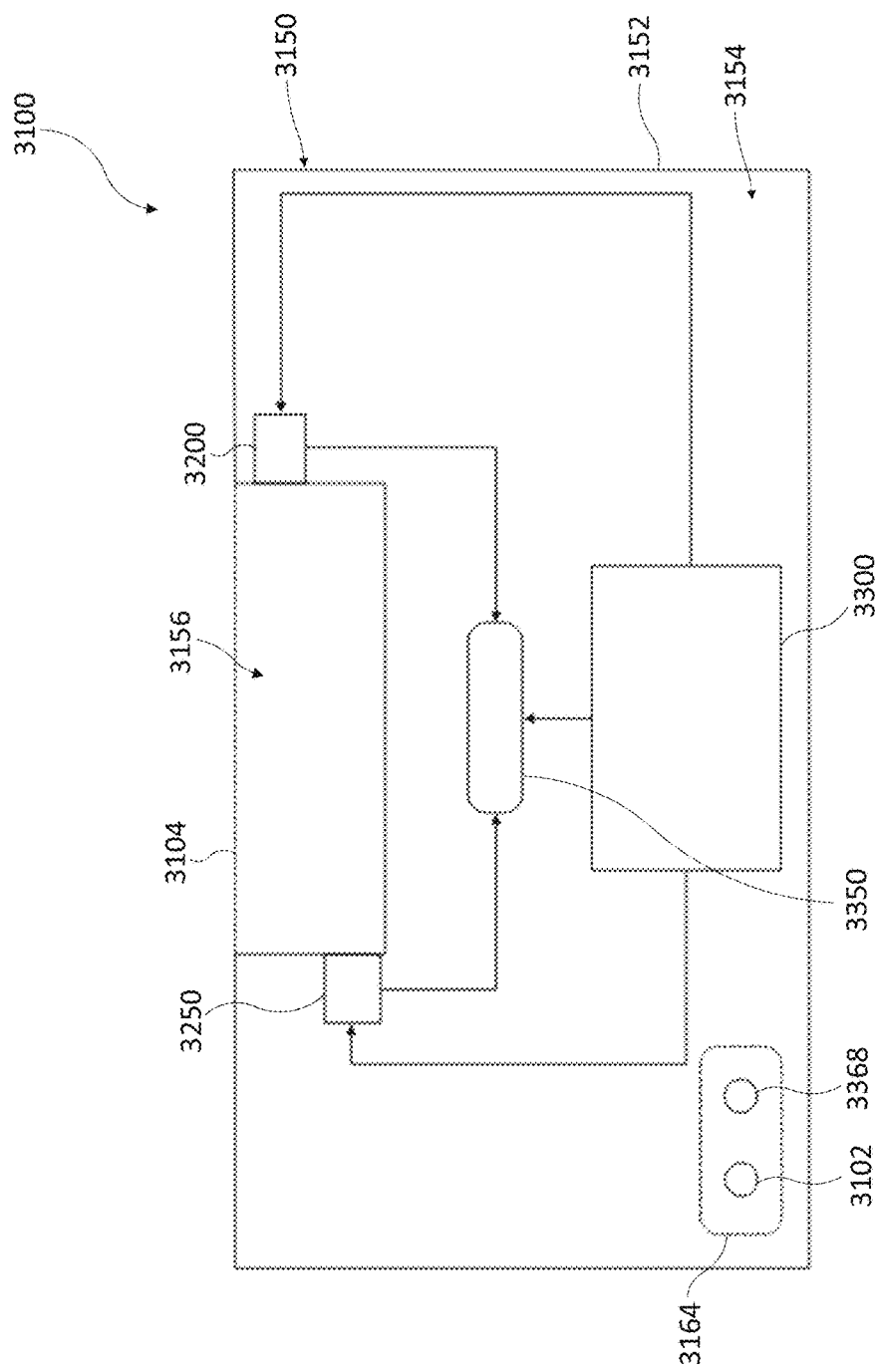
FIG. 15 is a schematic view of a sensor assembly that can be used within the system, according to an embodiment.

The sensor assemblies can be any of the sensor assemblies shown and described in U.S. patent application Ser. No. 18/947,846 filed on Nov. 14, 2024 and entitled "Systems and Methods for Monitoring a Gas Sterilization Environment," the disclosure of which is hereby incorporated by reference in its entirety. Specifically, FIG. 15 is a schematic view of a sensor assembly 3100 for monitoring the sterilization environment ENV in the sterilization chamber SC that can be included in the system 1000 or any other system. The sensor assembly 3100 includes a housing 3150, a gas concentration sensor 3200, at least one environmental sensor 3250, an energy storage device 3300, and a sensor-assembly controller 3350. To facilitate placement of the sensor assembly 3100 within and around the load, a set of maximal external dimensions of the housing 3150 can define a volume of the sensor assembly 3100 of between 150 mL and 450 mL. Said another way, the housing 3150 can be sized to be supported in a single hand of an operator.

The housing 3150 includes a wall 3152 that can, in some embodiments, be formed from a noncombustible and/or non-sparking material. For example, housing can be formed from aluminum or stainless steel. The wall 3152 defines an internal chamber 3154 and a sensing volume 3156. The sensing volume 3156 is in fluid communication with the sterilization environment ENV. In some embodiments, the fluid communication between the sensing volume 3156 and the sterilization environment ENV is via a gas-permeable filter 3104 that at least partially surrounds the housing 3150. The sensing volume 3156 is fluidically isolated from the internal chamber 3154. Additionally, the internal chamber 3154 can be fluidically isolated from the sterilization environment ENV. In some embodiments, the internal chamber 3154 can be hermetically sealed. Said another way, the internal chamber 3154 can be configured to be fully sealed such that an interaction between any electronics and/or polymer materials placed therein and the sterilization environment ENV is eliminated or minimized. This arrangement facilitates using the sensor assembly 3100 in such a flammable and/or explosive environment.

In some embodiments, the gas concentration sensor 3200 is positioned within the internal chamber 3154 and is operably coupled to the sensing volume 3156. Being operably coupled to the sensing volume 3156, which is in fluid communication with the sterilization environment ENV, the gas concentration sensor 3200 is positioned to monitor a concentration of the sterilant gas within the sterilization environment ENV. For example, in some embodiments, the sterilization environment ENV includes an invisible sterilant gas, such as ethylene oxide, and the gas concentration sensor 3200 can be a non-dispersive infrared gas concentration sensor. The non-dispersive infrared gas concentration sensor can transmit and receive infrared radiation through the sensing volume 3156 via a window (e.g., a sapphire window, not shown in FIG. 2) in order to determine the concentration of the invisible sterilant gas based on a detected decrease in transmitted infrared radiation within the sensing volume 3156.

In some embodiments, each environmental sensor 3250 is positioned within the internal chamber 3154. Each environmental sensor 3250 is also operably coupled to the sensing volume 3156. The operable coupling of each environmental sensor 3250 to the sensing volume 3156 can be via a sensor membrane or other sensor surface that is nonreactive with the sterilant gas. The environmental sensor 3250 can, for example, be a pressure sensor, a temperature sensor, and/or a humidity sensor. Accordingly, each environmental sensor 3250 can be used to measure an ambient temperature, a humidity, and/or a pressure level of the sterilization environment ENV.

As depicted in FIG. 15, the energy storage device 3300 is positioned within the internal chamber 3154. The energy storage device 3300 is operably coupled to the gas concentration sensor 3200, each environmental sensor 3250, the sensor-assembly controller 3350, and any additional electronic components of the sensor assembly 3100. In some embodiments, the energy storage device 3300 can be a battery that has previously passed intrinsic safety (and/or explosion-proof) testing or is included in an intrinsic safety test of the sensor assembly 3100. The energy storage device 3300 can be rechargeable or replaceable on a condition that the sensor assembly 3100 is positioned outside of the sterilization chamber SC. For example, a charging port can be positioned within the internal chamber 3154 and accessed by opening (e.g., unsealing) a portion of the housing 3150, such as an end cap (not shown). In other embodiments, the energy storage device 3300 (or any of the energy storage devices described herein) can be any other suitable energy storage device, such as capacitors or magnetic energy storage devices.

The energy storage device 3300 (e.g., the battery) can have a sufficient capacity to maintain operations of the powered components of the sensor assembly 3100 during the entirety of the sterilization period (including the pre-conditioning phase and the post aeration phase). Similarly stated, the energy storage device 3300 (e.g., the battery) can have a sufficient capacity to maintain operations of the powered components of the sensor assembly 3100 over the desired runtime period (which can correspond to the sterilization period). In some embodiments, the energy storage device 3300 can have a capacity in a range of 2.0 ampere-hours to 3.5 ampere-hours. For example, the battery can be a 3.0 ampere-hour battery with 8.7 watt-hours of total energy. In view of the absence of an external power source and capacity of the energy storage device 3300, in some embodiments, the sensor-assembly controller 3350, the gas concentration sensor 3200, each environmental sensor 3250, and any additional powered components of the sensor assembly 3100 have a combined maximal power draw in a range of between 50 mA and 275 mA (e.g., between 75 mA and 375 mA) and a combined average power draw during the sterilization period in a range of 0.15 watts and 0.35 watts. For example, the sensor-assembly controller 3350, the gas concentration sensor 3200, each environmental sensor 3250, and any additional powered components of the sensor assembly 3100 have a combined maximal current draw in a range of between 50 mA per hour and 275 mA per hour (e.g., between 75 mA per hour and 375 mA per hour).

In some embodiments, the sensor-assembly controller 3350 can include a processor (not shown) and a memory module (not shown). As depicted, the sensor-assembly controller 3350 is operably coupled to at least the gas concentration sensor 3200, each environmental sensor 3250, and the energy storage device 3300. As described in more detail below, the sensor-assembly controller 3350 is configured to execute a set of operations to monitor the sterilization environment ENV over a runtime period (which can correspond to the sterilization period) of at least six hours and no more than 48 hours. In other embodiments, the runtime period can be between about six hours and 36 hours. In yet other embodiments, the runtime period can be between about six hours and 24 hours.

As further depicted in FIG. 15, in some embodiments, the sensor assembly 3100 includes a status indicator 3368 that is operably coupled to the sensor-assembly controller 3350. The status indicator 3368 is configured to produce an indication of an operating status of the sensor assembly 3100. In some embodiments, a status indicator 3368 is positioned within the internal chamber 3154 and is visible through an observation portion 3164 of the housing 3150. The observation portion 3164 can be a visually transparent portion of the wall 3152.

In some embodiments, the sensor assembly 3100 includes a breach indicator 3102. The breach indicator 3102 is positioned within the internal chamber 3154. The breach indicator 3102 is configured to generate a signal should the hermetic seal of the internal chamber 3154 fail, resulting in the internal chamber 3154 (and the components contained therein) being exposed to the sterilant gas. In some embodiments, the signal can be a visual signal. In such embodiments, breach indicator 3102 can be visible via the observation portion 3164 of the housing 3150. The breach indicator 3102 can, for example, be a chemical indicator characterized by a first color and a second color. The first color can be indicative of an absence of exposure to the sterilant gas, while the second color can be indicative of an exposure to the sterilant gas. Thus, the breach indicator 3102 can produce the second color on the condition that the internal chamber has been exposed to sterilant gas. The chemical indicator can be nonreactive to environmental conditions outside of the sterilization chamber SC. Accordingly, the internal chamber 3154 can be disrupted (e.g., open) on a condition that the sensor assembly 3100 is positioned outside of the sterilization chamber SC without causing the chemical indicator to transition from the first color to the second color.

FIGS. 16-22 depict various aspects of a sensor assembly 2100 for monitoring a sterilization environment ENV within a sterilization chamber (not shown) within the systems and methods described herein. The sensor assembly 2100 is sized to be at least partially surrounded by (or placed between or among) sterilization targets. Accordingly, the sensor assembly 2100 can be sized to be positioned within the load (e.g., within a stack of sterilization targets) within the sterilization chamber SC (see, e.g., FIGS. 2-5). The sensor assembly 2100 can be separated from the walls of the sterilization chamber and can have an absence of an electrical coupling to any external power source (e.g., line power, an external battery, and/or a power supply of the sterilization chamber). Said another way, in some embodiments, the sensor assembly 2100 (and any of the sensor assemblies described herein) can be stand-alone devices that include all necessary components, power supplies, substances, and subassemblies to perform any of the gas sensing methods described herein. Such stand-alone devices do not require any external instrument to manipulate or otherwise process the gas samples to be measured, and do not require any connection to an external power source to complete the methods described herein. Thus, the sensor assemblies described herein can be fully-contained and upon being placed into the sterilization environment ENV, the sensor assembly can be actuated to perform the environmental monitoring described herein.

In some embodiments, the sensor assembly 2100 includes a housing 2150, a gas concentration sensor 2200, at least one environmental sensor 2250, an energy storage device 2300, and a sensor-assembly controller 2350. To facilitate placement of the sensor assembly 2100 within and around the load, a set of maximal external dimensions (e.g., a maximal length L and a maximal diameter D) of the housing 2150 can define a volume of the sensor assembly 2100 of between 150 mL and 450 mL.

Figure 16:
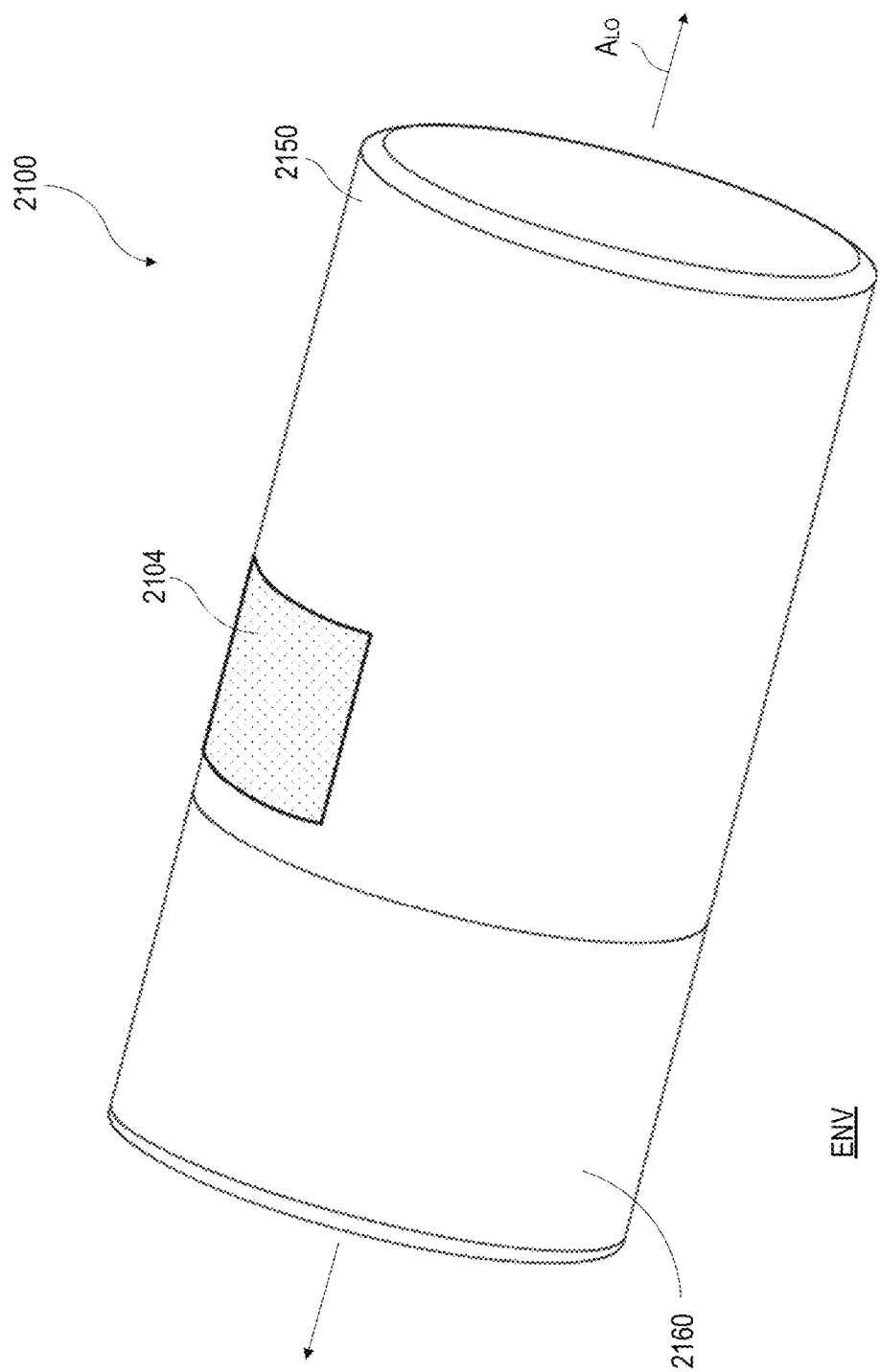
FIG. 16 is a perspective view of a sensor assembly for monitoring a gas sterilization environment according to an embodiment.

As depicted in FIG. 16, in some embodiments, the sensor assembly 2100 (i.e., the housing 2150) has a cylindrical shape. However, in additional embodiments, the sensor assembly 2100 can have an ellipsoid shape, a spherical shape, a rectilinear shape, or combinations and modifications thereof. Additionally, in some embodiments, the sensor assembly 2100 (i.e., the housing 2150) has an absence of a defined sensing orientation on a condition that the sensor assembly 2100 is positioned within the sterilization environment ENV. Said another way, in some embodiments, the sensor assembly 2100 and/or the housing 2150 can effectively and accurately monitor the sterilization environment irrespective of the orientation at which the sensor assembly is placed within the sterilization environment ENV.

Figure 18:
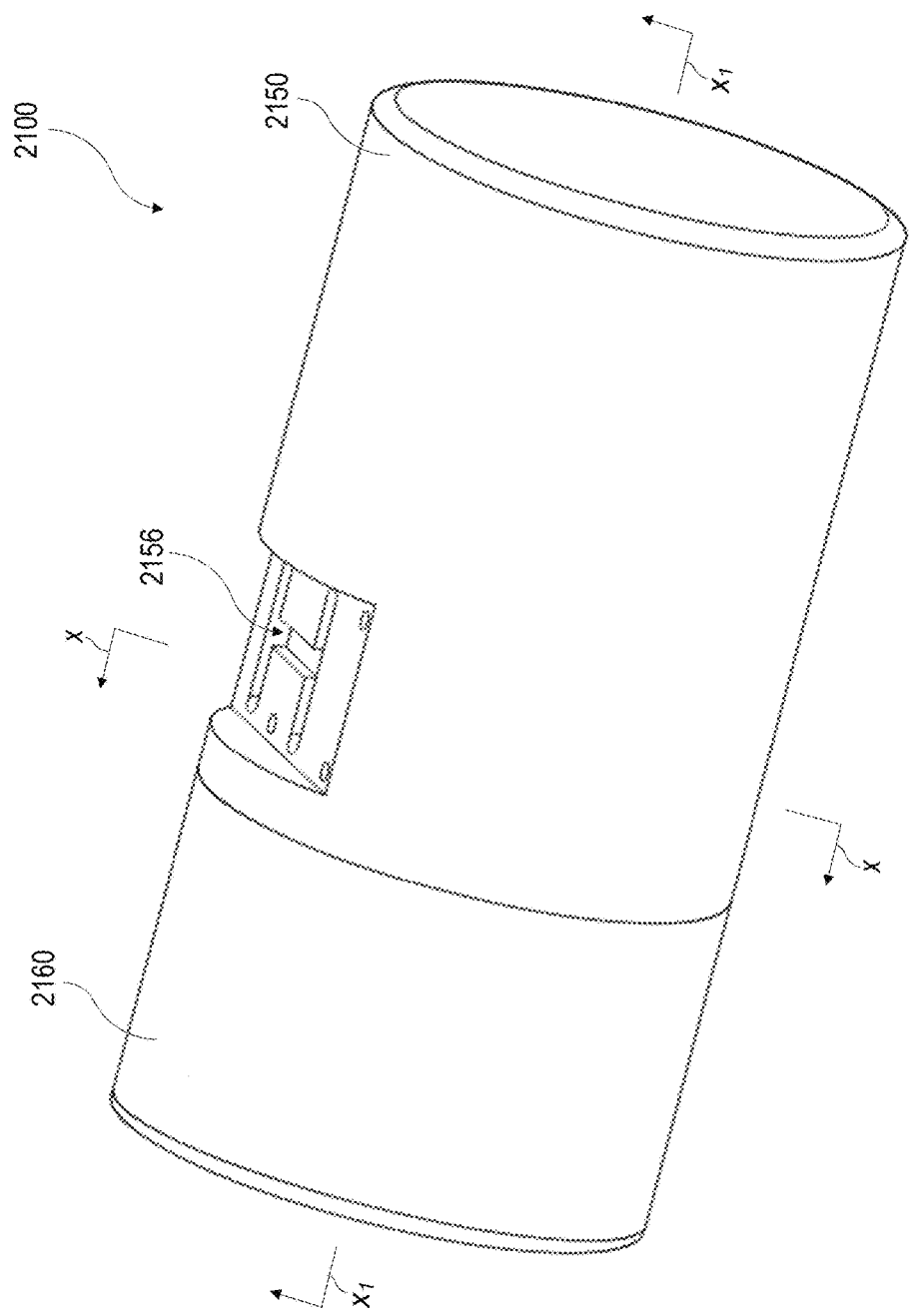
FIG. 18 is a perspective view of the sensor assembly of FIG. 16 with a gas-permeable filter removed for clarity.
Figure 21:
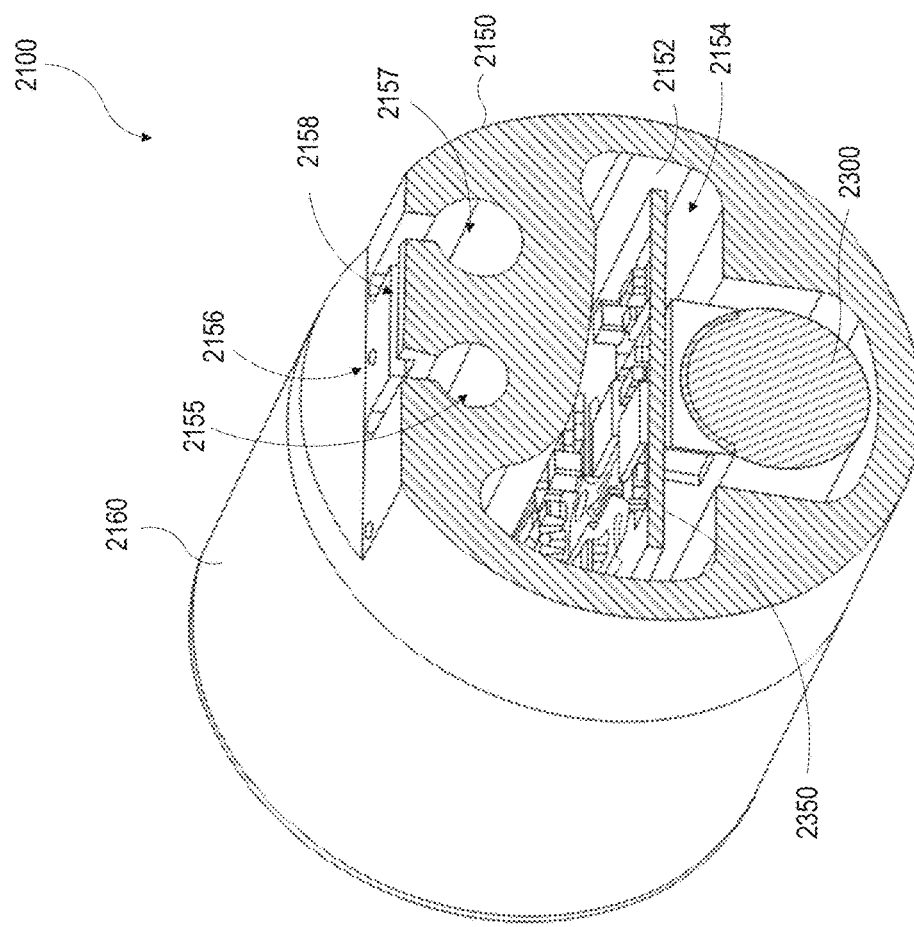
FIG. 21 is a cross-sectional view of the sensor assembly of FIG. 18 taken at line x-x.
Figure 22:
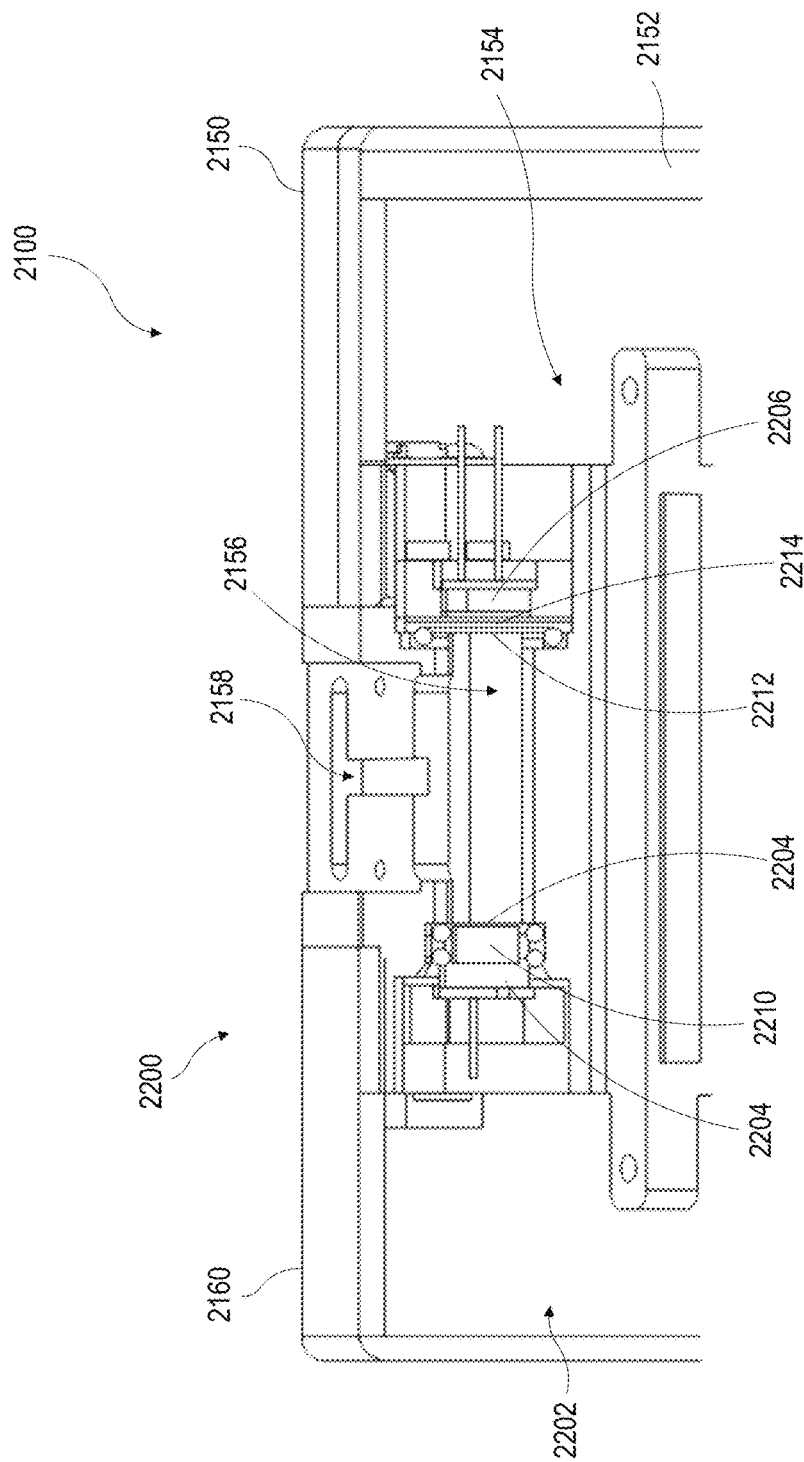
FIG. 22 is a cross-sectional view of a portion of the sensor assembly of FIG. 18 taken at line $x_1$-$x_1$.

FIG. 21 is a cross-sectional view of the sensor assembly of FIG. 18 taken at line x-x, while FIG. 22 is a cross-sectional view of a portion of the sensor assembly of FIG. 18 taken at line $x_1$-$x_1$. As depicted, the housing 2150 includes a wall 2152 that can, in some embodiments, be formed from a noncombustible and/or non-sparking material. For example, housing can be formed from aluminum or stainless steel. The wall 2152 defines an internal chamber 2154 and a sensing volume 2156. The sensing volume 2156 is in fluid communication with the sterilization environment ENV. The sensing volume 2156 is fluidically isolated from the internal chamber 2154. Additionally, the internal chamber 2154 can be fluidically isolated from the sterilization environment ENV. In some embodiments, the internal chamber 2154 can be hermetically sealed. Said another way, the internal chamber 2154 can be configured to be fully sealed such that an interaction between any electronics and/or polymer materials placed therein and the sterilization environment ENV is eliminated or minimized. This arrangement facilitates using the sensor assembly 2100 in such a flammable and/or explosive environment.

Figure 17:
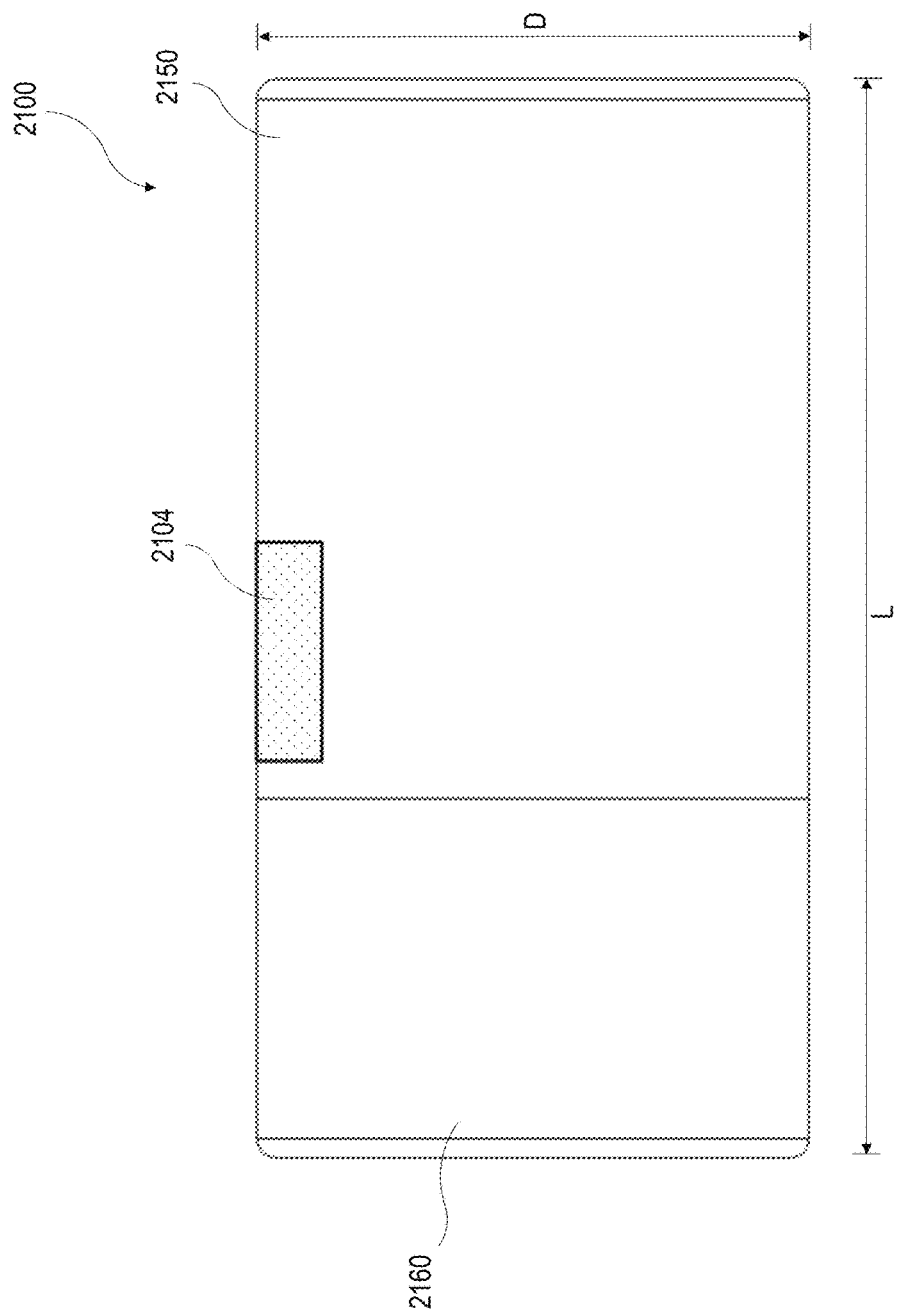
FIG. 17 is a side view of the sensor assembly of FIG. 16.

As depicted in FIGS. 16 and 17, in some embodiments, the fluid communication between the sensing volume 2156 and the sterilization environment ENV is via a gas-permeable filter 2104 that at least partially surrounds the housing 2150. The gas-permeable filter 2104 can preclude passage of particles or objects larger than the gas molecules within the sterilization environment ENV while permitting passage of the gas molecules from the sterilization environment ENV into the sensing volume 2156. The gas-permeable filter 2104 is omitted from FIGS. 18-22 for clarity.

Figure 19:
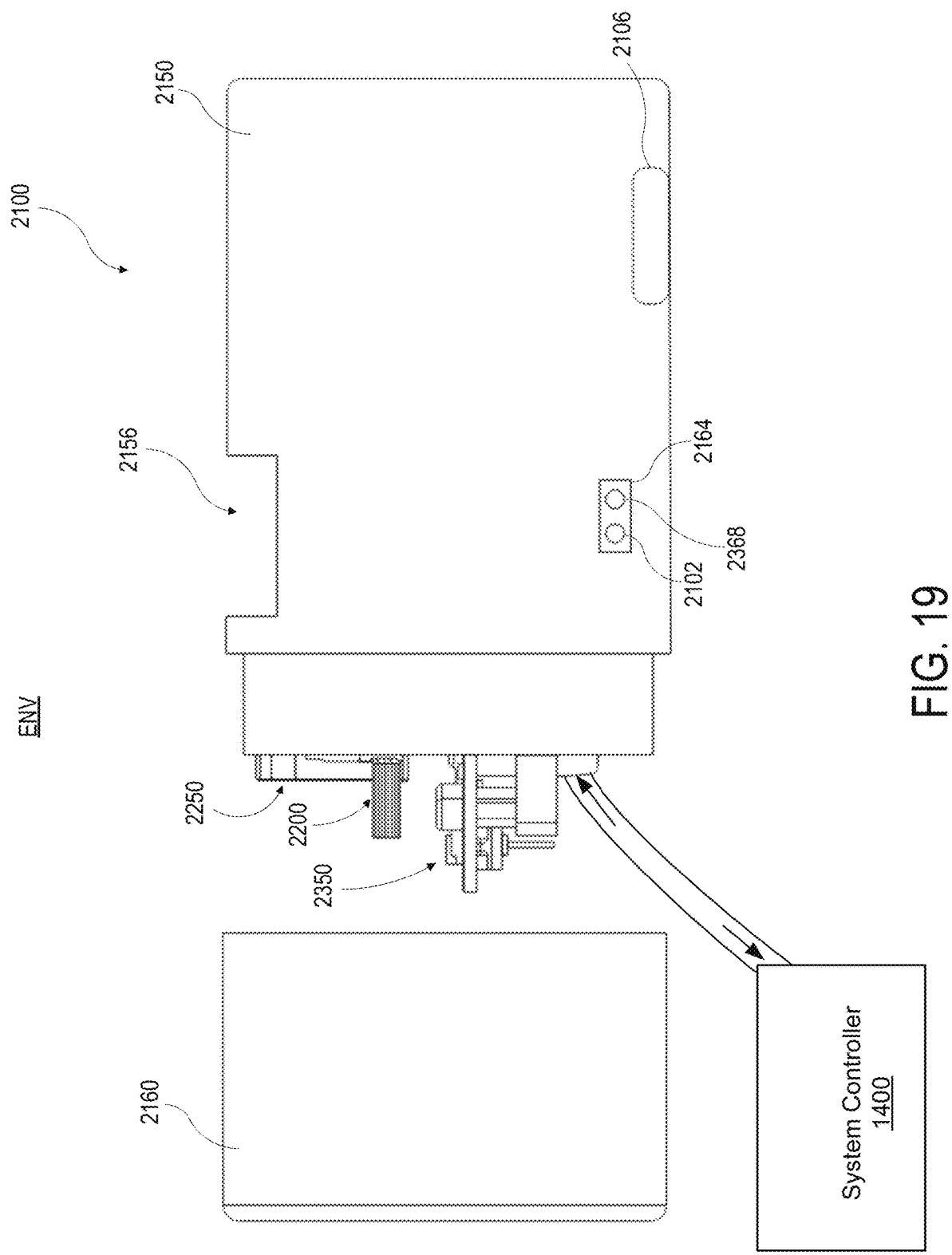
FIG. 19 is a side view of the sensor assembly of FIG. 18 with an end cap separated from a housing of the sensor assembly according to an embodiment.
Figure 20:
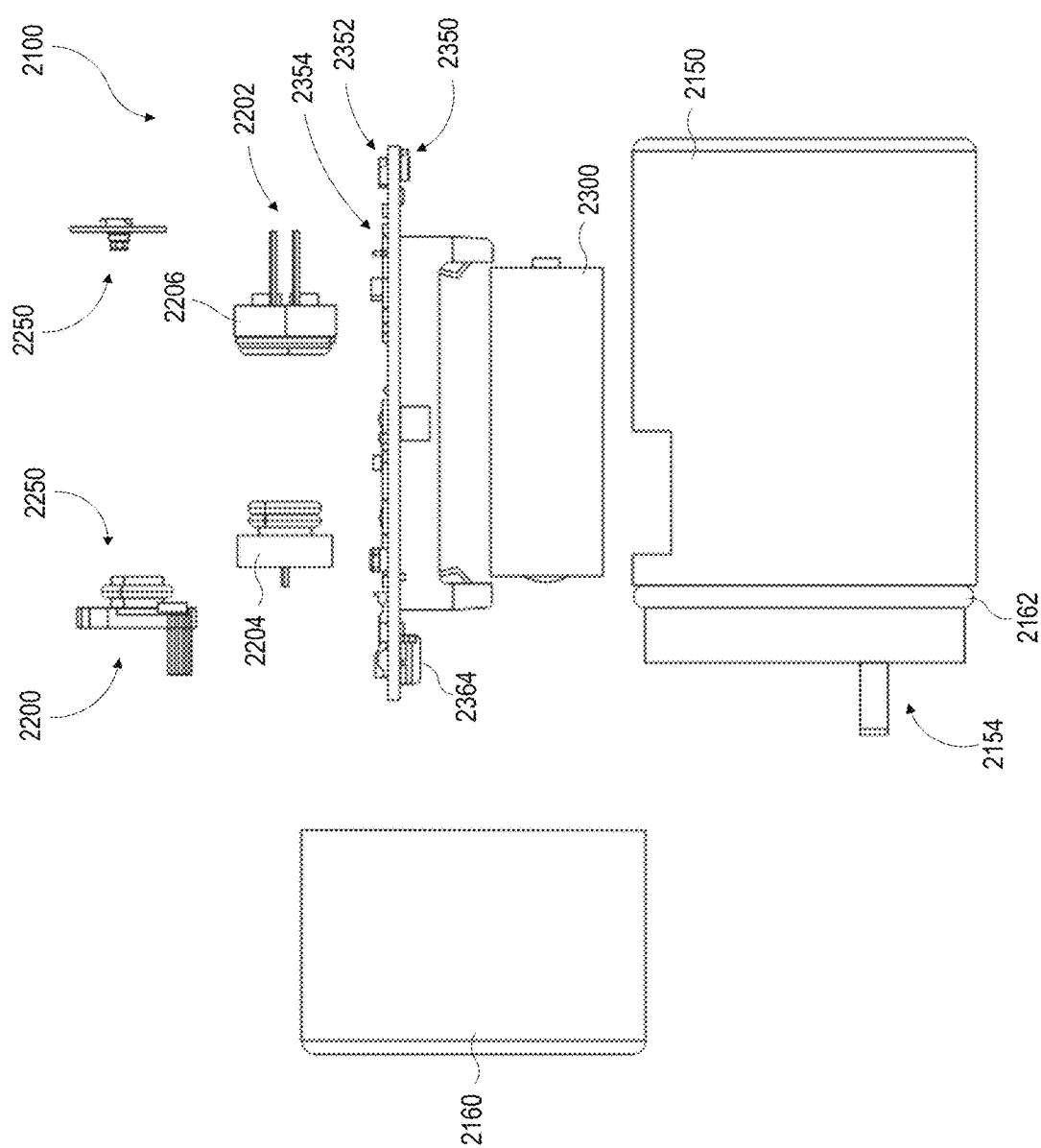
FIG. 20 is an exploded view of the sensor assembly of FIG. 18.

As depicted in FIGS. 19 and 20, in some embodiments, the sensor assembly 2100 includes an end cap 2160 (e.g., a cover) and a seal member 2162. The end cap 2160 can be removably coupled to the housing 2150 with the seal member 2162 being positioned between a portion of the end cap 2160 and the housing 2150. Accordingly, the coupling of the end cap 2160 and the seal member 2162 to the housing 2150 can hermetically seal the internal chamber 2154. Additionally, the removal of the end cap 2160 from the housing 2150 on a condition that the sensor assembly 2100 is outside of the sterilization chamber can facilitate access to components positioned within the internal chamber 2154.

As depicted in FIG. 19, in some embodiments, the sensor assembly 2100 can include a breach indicator 2102. The breach indicator 2102 is positioned within the internal chamber 2154. The breach indicator 2102 is configured to generate a signal should the hermetic seal of the internal chamber 2154 fail, resulting in the internal chamber 2154 (and the components contained therein) being exposed to the sterilant gas. In some embodiments, the signal can be a visual signal. In such embodiments, breach indicator 2102 can be visible via an observation portion 2164 (e.g., a visually transparent portion of the wall 2152) of the housing 2150. The breach indicator 2102 can, for example, be a chemical indicator that has a first color and a second color. The first color can be indicative of an absence of exposure to the sterilant gas, while the second color can be indicative of an exposure to the sterilant gas. The chemical indicator can be nonreactive to environmental conditions outside of the sterilization chamber. Accordingly, the internal chamber 2154 can be disrupted (e.g., open) on a condition that the sensor assembly 2100 is positioned outside of the sterilization chamber without causing the chemical indicator to transition from the first color to the second color.

As further depicted in FIG. 19, in some embodiments, the sensor assembly 2100 can include a positioning device 2106. The positioning device 2106 can be used to position the sensor assembly 2100 at a specified three-dimensional location within the sterilization chamber. The positioning device 2106 can, for example, be an actuatable magnet, a vacuum grip, a mechanical grip, an adhesive, a keyed protrusion, and/or a lanyard. Thus, the positioning device 2106 can be used to establish the sensor assembly 2100 at the specified three-dimensional location by securing the sensor assembly 2100 to a wall of the sterilization chamber, a support structure within the sterilization chamber, a product support, or a suspended sensor support on a condition that the sensor assembly is positioned within the sterilization chamber.

In some embodiments, the gas concentration sensor 2200 is positioned within the internal chamber 2154 and is operably coupled to the sensing volume 2156. Being operably coupled to the sensing volume 2156, which is in fluid communication with the sterilization environment ENV, the gas concentration sensor 2200 is positioned to monitor a concentration of the sterilant gas within the sterilization environment ENV. For example, in some embodiments, the sterilization environment ENV includes an invisible sterilant gas, such as ethylene oxide, and the gas concentration sensor 2200 can, as depicted in FIGS. 20 and 22, be a non-dispersive infrared gas concentration sensor 2202. The non-dispersive infrared gas concentration sensor 2202 can transmit and receive infrared radiation through the sensing volume 2156 via a window (e.g., a sapphire window) in order to determine the concentration of the invisible sterilant gas based on a detected decrease in transmitted infrared radiation within the sensing volume 2156.

As depicted in FIGS. 20 and 22, the gas concentration sensor 2200 configured as the non-dispersive infrared gas concentration sensor 2202 can include an emitter portion 2204 and a detector portion 2206 that are each operably coupled to the sensing volume 2156. At least a portion of the sensing volume 2156 is positioned between the emitter portion 2204 and the detector portion 2206. For example, in some embodiments, the emitter portion 2204 and the detector portion 2206 can be positioned on opposite sides of the sensing volume 2156.

In some embodiments, the emitter portion 2204 is an emitter of infrared radiation into (e.g., across) the sensing volume 2156. For example, the emitter portion 2204 can be blackbody emitter. In some embodiments, however, the emitter portion 2204 can be a light-emitting-diode emitter or laser diode emitter depending on the target wavelength of the emitted energy. The detector portion 2206 is positioned to receive a portion of the emitted infrared radiation from the emitter portion 2204 that is not absorbed by the sterilant gas within the sensing volume 2156. With the absorbed portion of the emitted infrared radiation being indicative of the concentration of the sterilant gas within the sensing volume 2156, the non-dispersive infrared gas concentration sensor 2202 is configured to output a signal corresponding to the concentration of the invisible sterilant gas within the sensing volume 2156 based on the difference between the magnitude of the emitted infrared radiation and the magnitude of the received infrared radiation.

The non-dispersive infrared gas concentration sensor 2202 can, in some embodiments, be at least a two-channel sensor having a measurement channel and a reference channel. The measurement channel can have a target wavelength associated with the known infrared absorbance signature of the invisible sterilant gas (e.g., the infrared absorbance signature of ethylene oxide). For example, the measurement channel can be filtered to target a wavelength associated with ethylene oxide (e.g., 3.2 µm). The reference channel can have a target wavelength associated with the absorbance of neither the sterilant gas nor an environmental gas. For example, the reference channel can be filtered to target a wavelength of 4 µm. In some embodiments the non-dispersive infrared gas concentration sensor 2202 can be a four-channel sensor. One of the additional channels can, for example, be used to measure water vapor, thereby reducing/ eliminating the monitoring of humidity via an environmental sensor 2250. As an additional example, one of the additional channels can be filtered to have a target wavelength in the range of 6 μm to 7 μm in order to monitor other gases of interest within the sterilization environment ENV. At least one of the additional channels can also be filtered as an additional reference channel to improve the accuracy of the output signal.

As depicted in FIG. 22, in some embodiments, the non-dispersive infrared gas concentration sensor 2202 includes an emitter window 2208. The emitter window 2208 is positioned between the emitter portion 2204 and the sensing volume 2156. In other words, the emitter window 2208 can preclude physical contact between the emitter portion 2204 and the sterilant gas within the sensing volume 2156. The emitter window 2208 can, for example, be a sapphire window, a silicon window, or a window formed from another suitable composite. The emitter window 2208 can be substantially transparent in the wavelengths of the energy emitted (e.g., infrared energy) by the emitter portion 2204. In some embodiments, the emitter window 2208 has a low heat capacity and is at least partially absorptive of blackbody radiation (e.g., such as generated by the emitter portion 2204). In some embodiments, the emitter window 2208 is absorptive of blackbody radiation in a range outside of the detector channels ranges. For example, the emitter window 2208 can demonstrate absorbance in 5.5-20 microns wavelengths, but is not absorbent of wavelengths in a range of 3 microns to 4.5 microns, which can correspond to a detection wavelength range of the non-dispersive infrared gas concentration sensor 2202.

In embodiments wherein the emitter window 2208 is absorbative of blackbody radiation, the temperature of the emitter window 2208 can be increased by the passage of the energy radiated by the emitter portion 2204. Warming the emitter window 2208 can reduce or eliminate condensation that may otherwise develop on a surface of the emitter window 2208 due to differences in temperature and humidity between the sensing volume 2156 and the internal chamber 2154. A buildup of condensation on the emitter window 2208 can negatively affect the performance of the non-dispersive infrared gas concentration sensor 2202. For example, condensation resulting from variable swings in temperature, pressure, and humidity can result in abnormal reflections and dispersions that negatively affect the accuracy and sensitivity of the non-dispersive infrared gas concentration sensor 2202. Therefore, it is desirable to manage the temperature of the emitter window 2208 to eliminate or minimize condensation buildup.

In some embodiments, the non-dispersive infrared gas concentration sensor 2202 includes a window heater 2210 that is operably coupled to the emitter window 2208. The window heater 2210 is powered by the energy storage device 2300 and can be controlled by the sensor-assembly controller 2350. The window heater 2210 can, for example, include heating elements that are adhesively bonded to one face of the emitter window 2208. The heating elements can be resistive elements formed from metals, carbon, and/or other conductive elements. In some embodiments, the heating elements can be printed onto or etched into the face of the emitter window 2208 in a geometric pattern that optimizes heating efficiency without obstructing the passage of the infrared energy from the emitter portion 2204 into the sensing volume 2156. In some embodiments, the window heater 2210 can serve to augment the warming of the emitter window 2208 via the passage of the energy radiated by the emitter portion 2204 under specified conditions within the gas sterilization environment ENV.

In some embodiments, the non-dispersive infrared gas concentration sensor 2202 can include a receiver window 2212. The receiver window 2212 can be positioned between the detector portion 2206 and the emitter portion 2204 of the non-dispersive infrared gas concentration sensor 2202. Said another way, the receiver window 2212 can preclude physical contact between the detector portion 2206 and the sterilant gas within the sensing volume 2156. The receiver window 2212 can, for example, be a sapphire window, a silicon window, or a window formed from another suitable composite. The receiver window 2212 can be substantially transparent in the wavelengths of the energy emitted by the emitter portion 2204 such that the infrared emissions of the emitter portion 2204 are detectable by the detector portion 2206 after passing through the receiver window 2212. In some embodiments, the receiver window 2212 has a low heat capacity and is at least partially absorptive of blackbody radiation (e.g., such as generated by the emitter portion 2204). In some embodiments, the receiver window 2212 is absorptive of blackbody radiation in a range outside of the detector channels ranges. For example, the receiver window 2212 can demonstrate absorbance in 5.5-20 microns wavelengths, but is not absorbent of wavelengths in a range of 3 microns to 4.5 microns, which can correspond to a detection wavelength range of the non-dispersive infrared gas concentration sensor 2202.

In embodiments wherein the receiver window 2212 is absorbative of blackbody radiation, the temperature of the receiver window 2212 can be increased by the passage of the energy radiated by the emitter portion 2204. Warming the receiver window 2212 can reduce or eliminate condensation that may otherwise develop on a surface of the emitter window 2208 due to differences in temperature and humidity between the sensing volume 2156 and the internal chamber 2154. A buildup of condensation on the receiver window 2212 can negatively affect the detection of the non-absorbed portion of the infrared energy radiated by the emitter portion 2204. Said another way, condensation resulting from variable swings in temperature, pressure, and humidity can result in abnormal reflections and dispersions that negatively affect the accuracy and sensitivity of the non-dispersive infrared gas concentration sensor 2202. Therefore, it is desirable to manage the temperature of the receiver window 2212 to eliminate or minimize condensation buildup.

In some embodiments, the non-dispersive infrared gas concentration sensor 2202 includes a window heater 2214 that is operably coupled to the receiver window 2212. The window heater 2214 is powered by the energy storage device 2300 and can be controlled by the sensor-assembly controller 2350. The window heater 2214 can, for example, include heating elements that are adhesively bonded to one face of the receiver window 2212. The heating elements can be resistive elements formed from metals, carbon, and/or other conductive elements. In some embodiments, the heating elements can be printed onto or etched into the face of the receiver window 2212 in a geometric pattern that optimizes heating efficiency without obstructing the passage of the infrared energy from the sensing volume 2156 and onto the detector portion 2206. In some embodiments, the window heater 2214 can serve to augment the warming of the receiver window 2212 via the passage of the energy radiated by the emitter portion 2204 under specified conditions within the gas sterilization environment ENV.

In some embodiments, the window heater 2214 can be operably coupled to the receiver window 2212, while the emitter window 2208 has an absence of heating elements. In such embodiments, the temperature of the emitter window 2208 can, for example, be increased by the passage of the energy radiated by the emitter portion 2204, while the temperature of the receiver window 2212 is increased via the window heater 2214.

As depicted in FIGS. 19 and 20, in some embodiments, each environmental sensor 2250 is positioned within the internal chamber 2154. Each environmental sensor 2250 is also operably coupled to the sensing volume 2156. The operable coupling of each environmental sensor 2250 to the sensing volume 2156 can be via a sensor membrane or other sensor surface that is nonreactive with the sterilant gas. The environmental sensor 2250 can, for example, be a pressure sensor, a temperature sensor, and/or a humidity sensor. In some embodiments, the environmental sensor 2250 (i.e., a first environmental sensor) can be the pressure sensor and the sensor assembly 2100 can also include a separate, integrated sensor package (i.e., a second environmental sensor) that includes a combined humidity sensor and temperature sensor. The environmental sensor(s) 2250, can, therefore, be used to measure an ambient temperature, a humidity, and/or a pressure level of the sterilization environment ENV.

In some embodiments, the environmental sensor(s) 2250 (e.g., a humidity sensor) is self-heating. The self-heating can mitigate an effect of condensation on the environmental sensor(s) 2250 following an exposure to the sterilant gas. In some embodiments, the self-heating functionality of the environmental sensor(s) 2250 can be activated only on a condition that the sensor assembly 2100 is coupled to an external power source, such as following the sterilization period. In such embodiments, the self-heating functionality can restore/reset at least one function of the environmental sensor(s) 2250 following exposure to the extreme conditions of the sterilization environment ENV.

In some embodiments, gas concentration sensor 2200 and the environmental sensor(s) 2250 are operably coupled to different portions of the sensing volume 2156. For example, the gas concentration sensor 2200 can be operably coupled to a first portion 2155 of the sensing volume 2156, while the environmental sensor(s) 2250 is operably coupled to a second portion 2157 of the sensing volume 2156. As depicted in FIG. 21, The first portion 2155 and the second portion 2157 are fluidically coupled to the sterilization environment ENV via a communication passage 2158. A longitudinal axis of the first portion 2155 of the sensing volume 2156 is parallel to a longitudinal axis $A_{LO}$ (FIG. 16) of the housing 1150. Likewise, a longitudinal axis of the second portion 2157 of the sensing volume 2156 is parallel to a longitudinal axis $A_{LO}$ of the housing 1150. Accordingly, the longitudinal axis of the first portion 2155 is parallel to the longitudinal axis of the second portion 2157. Additionally, the first portion 2155 and the second portion 2157 are each positioned at a distance from an axial midline (e.g., the longitudinal axis $A_{LO}$) of the housing 2150 with the axial midline being between the first portion 2155 and the second portion 2157. This arrangement allows for a sufficient and consistent amount of the gas from the sterilization environment ENV to be conveyed into each of the first portion 2155 and the second portion 2157 for measurement.

With reference to FIGS. 20 and 21, the energy storage device 2300 is positioned within the internal chamber 2154. The energy storage device 2300 is operably coupled to the gas concentration sensor 2200, each environmental sensor 2250, the sensor-assembly controller 2350, and any additional electronic components of the sensor assembly 2100, such as window heaters 2210, 2214. Being positioned within the internal chamber 2154, the physical dimensions of the energy storage device 2300 are constrained to be less than the volume of the sensor assembly 2100 defined by the housing 2150. Accordingly, the capacity of the energy storage device 2300 is limited, at least in part, by the limited physical dimensions of the energy storage device 2300 necessary to position the energy storage device 2300 within the internal chamber 2154.

In some embodiments, the energy storage device 2300 can be a battery that has previously passed intrinsic safety (and/or explosion-proof) testing. The energy storage device 2300 can be rechargeable or replaceable on a condition that the sensor assembly 2100 is positioned outside of the sterilization chamber. For example, a charging port can be positioned within the internal chamber 2154 and accessed by opening (e.g., unsealing) a portion of the housing 2150, such as the end cap 2160.

The energy storage device 2300 (e.g., the battery) can have a sufficient capacity to maintain operations of the powered components of the sensor assembly 2100 during the entirety of the sterilization period. The sterilization period (which is also referred to in this context as the runtime period) is a continuous interval having a duration of at least six hours and no more than 48 hours. In some embodiments, the energy storage device 2300 can have a capacity in a range of 2.0 ampere-hours to 3.5 ampere-hours. For example, the battery can be a 3.0 ampere-hour battery with 8.7 watt-hours of total energy. In view of the absence of an external power source and capacity of the energy storage device 2300, in some embodiments, the sensor-assembly controller 2350, the gas concentration sensor 2200, the environmental sensor(s) 2250, and any additional powered components of the sensor assembly 2100 (e.g., such as window heaters 2210, 2214) have a combined maximal power draw in a range of between 50 mA and 275 mA (e.g., between 75 mA and 175 mA) and a combined average power draw during the sterilization period in a range of 0.15 watts and 0.35 watts. For example, the sensor-assembly controller 1350, the gas concentration sensor 1200, each environmental sensor 1250, and any additional powered components of the sensor assembly 1100 have a combined maximal current draw in a range of between 50 mA per hour and 275 mA per hour (e.g., between 75 mA per hour and 175 mA per hour). Said another way, being that the sensor assembly 2100 has an absence of an external power source, the capacity of the energy storage device 2300 defines the assets portion of the power budget for the sensor assembly 2100, while the maximal and average power draw of the electronic components of the sensor assembly 2100 for the duration of the sterilization period define the requirements portion of the power budget.

As depicted in FIGS. 19 and 21, in some embodiments, the sensor-assembly controller 2350 can be positioned within the internal chamber 2154. The sensor-assembly controller 2350 includes a processor 2352 and a memory module 2354 and is operably coupled to at least the gas concentration sensor 2200, each environmental sensor 2250, and the energy storage device 2300. The processor 2352 is configured to execute a series of stored instructions to control the operations of the sensor assembly 2100. The memory module 2354 can store the instructions for execution by the processor 2352. The memory module 2354 can also record output signals received from the gas concentration sensor 2200 and output signals received from the environmental sensor(s) 2250 at each sampling interval over a sterilization period of at least six hours and no more than 48 hours. The output signals received from the gas concentration sensor 2200 and the output signal received from the environmental sensor(s) 2250 are descriptive of the process state variables within the sterilization environment ENV at each sampling interval during the sterilization period. The process state variables recorded by the sensor-assembly controller 2350 are indicative of the gas sterilization process and can be used to verify that the process state variables satisfy the sterilization parameters. In other embodiments, the sterilization period can be between about six hours and 36 hours. In yet other embodiments, the sterilization period can be between about six hours and 24 hours.

As depicted in FIG. 20, in some embodiments, the sensor-assembly controller 2350 includes a data port 2364. The data port 2364 can be positioned within the internal chamber 2154. Being positioned within the internal chamber 2154, the data port 2364 is isolated from the sterilization environment ENV on a condition that the internal chamber 2154 is hermetically sealed. Accordingly, in some embodiments, access to the data port 2364 is available only on a condition that the end cap 2160 is decoupled from the housing 2150. For example, as shown in FIG. 20, the system controller 1400 can be coupled to the data port 2364 of each sensor assembly of the system 1000 via a wired connection when the end cap is removed.

In some embodiments, the sensor-assembly controller 2350 can also be operably coupled to a wireless transmitter (not shown). The wireless transmitter can have an output signal that is configured to be received by an antenna element within the sterilization chamber during the sterilization period. In such embodiments, the wireless transmitter can be used to transmit the output signals received from the gas concentration sensor 2200 and/or the environmental sensor(s) 2250 to the system controller 1400 to facilitate modifications to the process state variables during the sterilization period. For example, should the output from the gas concentration sensor 2200 indicate a concentration of ethylene oxide that exceeds a required minimum, the quantity of ethylene oxide introduced into the sterilization chamber can be reduced.

As depicted in FIG. 19, in some embodiments, the sensor assembly 2100 includes a status indicator 2368 that is operably coupled to the sensor-assembly controller 2350. The status indicator 2368 is configured to produce an indication of an operating status of the sensor assembly 2100. In some embodiments, a status indicator 2368 is positioned within the internal chamber 2154 and is visible through an observation portion 2164 of the housing 2150. The observation portion 2164 can be a visually transparent portion of the wall 2152.

In some embodiments, the sensor-assembly controller 2350 is configured to execute a set of operations to control the sensor assembly 2100 to monitor the sterilization environment ENV over the sterilization period. In some embodiments, the sensor-assembly controller 2350 is configured to perform the set of operations while disconnected at least from any external power source and any external instrument. In some embodiments, the set of operations can be performed while the sensor-assembly controller 2350 is also disconnected from an external memory device.

Figure 23:
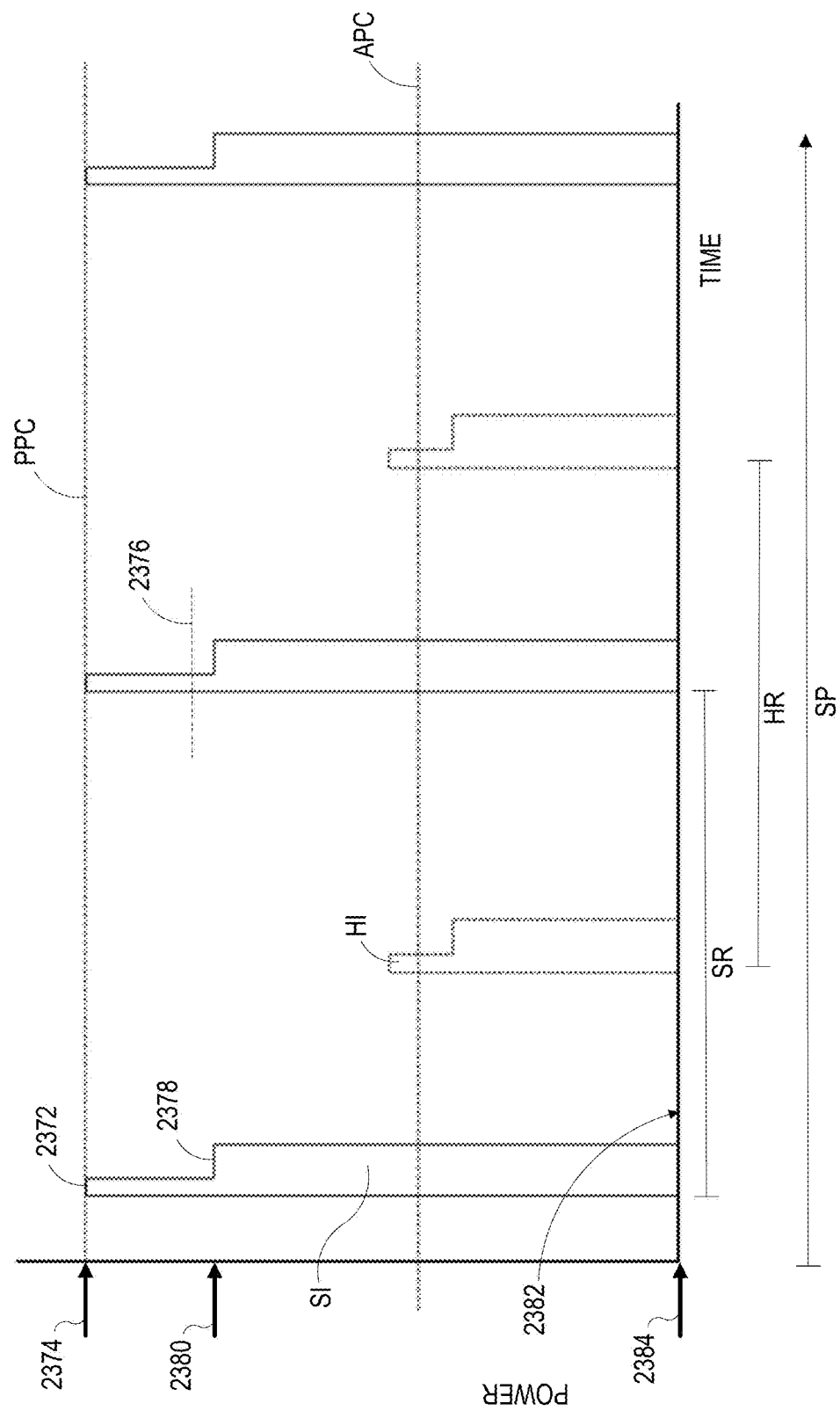
FIG. 23 is a graphical depiction of a sampling period during a sterilization event that is monitored by a system and/or method according to an embodiment.

With reference to FIG. 23, in some embodiments, the operations executed by the sensor-assembly controller 2350 manage a peak power consumption PPC of the sensor assembly 2100. The peak power consumption PPC is the maximal power consumed by any combination of the electronic components of the sensor assembly 2100 at a given instant. Additionally, in some embodiments, the operations executed by the sensor-assembly controller 2350 manage an average power consumption APC of the sensor assembly 2100 over the duration of the sterilization period. A limit for the peak power consumption PPC and a limit for the average power consumption APC are based on the capacity of the energy storage device 2300. Said another way, the sensor-assembly controller 2350 controls the operations of the electronic components of the sensor assembly 2100 such that neither an instantaneous peak power consumption PPC nor the average power consumption APC are at such a magnitude that the capacity of the energy storage device 2300 is exceeded prior to the completion of the sterilization period SP on a condition that the sterilization period SP has a duration of at least six hours and no more than 48 hours. In other embodiments, the sterilization period can be between about six hours and 36 hours. In yet other embodiments, the sterilization period can be between about six hours and 24 hours.

As depicted in FIG. 23, the operations executed by the sensor-assembly controller 2350 include initiating a set of sampling intervals SI at a sampling rate SR for the gas concentration sensor 2200 and the environmental sensor(s) 2250. Each sampling interval SI is a temporal portion of the sterilization period SP during which both the gas concentration sensor 2200 and the environmental sensor(s) 2250 are actuated to sample the sterilization environment ENV. The sampling rate SR corresponds to a period between the initiation of subsequent sampling intervals. Said another way, the sampling rate is the frequency at which the gas concentration sensor 2200 and the environmental sensor(s) 2250 are actuated during the sterilization period SP. In some embodiments, the sampling rate SR can be established in a range of five seconds to 30 seconds (e.g., seven seconds to 15 seconds). In other words, the operations executed by the sensor-assembly controller 2350 can include sampling the sterilization environment ENV via the gas concentration sensor 2200 and the environmental sensor 2250 at a sampling rate SR of at least twice per minute and no more than 12 times per minute over the sterilization period SP. For example, the operations executed by the sensor-assembly controller 2350 can include sampling the sterilization environment ENV via the gas concentration sensor 2200 and the environmental sensor 2250 at a sampling rate SR of eight sample intervals SI (e.g., measurements) per minute. In some embodiments, the measurements obtained during the sample intervals SI over each one minute of the sterilization period SP can be averaged together to generate at least one average measurement (e.g., 1, 2, or 4) over each one minute of the sterilization period. The average measurement(s) can be the value presented to a user following removal of the sensor assembly 2100 from the sterilization chamber.

The gas concentration sensor 2200 and/or the environmental sensor(s) 2250 can have a design (e.g., nominal) 50% duty cycle, which corresponds to repeatedly operating one second at maximal power followed by one second at no power. The 50% duty cycle corresponds to a sampling rate of two seconds and can maximize a signal-to-noise ratio in the absence of a power constraint. However, due to the absence of an external power supply, the capacity of the energy storage device 2300 within the limited volume of the sensor assembly 2100, and the sterilization period SP having a duration of at least six hours and no more than 48 hours, in some embodiments, the sensor-assembly controller 2350 operates the gas concentration sensor 2200 and the environmental sensor(s) 2250 at a lower duty cycle (i.e., a slower/ lower frequency sampling rate). For example, sensor-assembly controller 2350 can reduce the duty cycle of the gas concentration sensor 2200 and/or the environmental sensor(s) 2250 to a minimum required to obtain relevant indications of the parameters within the sterilization environment ENV. The establishment of the sampling rate SR in the range of five seconds to 30 seconds (e.g., seven seconds to 15 seconds) reduces the power consumption of the gas concentration sensor 2200 and the environmental sensor(s) 2250 throughout the sterilization period SP while still providing an accurate indication of the parameters within the sterilization environment ENV. Said another way, operating the gas concentration sensor 2200 and the environmental sensor(s) 2250 no more frequently than once every five seconds (e.g., once every seven seconds) lowers the power consumption of the sensors at a cost of a greater signal-to-noise ratio. Said yet another way, slowing the sampling rate SR facilitates compliance with the power budget while maintaining effective monitoring of the sterilization environment ENV during the entirety of the sterilization period SP.

As depicted in FIG. 23, in some embodiments, sampling interval SI includes an initiation phase 2372. The initiation phase 2372 has an initiation power consumption 2374. The initiation power consumption 2374 can have a magnitude that is in a range of 120% to 140% of a design power consumption magnitude 2376. The design power consumption magnitude 2376 can correspond to a designed power consumption of the sensors during a sampling operation. A measurement phase 2378 follows each initiation phase 2372. The measurement phase 2378 has a measurement power consumption 2380 that is in a range of 80% to 100% of the design power consumption magnitude 2376 during an observation of the sterilization environment ENV.

Establishing the initiation power consumption 2374 at a magnitude that is greater than the design power consumption magnitude 2376 accelerates the time to a steady state signal during the measurement phase 2378. This, in turn, reduces the required duration of each sampling interval SI. Accordingly, measurement phase 2378 has a duration that is greater than a duration of the initiation phase 2372. For example, the initiation phase 2372 can have a duration that is in a range of 2% to 15% of the duration of the sampling interval SI. Due to the brevity of the initiation phase 2372 relative to the measurement phase 2378, the cost to the power budget of the greater initiation power consumption 2374 is outweighed by the benefit of the lower total power consumption during the sampling interval SI.

As further depicted in FIG. 23, each sampling interval SI is followed by a standby phase 2382. Said another way, the sensor-assembly controller 2350 initiates a standby phase 2382 following each measurement phase 2378 and preceding a subsequent initiation phase 2372. The standby phase 2382 has a standby power consumption 2384. The standby power consumption 2384 can be in a range of zero percent to 5% of the design power consumption magnitude 2376. In some embodiments, the standby phase 2382 has a duration that is greater than a combination of both the duration of the measurement phase 2378 and the duration of the initiation phase 2372. For example, in some embodiments, a ratio of the duration of the sampling interval SI to the standby phase 2382 can be in a range of 1:4 to 1:30. Increasing the duration of the standby phase 2382 results in a slower sampling rate SR, which corresponds to a decreased demand on the power budget in exchange for a decreased number of samples of the sterilization environment ENV.

In some embodiments, the operations executed by the sensor-assembly controller 2350 include activating the window heater 2210 and/or the window heater 2214 for a heating interval HI on a condition that the gas concentration sensor 2200 is in the standby phase 2382 as depicted in FIG. 10. Activating the window heater 2210 can, for example, include either transitioning the window heater 2210 from a non-powered state to a powered state or transitioning the window heater 2210 from a low-power state to a high-power state. In some embodiments, the window heater 2210 and/or the window heater 2214 can be actuated at a heating rate HR of between once per minute and 12 times per minute over the sterilization period SP. Limiting the initiation of the heating intervals HI to the standby phase 2382 of the sensors, precludes an undesirable increase in the peak power consumption PPC that would otherwise result if the initiation of a heating interval HI were to overlap with an initiation phase 2372. FIG. 23 depicts the heating intervals HI as being centered about the approximate midpoint of the sampling rate SR for clarity. However, in some embodiments, each heating interval HI can be initiated to immediately proceed the initiation of a sampling interval SI. Concluding each heating interval HI just prior to (e.g., concurrent with) the initiation of the following sampling interval SI can facilitate ensuring that the emitter window 2208 and/or the receiver window 2212 is not affected or minimally affected by condensation at the initiation of the sampling interval SI thereby improving the gas concentration sampling. Additionally, concluding each heating interval HI just prior to (e.g., concurrent with) the initiation of the following sampling interval SI can minimize or eliminate the signal interference that may otherwise result from background blackbody irradiation produced by the window heater 2214. In some embodiments, for example, the window heater 2214 can be activated between 0.5 seconds and 1.0 seconds following the conclusion of each heating interval HI and deactivated between 1.0 seconds and 0.5 seconds prior to the initiation of the following sampling interval SI.

Rather than actuating the window heater 2210 and/or the window heater 2214 in accordance with a heating rate HR, in some embodiments, the window heater 2210 and/or the window heater 2214 can be actuated based on the environmental conditions within the sterilization chamber. For example, the operations executed by the sensor-assembly controller 2350 can include determining, via the environmental sensor(s) 2250, an ambient temperature of the sterilization environment ENV. The window heater 2210 and/or the window heater 2214 can then be activated on a condition that the ambient temperature is below a minimum temperature threshold. The minimum temperature threshold corresponding to a temperature below which condensation formation on the emitter window 2208 and/or the receiver window 2212 may be expected. Similarly, the operations executed by the sensor-assembly controller 2350 can include determining a humidity level within the sterilization environment ENV. The window heater 2210 and/or the window heater 2214 can then be activated on a condition that the humidity level exceeds a humidity threshold. The humidity threshold corresponding to a humidity level of which condensation formation on the emitter window 2208 and/or the receiver window 2212 may be expected. In some embodiments, the actuation based on environment conditions can be delayed by the sensor-assembly controller 2350 when such actuation would correspond to the initiation of a sampling interval SI to preclude negatively affecting the peak power consumption PPC and/or the average power consumption and, therefore, the power budget.

In some embodiments, the window heater 2210 and/or the window heater 2214 can be activated in accordance with a first heating rate (e.g., a first heater duty cycle) on a condition that an ambient temperature is within a first temperature range. Similarly, the window heater 2210 and/or the window heater 2214 can be activated in accordance with second heating rate (e.g., a second heater duty cycle) on a condition that the ambient temperature is within a second temperature range. The second heating rate can have a duration between sequential heater actuations that is greater than a duration between sequential heater actuations of the first heating rate. In other words, when justified by the environmental conditions within the sterilization environment ENV, the window heater 2210 and/or the window heater 2214 can be activated more frequently than would otherwise be desirable to ensure accurate sampling of the sterilization parameters at a cost to the power budget.

In some embodiments, the sensor-assembly controller 2350 can apply a correction factor to the output of the gas concentration sensor 2200 based on the environmental conditions (e.g., the temperature and/or humidity) within the sterilization environment ENV. Accordingly, the sensor-assembly controller 2350 can, for example, determine an ambient temperature and/or humidity of the sterilization environment ENV at each sampling interval SI based on an output of the environmental sensor(s) 2250. The sensor-assembly controller 2350 can then determine a correction factor at each sampling interval SI for the output from the gas concentration sensor 2200 based on the ambient temperature and/or the humidity of the sterilization environment ENV at the sampling interval SI. The correction factor can then be applied to the output of the gas concentration sensor 2200 at each sampling interval SI to determine a recorded sterilant gas concentration (e.g., a concentration of ethylene oxide within the sensing volume 2156) at each sampling interval.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The processor included within the sensor assembly and or the system controller (and any of the processors and/or controllers described herein) can be any processor configured to, for example, write data into and read data from the memory of the controller, and execute the instructions and/or methods stored within the memory. Furthermore, the processor can be configured to control operation of the other modules within the controller (e.g., the temperature feedback module and the flow module). Specifically, the processor can receive a signal including temperature data, current measurements or the like and determine an amount of power and/or current to be supplied to each heater assembly, the desired timing and sequence of the piston pulses and the like. For example, in some embodiments, the controller can be an 8-bit PIC microcontroller, which will control the power delivered to various components within the sensor assemblies described herein. This microcontroller can also contain code for and/or be configured to minimize the instantaneous power requirements on the power source.

In other embodiments, any of the processors described herein can be, for example, an application-specific integrated circuit (ASIC) or a combination of ASICs, which are designed to perform one or more specific functions. In yet other embodiments, the microprocessor can be an analog or digital circuit, or a combination of multiple circuits.

Any of the memory devices described herein can be any suitable device such as, for example, a read only memory (ROM) component, a random access memory (RAM) component, electronically programmable read only memory (EPROM), erasable electronically programmable read only memory (EEPROM), registers, cache memory, and/or flash memory. Any of the modules (the pressure feedback module and the position feedback module) can be implemented by the processor and/or stored within the memory.

Although various embodiments have been described as having particular features and/or combinations of components, other embodiments are possible having a combination of any features and/or components from any of embodiments as discussed above.

Additionally, in some embodiments, the system 1000 can include sensor assemblies having different configurations. For example, in some embodiments a system can include one set of sensor assemblies configured to measure a gas concentration and a first environmental parameter (e.g., humidity) and a second set of sensor assemblies configured to measure the gas concentration and a second, different environmental parameter (e.g., temperature).

What is claimed is:

1. A system for monitoring a gas sterilization process, the system comprising:
a plurality of sensor assemblies configured to be spaced apart within a sterilization environment that is sealed from an external environment, each sensor assembly of the plurality of sensor assemblies including a gas concentration sensor, at least one environmental sensor, an energy storage device, and a sensor assembly controller configured to record a plurality of signals from the gas concentration sensor and the at least one environmental sensor associated with the sterilization environment at a plurality of sampling intervals during a sterilization period while being disconnected from any external power source and any external equipment,
a first sensor assembly from the plurality of sensor assemblies configured to be at a first position between adjacent targets of a plurality of targets of a load within the sterilization environment, a second sensor assembly from the plurality of sensor assemblies configured to be at a second position outside of the load; and
a system controller including at least one processor configured to perform a plurality of operations, the plurality of operations including:
receiving the recorded plurality of signals from the sensor assembly controller of each sensor assembly of the plurality of sensor assemblies, each sensor assembly being associated with a sensor spatial coordinate corresponding to a position of the sensor assembly within the sterilization environment,
determining a process variable at each sampling interval of the plurality of sampling intervals for each sensor assembly of the plurality of sensor assemblies based, at least in part, on the corresponding plurality of signals,
generating a spatial distribution of the process variable based at least in part on the sensor spatial coordinate and the process variable at each sampling interval of the plurality of sampling intervals for each sensor assembly of the plurality of sensor assemblies, the spatial distribution including an estimate of the process variable at a third position within the load,
comparing the spatial distribution of the process variable to a sterilization process threshold range to determine an efficacy of the gas sterilization process; and
generating, in response to the comparing, an indication associated with the efficacy of the gas sterilization process.

2. The system of claim 1, wherein the efficacy of the gas sterilization process is based on any of: A) whether the process variable meets a minimum condition at each position within the sterilization environment, B) whether the process variable meets the minimum condition for a minimum time period, or C) whether the process variable is within the sterilization process threshold range.

3. The system of claim 2, wherein:
the process variable is based on a concentration of a sterilant gas and at least one of a temperature, a humidity, or a pressure within the sterilization environment.

4. The system of claim 3, wherein the plurality of operations includes:
determining an effective spore log reduction (SLR) for each sensor assembly of the plurality of sensor assemblies based at least in part on the process variable taken over the plurality of sampling intervals; and
the indication includes the effective SLR and an error code on a condition that the effective SLR is outside of a target SLR range associated with the gas sterilization process.

5. The system of claim 1, wherein the plurality of operations includes:
producing a graphical representation of the spatial distribution of the process variable over the sterilization period.

6. The system of claim 5, wherein the plurality of operations includes:
receiving a target spatial coordinate for each of the plurality of targets within the load, the target spatial coordinate corresponding to a position of the target within the sterilization environment; and
generating a spatial distribution of the load based at least in part on the target spatial coordinate.

7. The system of claim 5, wherein the graphical representation of the spatial distribution of the process variable during the sterilization period is a three-dimensional map of at least the process variable.

8. The system of claim 7, wherein the plurality of operations includes:
receiving a target spatial coordinate for each of the plurality of targets within the load, the target spatial coordinate corresponding to a position of the target within the sterilization environment; and
producing a graphical representation of a spatial distribution of the load based at least in part on the target spatial coordinate, the graphical representation of the spatial distribution of the load being included on the three-dimensional map.

9. A method for monitoring a gas sterilization process via a sterilization monitoring system comprising a system controller implemented in at least one of a memory or a processing device and a plurality of sensor assemblies, each sensor assembly of the plurality of sensor assemblies including a gas concentration sensor, at least one environmental sensor, an energy storage device, and a sensor assembly controller, the sensor assembly controller configured to record a plurality of signals from the gas concentration sensor and the at least one environmental sensor associated with a sterilization environment at a plurality of sampling intervals during a sterilization period, each sensor assembly being associated with a sensor spatial coordinate corresponding to a position of the sensor assembly within the sterilization environment, the plurality of sensor assemblies including a first sensor assembly at a first position between adjacent targets of a plurality of targets of a load within the sterilization environment and a second sensor assembly at a second position outside of the load, the method comprising:
receiving, via the system controller, the recorded plurality of signals from the sensor assembly controller of each sensor assembly of the plurality of sensor assemblies;
determining, via the system controller, a process variable for each sampling interval of the plurality of sampling intervals for each sensor assembly of the plurality of sensor assemblies based, at least in part, on the corresponding plurality of signals;
generating a spatial distribution of the process variable over the sterilization period based at least in part on the sensor spatial coordinate and the process variable at each sampling interval of the plurality of sampling intervals of plurality of sensor assemblies, the spatial distribution including an estimate of the process variable at a third position within the load:
determining a portion of the plurality of sampling intervals corresponding to an exposure phase of the gas sterilization process:
comparing, via the system controller, the spatial distribution of the process variable over the exposure phase of the gas sterilization process to an exposure standard; and
generating an indication associated with an efficacy of the gas sterilization process during the exposure phase based on the comparing.

10. The method of claim 9, wherein the indication is a first indication, the method further comprising:
determining a sterilant gas exposure time for each sensor assembly of the plurality of sensor assemblies based at least in part on the process variable taken over the plurality of sampling intervals;
determining a sterilant exposure magnitude based on the sterilant gas exposure time and the process variable; and
generating a second indication on a condition that the sterilant exposure magnitude is greater than an accumulated threshold.

11. The method of claim 9, further comprising:
receiving a target spatial coordinate for each of the plurality of targets within the load, the target spatial coordinate corresponding to a position of a target of the plurality of targets, the efficacy of the gas sterilization process being based on whether the process variable meets the exposure standard at each of the plurality of targets within the load; and
generating an error code on a condition that the process variable during the exposure phase is outside of the exposure standard at any of the plurality of targets within the load.

12. The method of claim 9, further comprising:
determining a portion of the plurality of sampling intervals corresponding to a conditioning phase of the gas sterilization process;
comparing, over the conditioning phase, the process variable to a conditioning standard; and
generating an error code on a condition that the process variable during the conditioning phase is outside of the conditioning standard.

13. The method of claim 9, wherein:
the sterilization environment is sealed from an external environment during the exposure phase; and
each of the plurality of sensor assemblies is disconnected from any external power source and any external equipment during the exposure phase.

14. The method of claim 9, further comprising:
producing a graphical representation of the spatial distribution of the process variable over the sterilization period, the graphical representation being a spatial map of at least the process variable.

15. The method of claim 9, further comprising:
producing a graphical representation of the spatial distribution of the process variable over the sterilization period, the graphical representation of the spatial distribution of the process variable during the sterilization period being a data array.

16. The method of claim 14, further comprising:
receiving a target spatial coordinate for each of the plurality of targets within the load, the target spatial coordinate corresponding to a position of a target of the plurality of targets;a and
producing a graphical representation of a spatial distribution of the load based at least in part on the target spatial coordinate, the graphical representation of the spatial distribution of the load being included on the spatial map of at least the process variable.

17. A method for adjusting an amount of sterilant gas conveyed into a sterilization environment during a second sterilization period occurring after a first sterilization period via a sterilization monitoring system comprising a system controller and a plurality of sensor assemblies spaced apart within the sterilization environment, each sensor assembly of the plurality of sensor assemblies including a gas concentration sensor, at least one environmental sensor, an energy storage device, and a sensor assembly controller, the sensor assembly controller implemented in at least one of a first memory or a first processing device that contains a recorded plurality of signals from the gas concentration sensor and the at least one environmental sensor taken at a plurality of sampling intervals during the first sterilization period, each sensor assembly being associated with a sensor spatial coordinate corresponding to a position of the sensor assembly within the sterilization environment during the first sterilization period, the method comprising:
receiving, via the system controller implemented in at least one of a second memory or a second processing device, the recorded plurality of signals from the sensor assembly controller of each sensor assembly of the plurality of sensor assemblies;
determining a process variable at each sampling interval of the plurality of sampling intervals for each sensor assembly of the plurality of sensor assemblies based, at least in part, on the corresponding recorded plurality of signals;
generating, via the system controller, a spatial distribution of the process variable associated with the first sterilization period based at least in part on the sensor spatial coordinate associated with each sensor assembly of the plurality of sensor assemblies and the process variable at each sampling interval of the plurality of sampling intervals for each sensor assembly of the plurality of sensor assemblies; and
adjusting the amount of sterilant gas conveyed into the sterilization environment during the second sterilization period based on the spatial distribution of the process variable associated with the first sterilization period and a sterilization process threshold.

18. The method of claim 17, wherein the generating the spatial distribution includes producing a three-dimensional map of at least the process variable.

19. The method of claim 17, further comprising:
receiving a target spatial coordinate for each of a plurality of targets within a load, the target spatial coordinate corresponding to a position of a target of the plurality of targets during the first sterilization period; and
producing a graphical representation of the load within the sterilization environment, the graphical representation of the load including a load spatial map based at least in part on the target spatial coordinate, the graphical representation of the load being included on a graphical representation of the process variable.

20. The method of claim 19, wherein the graphical representation of the process variable includes a contour plot showing lines representing a plurality of different concentrations of the sterilant gas.

21. The method of claim 17, wherein the adjusting the amount of sterilant gas conveyed into the sterilization environment during the second sterilization period includes generating an adjustment parameter associated with the second sterilization period based on the spatial distribution of the process variable associated with the first sterilization period and the sterilization process threshold associated with the second sterilization period.

22. The method of claim 21, wherein the adjustment parameter is associated with an adjustment of any of an amount of the sterilant gas, a temperature within the sterilization environment, a humidity within the sterilization environment, or a pressure within the sterilization environment.

23. The method of claim 21, wherein the generating the adjustment parameter is based on a characteristic of a load within the sterilization environment during the second sterilization period.

24. The method of claim 23, wherein the characteristic of the load during the second sterilization period includes any of a type of a plurality of targets within the sterilization environment, a material from which the plurality of targets is constructed, a packaging material of the plurality of targets, or a characteristic size of the plurality of targets.

25. The method of claim 21, further comprising:
 transmitting the adjustment parameter to a fluid mechanism to control a differential pressure of the sterilant gas conveyed into the sterilization environment during the second sterilization period.

\* \* \* \* \*